United States Patent
Miyoshi et al.

(10) Patent No.: US 9,300,904 B2
(45) Date of Patent: Mar. 29, 2016

(54) IMAGE PROCESSING APPARATUS, IMAGE PROCESSING SYSTEM, AND IMAGE READING APPARATUS

(71) Applicant: OLYMPUS CORPORATION, Shibuya-ku, Tokyo (JP)

(72) Inventors: Takashi Miyoshi, Atsugi (JP); Akio Kosaka, Tokyo (JP); Hidekazu Iwaki, Tokyo (JP); Arata Shinozaki, Tokyo (JP); Mitsunori Kubo, Tokyo (JP); Takayuki Nakatomi, Tokyo (JP); Nobuyuki Watanabe, Yokohama (JP)

(73) Assignee: OLYMPUS CORPORATION, Tokyo (JP)

( * ) Notice: Subject to any disclaimer, the term of this patent is extended or adjusted under 35 U.S.C. 154(b) by 13 days.

(21) Appl. No.: 14/213,714

(22) Filed: Mar. 14, 2014

(65) Prior Publication Data

US 2014/0218565 A1 Aug. 7, 2014

Related U.S. Application Data

(63) Continuation of application No. PCT/JP2012/074227, filed on Sep. 21, 2012.

(30) Foreign Application Priority Data

Sep. 22, 2011 (JP) .................. 2011-207818
Sep. 22, 2011 (JP) .................. 2011-207819
Jan. 10, 2012 (JP) .................. 2012-002581

(51) Int. Cl.
*H04N 5/907* (2006.01)
*H04N 5/91* (2006.01)
(Continued)

(52) U.S. Cl.
CPC .............. *H04N 5/907* (2013.01); *G11B 27/031* (2013.01); *H04N 5/91* (2013.01); *H04N 9/8042* (2013.01);
(Continued)

(58) Field of Classification Search
CPC ..... H04N 5/907; H04N 19/137; H04N 19/172; H04N 19/167; H04N 19/132; H04N 19/46; H04N 21/4334; H04N 9/8042; H04N 21/4335; H04N 5/91; H04N 9/8205; H04N 5/765; H04N 5/772; G11B 27/031
See application file for complete search history.

(56) References Cited

U.S. PATENT DOCUMENTS

2005/0219666 A1 10/2005 Ejima et al.
2006/0256396 A1 11/2006 Ejima et al.
(Continued)

FOREIGN PATENT DOCUMENTS

JP 05-030498 A 2/1993
JP 07-121789 A 5/1995
(Continued)

OTHER PUBLICATIONS
International Search Report (ISR) dated Oct. 23, 2012 issued in International Application No. PCT/JP2012/074227.
(Continued)

*Primary Examiner* — Twyler Haskins
*Assistant Examiner* — Padma Haliyur
(74) *Attorney, Agent, or Firm* — Holtz, Holtz & Volek PC

(57) ABSTRACT

An image processing apparatus is configured comprising a necessary/unnecessary determination data generating unit configured to generate necessary/unnecessary determination data; an image encoding unit assigning identification information respectively to, and recording, in a recording unit, each piece of data after division of each moving image of a moving image after encoding, a necessary/unnecessary determining unit configured to determine an unnecessary moving image frame based on necessary/unnecessary determination data; and a moving image file managing unit configured to rewrite information indicating a state of data at a recording unit in the recording unit corresponding to a moving image frame determined as unnecessary moving image frame by the necessary/unnecessary determining unit into information that there is no data.

57 Claims, 65 Drawing Sheets

(51) Int. Cl.
- *H04N 9/82* (2006.01)
- *G11B 27/031* (2006.01)
- *H04N 21/4335* (2011.01)
- *H04N 9/804* (2006.01)
- *H04N 21/433* (2011.01)
- *H04N 19/172* (2014.01)
- *H04N 19/46* (2014.01)
- *H04N 19/132* (2014.01)
- *H04N 19/167* (2014.01)
- *H04N 19/137* (2014.01)
- *H04N 5/77* (2006.01)
- *H04N 5/765* (2006.01)

(52) U.S. Cl.
CPC ........... *H04N 9/8205* (2013.01); *H04N 19/132* (2014.11); *H04N 19/137* (2014.11); *H04N 19/167* (2014.11); *H04N 19/172* (2014.11); *H04N 19/46* (2014.11); *H04N 21/4334* (2013.01); *H04N 21/4335* (2013.01); *H04N 5/765* (2013.01); *H04N 5/772* (2013.01)

(56) References Cited

U.S. PATENT DOCUMENTS

| | | |
|---|---|---|
| 2009/0268943 A1 | 10/2009 | Yoshizumi |
| 2010/0091864 A1* | 4/2010 | Tada et al. ............... 375/240.16 |
| 2010/0312765 A1* | 12/2010 | Sorakado .................. 707/737 |
| 2012/0106850 A1* | 5/2012 | Koch et al. ............... 382/195 |

FOREIGN PATENT DOCUMENTS

| | | |
|---|---|---|
| JP | 09-214879 A | 8/1997 |
| JP | 2000-209483 A | 7/2000 |
| JP | 2002010179 A | 1/2002 |
| JP | 2005020196 A | 1/2005 |
| JP | 2005020409 A | 1/2005 |
| JP | 2005-295285 A | 10/2005 |
| JP | 2008061107 A | 3/2008 |
| JP | 2008-182544 A | 8/2008 |
| JP | 2008306334 A | 12/2008 |
| JP | 2009004950 A | 1/2009 |
| JP | 2009-253542 A | 10/2009 |
| JP | 2009267787 A | 11/2009 |
| JP | 2010147659 A | 7/2010 |

OTHER PUBLICATIONS

Japanese Office Action (and English translation thereof) dated May 19, 2015, issued in counterpart Japanese Application No. 2011-207819.

Japanese Office Action (and English translation thereof) dated Feb. 2, 2016, issued in counterpart Japanese Application No. 2012-002581.

* cited by examiner

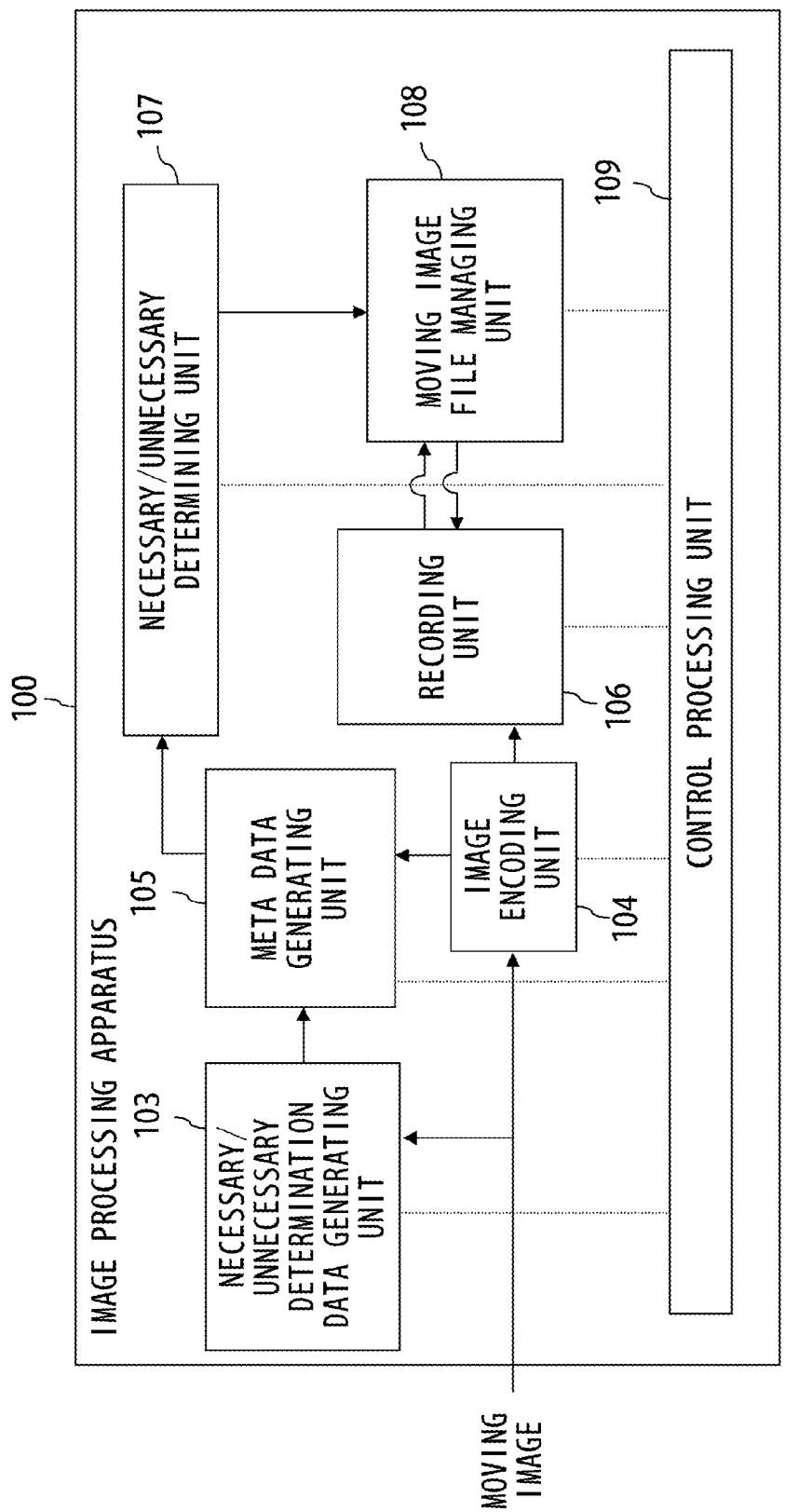
F I G. 1

| PID | CLUSTER NUMBER |
|---|---|
| K | 0001 |
| K+1 | 0001 |
| K+2 | 0001 |
| K+3 | 0001 |
| K+4 | 0001 |
| K+5 | 0001 |
| ⋮ | ⋮ |
| K+n+1 | 0003 |
| ⋮ | ⋮ |

F I G. 3 A

| CLUSTER NUMBER | NEXT CLUSTER NUMBER |
|---|---|
| 0001 | 0002 |
| 0002 | FFFF |
| 0003 | 0004 |
| 0004 | FFFF |
| 0005 | 0006 |
| 0006 | FFFF |
| 0007 | 0008 |
| 0008 | FFFF |
| 0009 | 000A |
| 000A | FFFF |
| ⋮ | ⋮ |

F I G. 3 B

| CLUSTER NUMBER | NEXT CLUSTER NUMBER |
|---|---|
| 0001 | 0002 |
| 0002 | FFFF |
| 0003 | 0000 |
| 0004 | 0000 |
| 0005 | 0006 |
| 0006 | FFFF |
| 0007 | 0008 |
| 0008 | FFFF |
| 0009 | 000A |
| 000A | FFFF |
| ⋮ | ⋮ |

F I G. 3 C

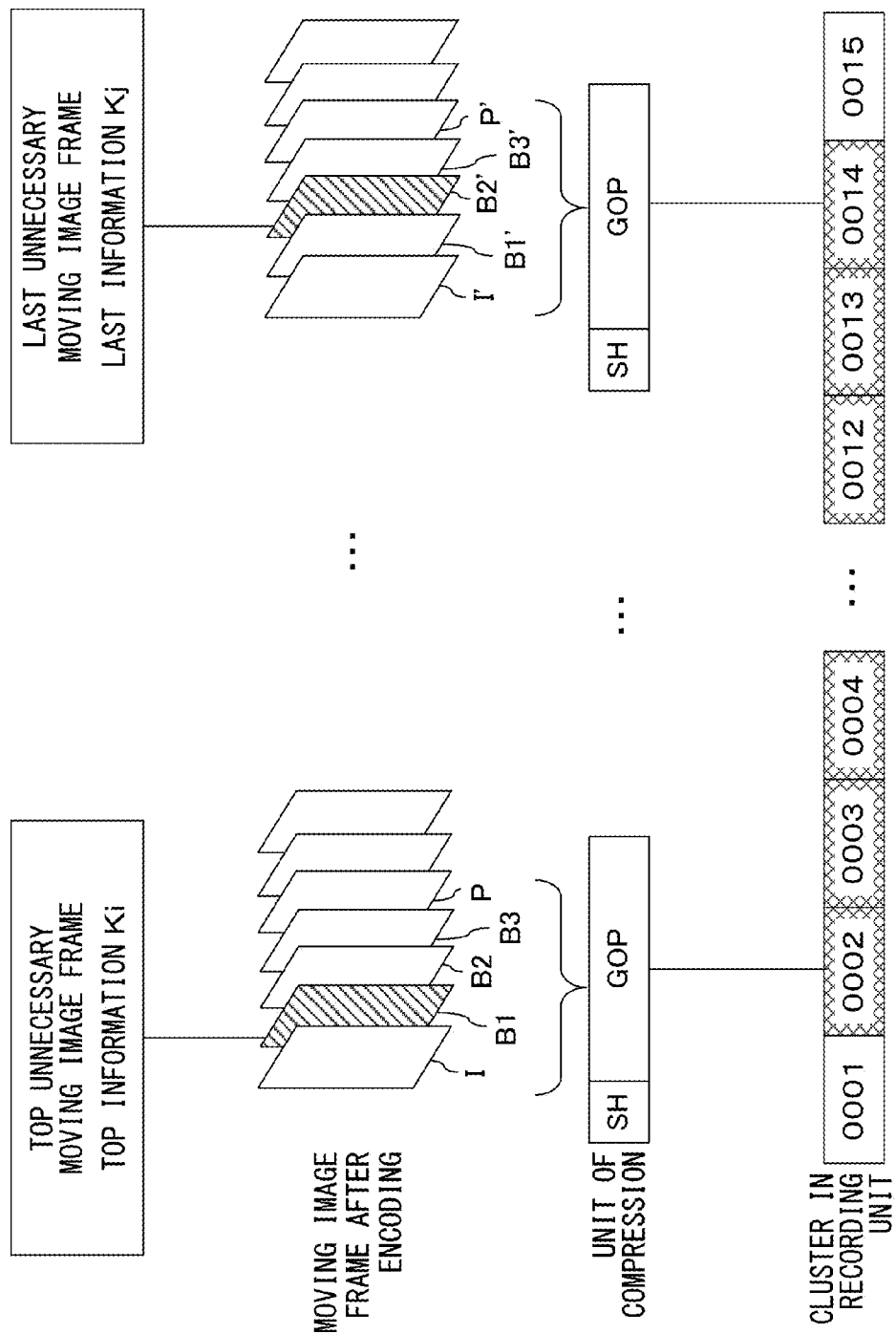
F I G. 4

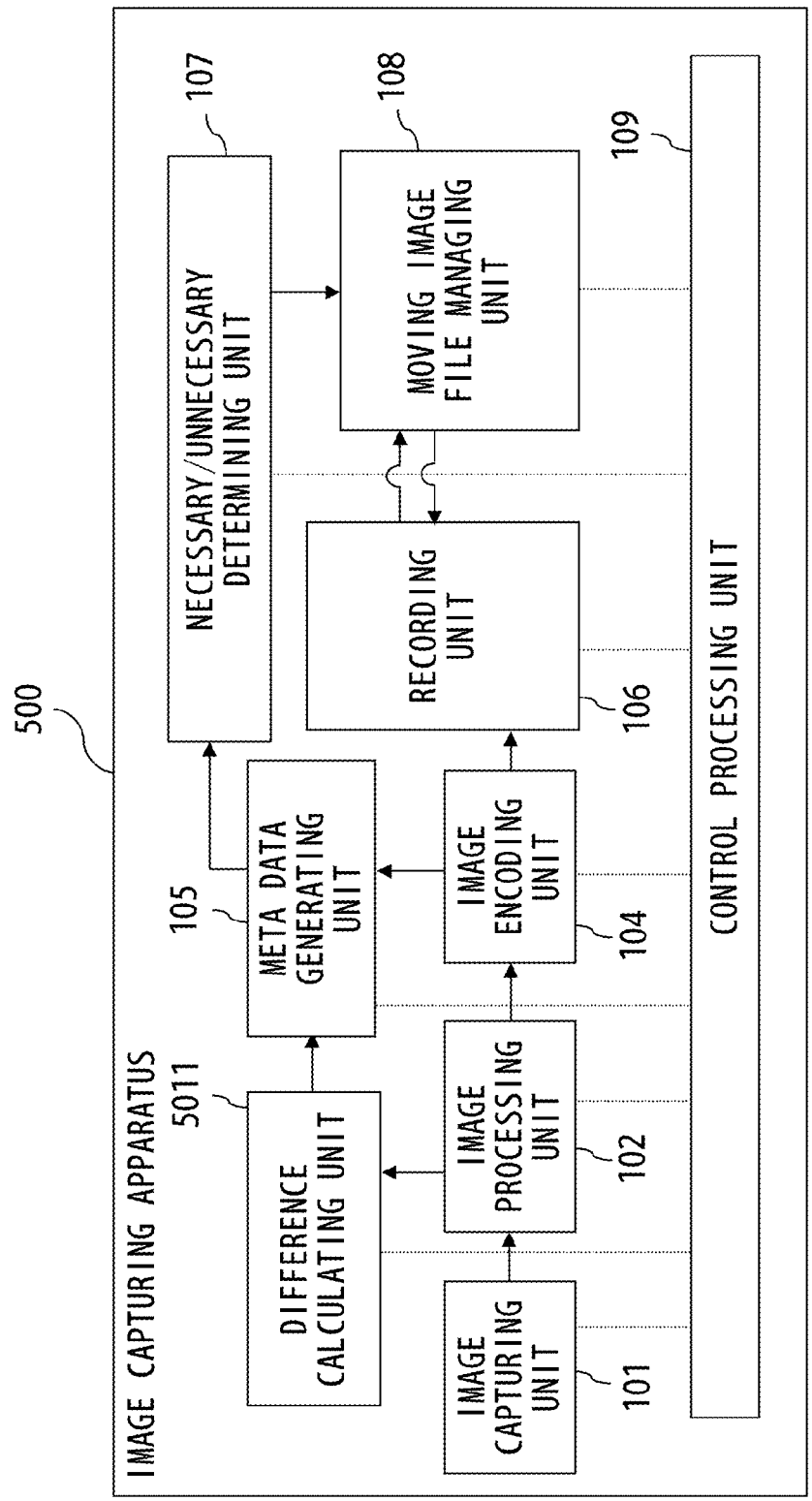
F I G. 5B

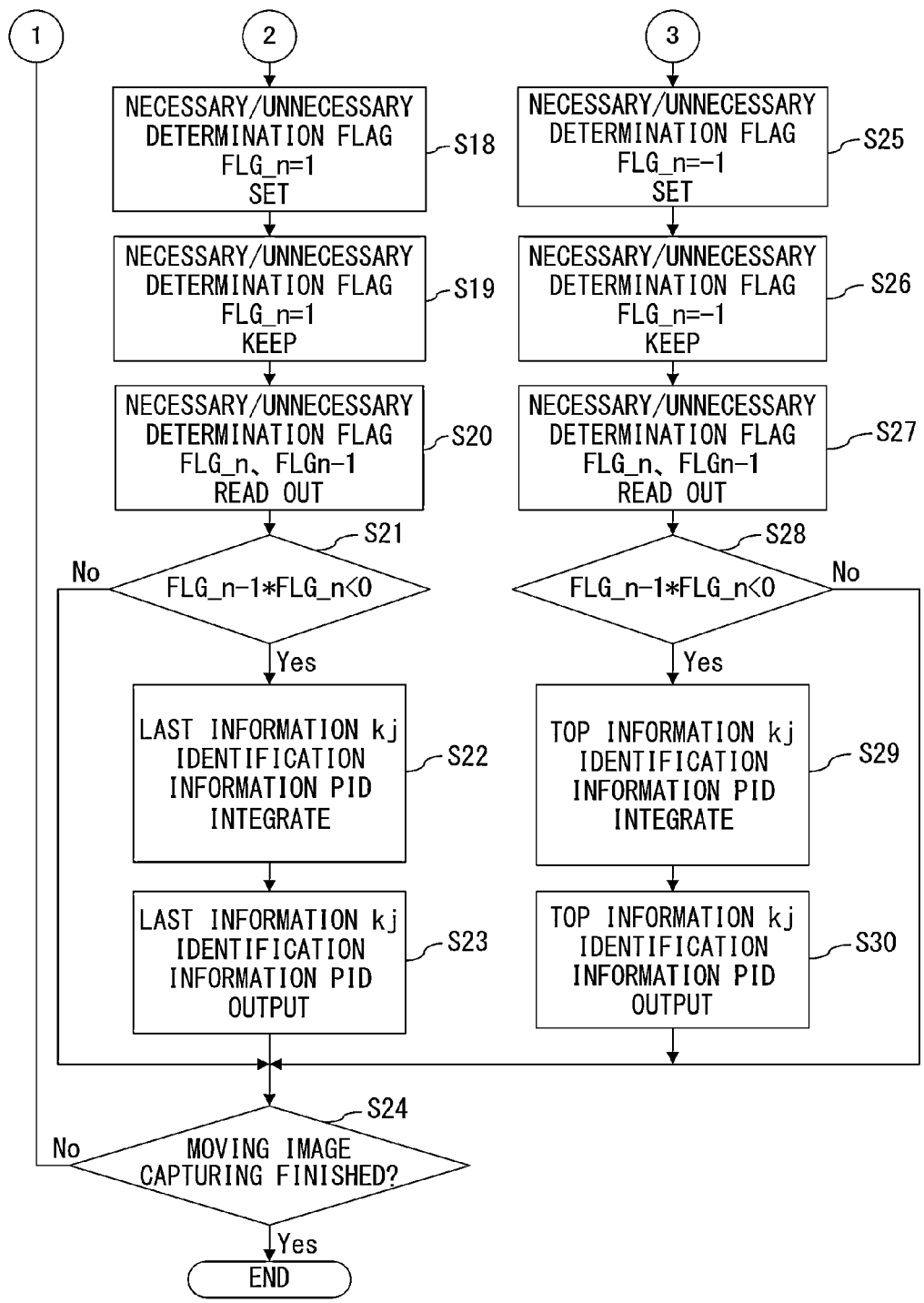
F I G. 6B

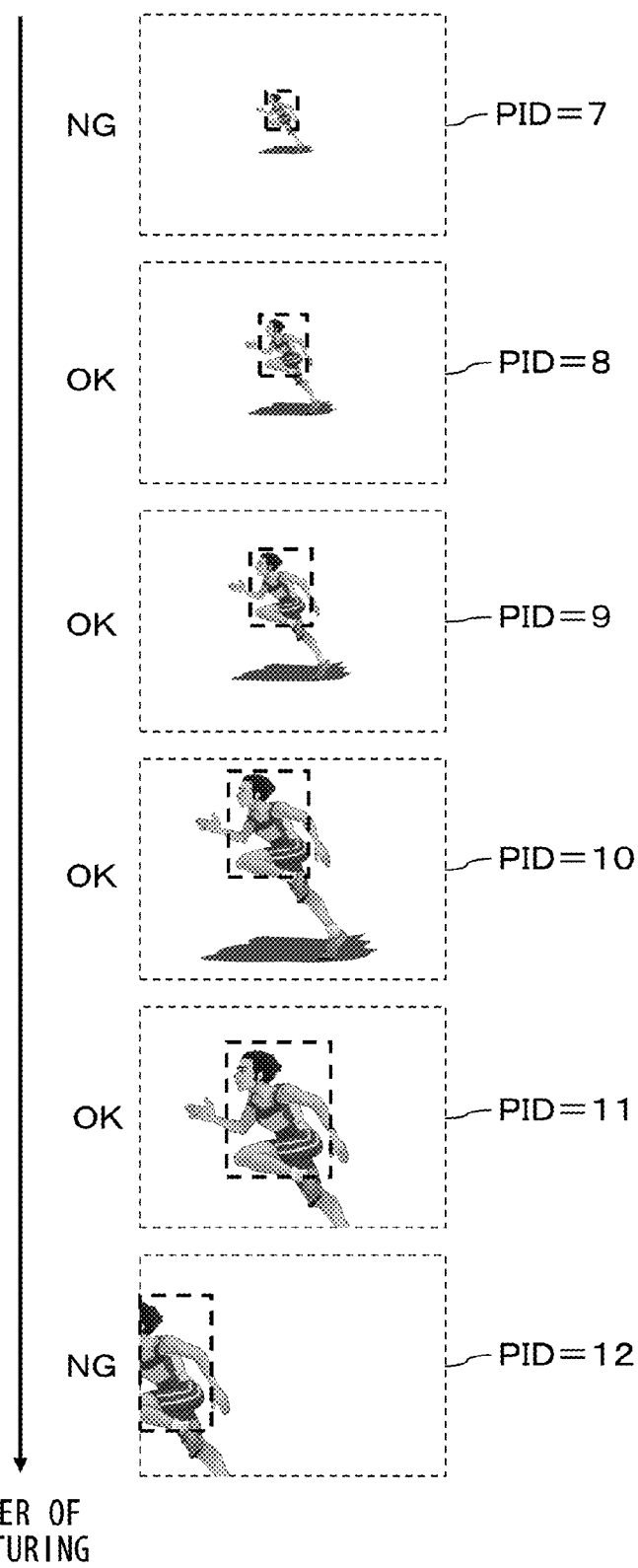
F I G. 7

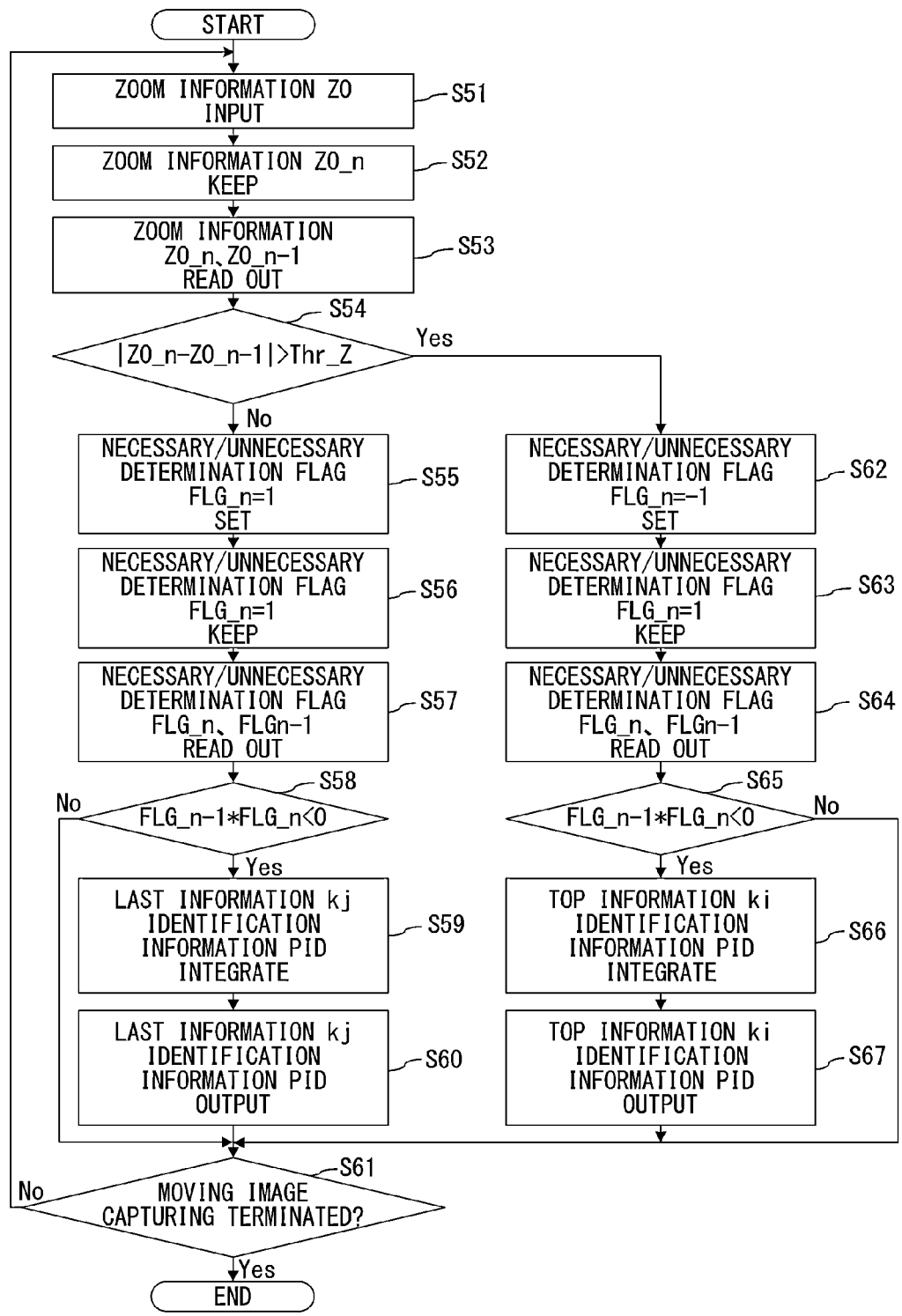
F I G. 12

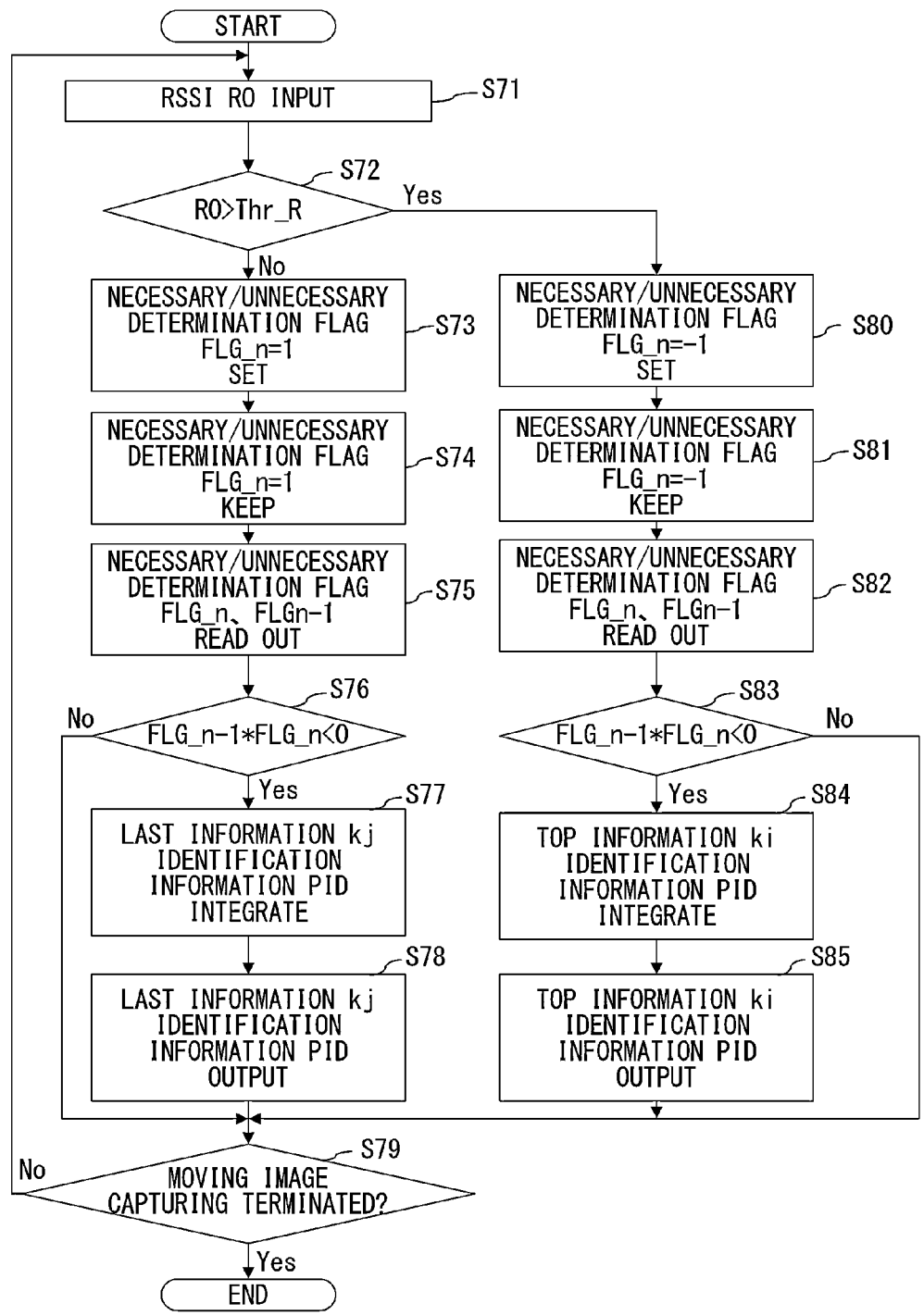
F I G. 1 4

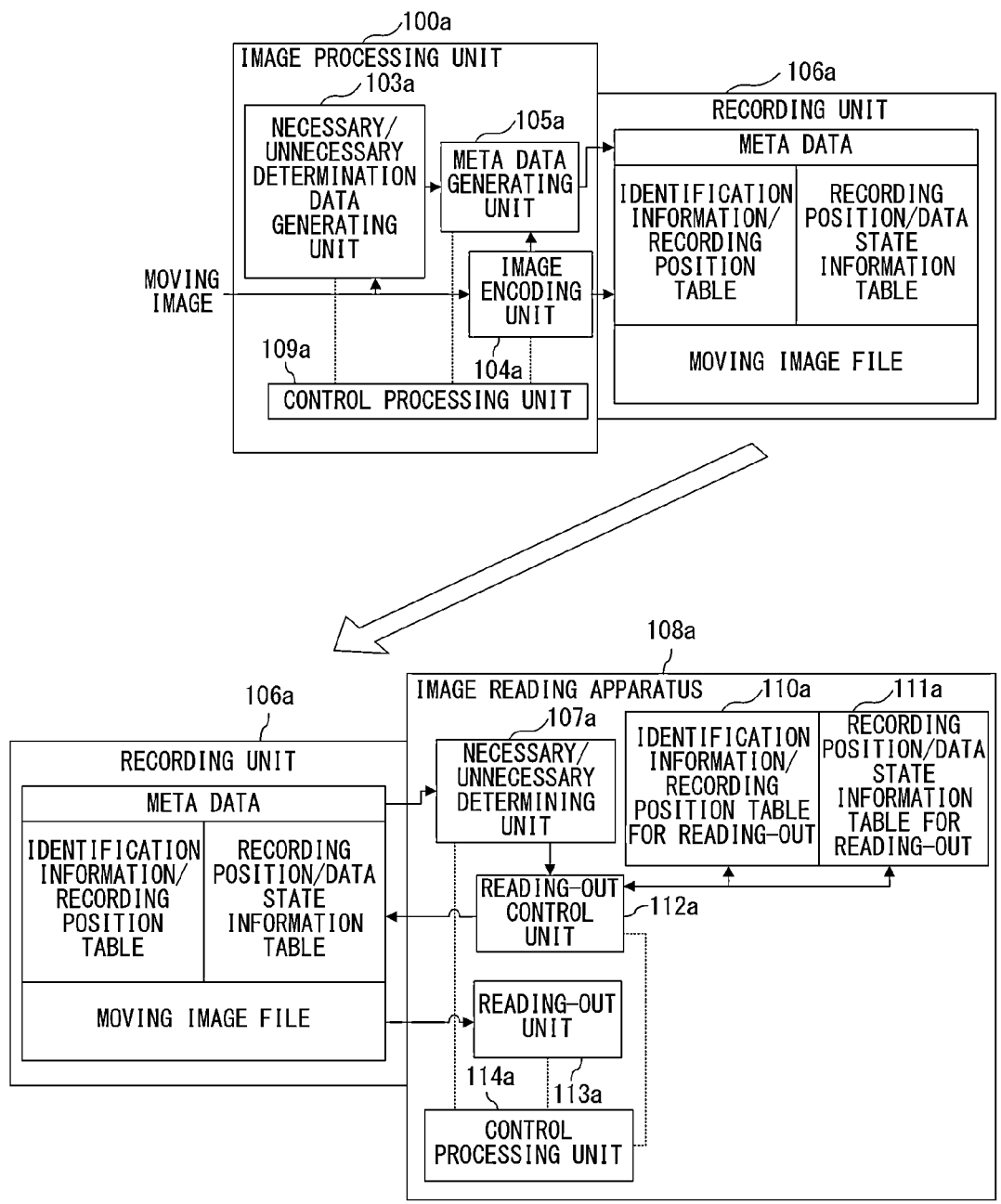
F I G. 21

| PID | CLUSTER NUMBER |
|---|---|
| K | 0001 |
| K+1 | 0001 |
| K+2 | 0001 |
| K+3 | 0001 |
| K+4 | 0001 |
| K+5 | 0001 |
| ... | ... |
| K+n+1 | 0003 |
| ... | ... |

FIG. 23A

| CLUSTER NUMBER | NEXT CLUSTER NUMBER |
|---|---|
| 0001 | 0002 |
| 0002 | FFFF |
| 0003 | 0004 |
| 0004 | FFFF |
| 0005 | 0006 |
| 0006 | FFFF |
| 0007 | 0008 |
| 0008 | FFFF |
| 0009 | 000A |
| 000A | FFFF |
| ... | ... |

FIG. 23B

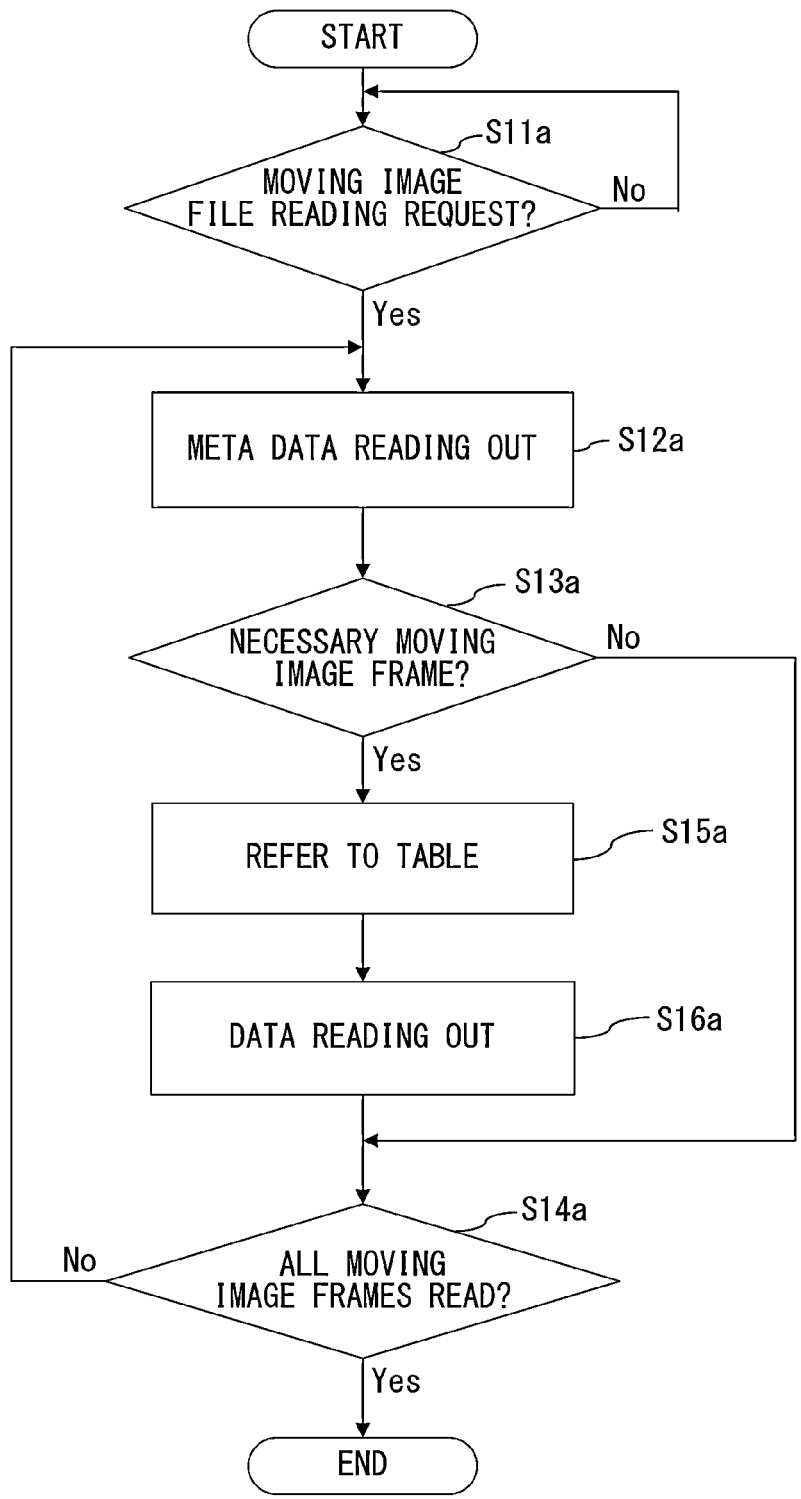
F I G. 2 4

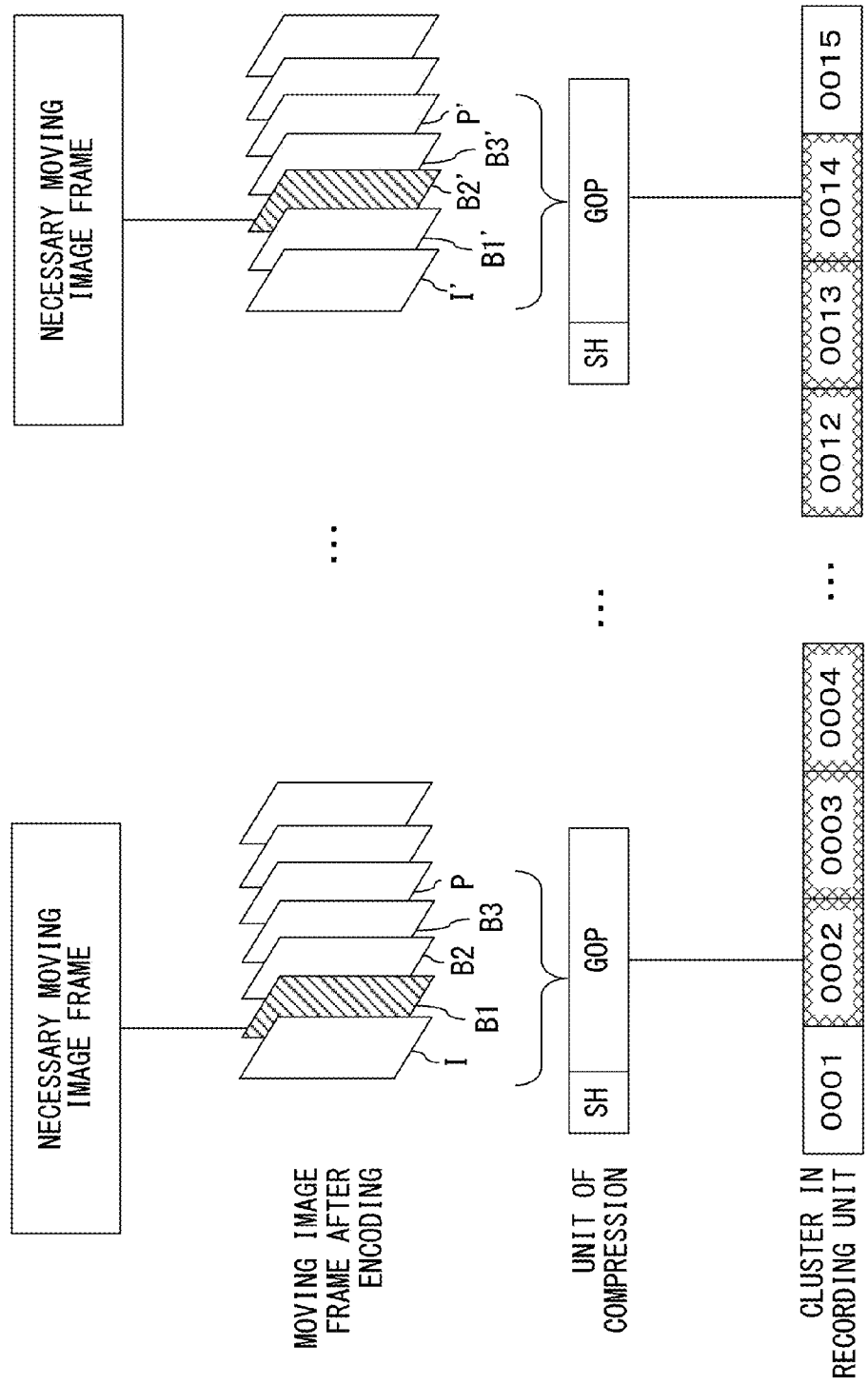
F I G. 25

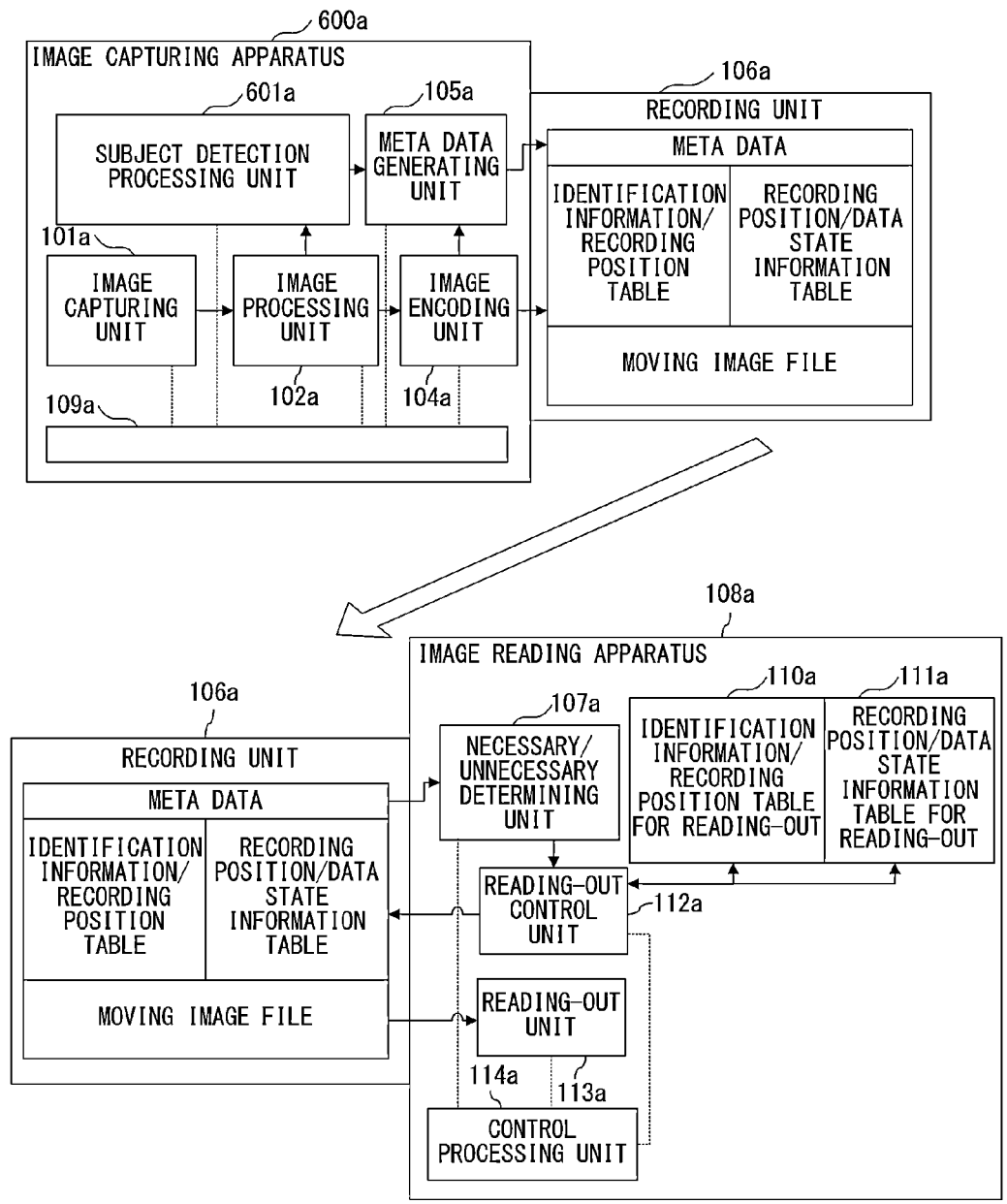
F I G. 2 6 A

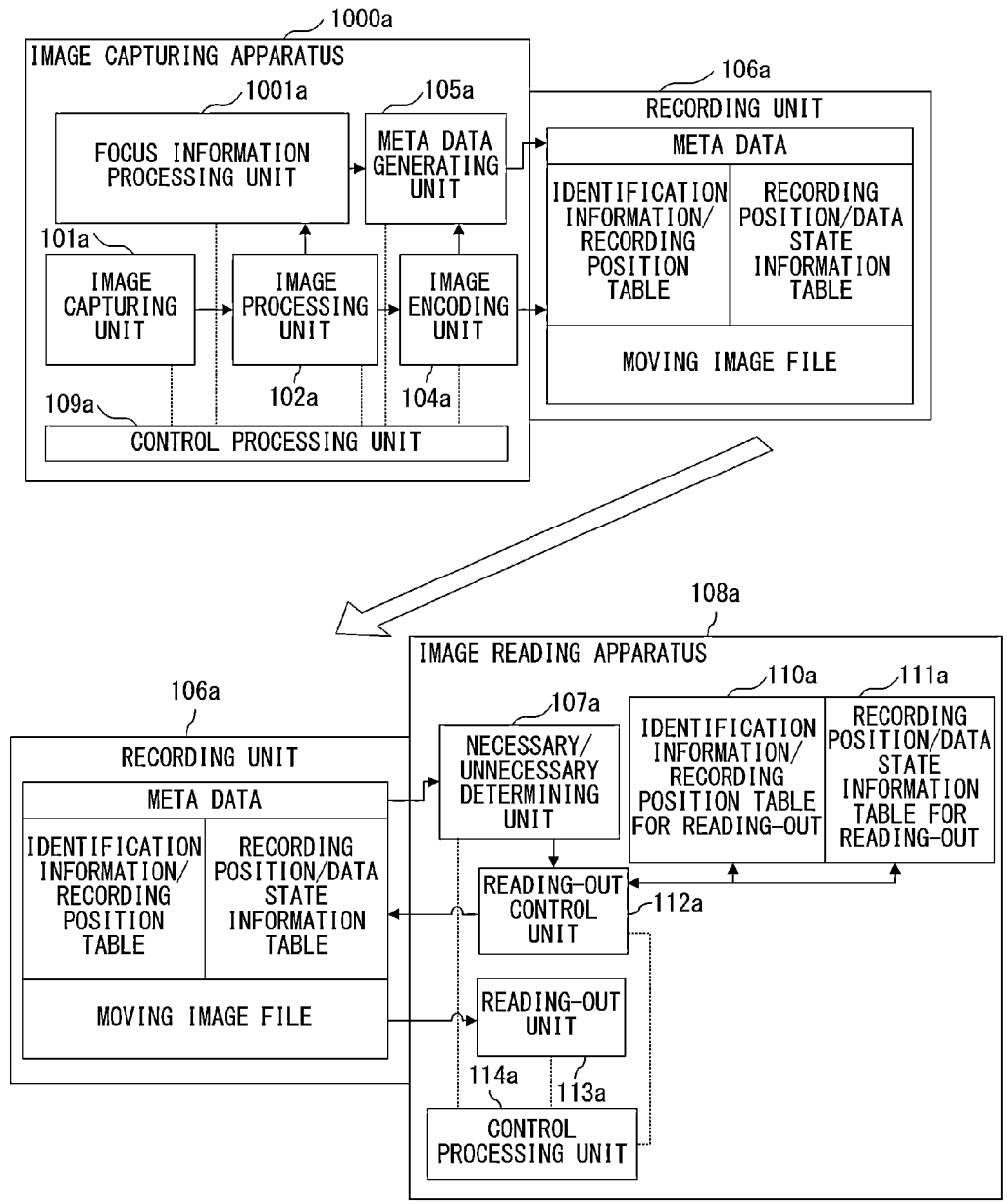
F I G. 30

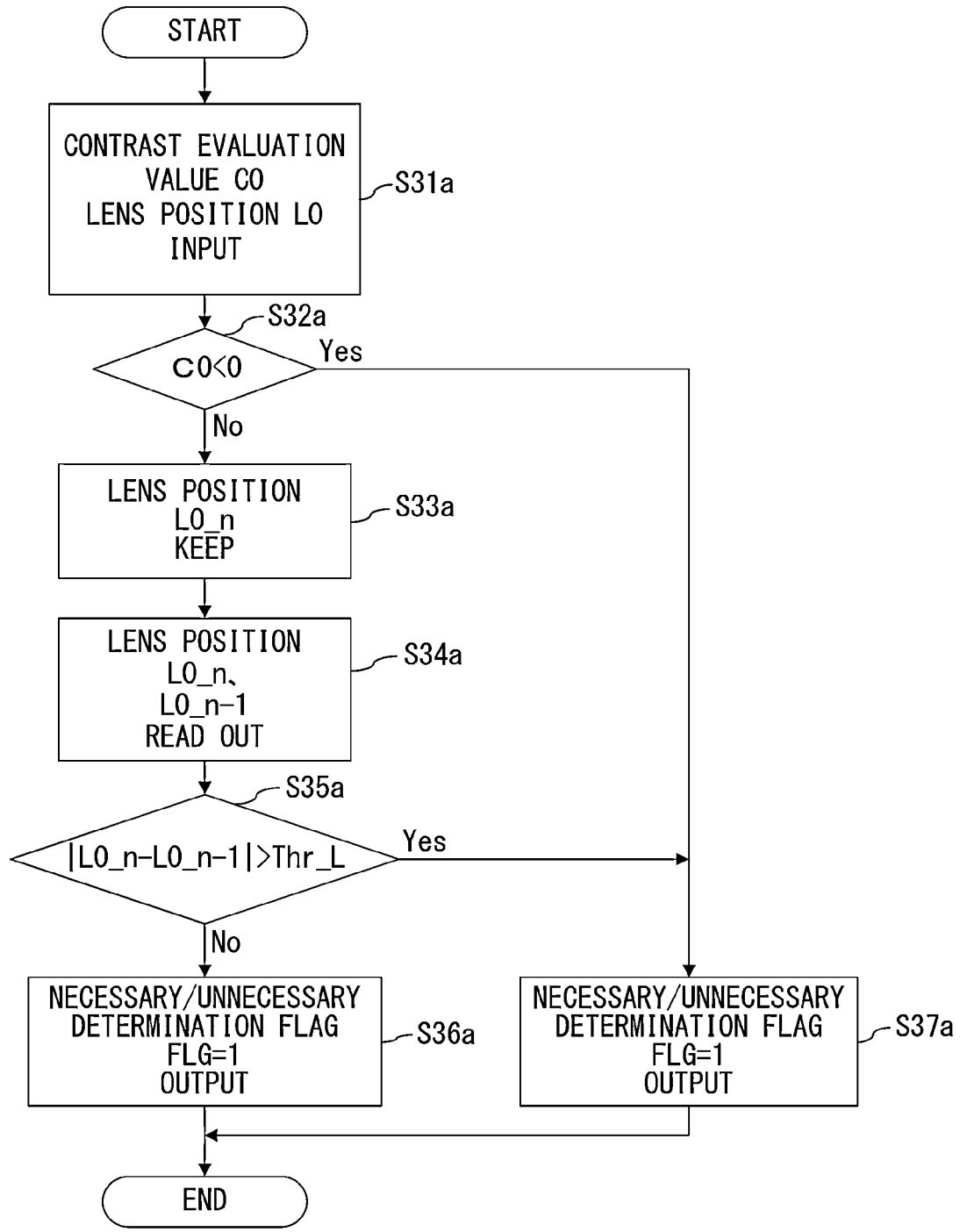
F I G. 3 1

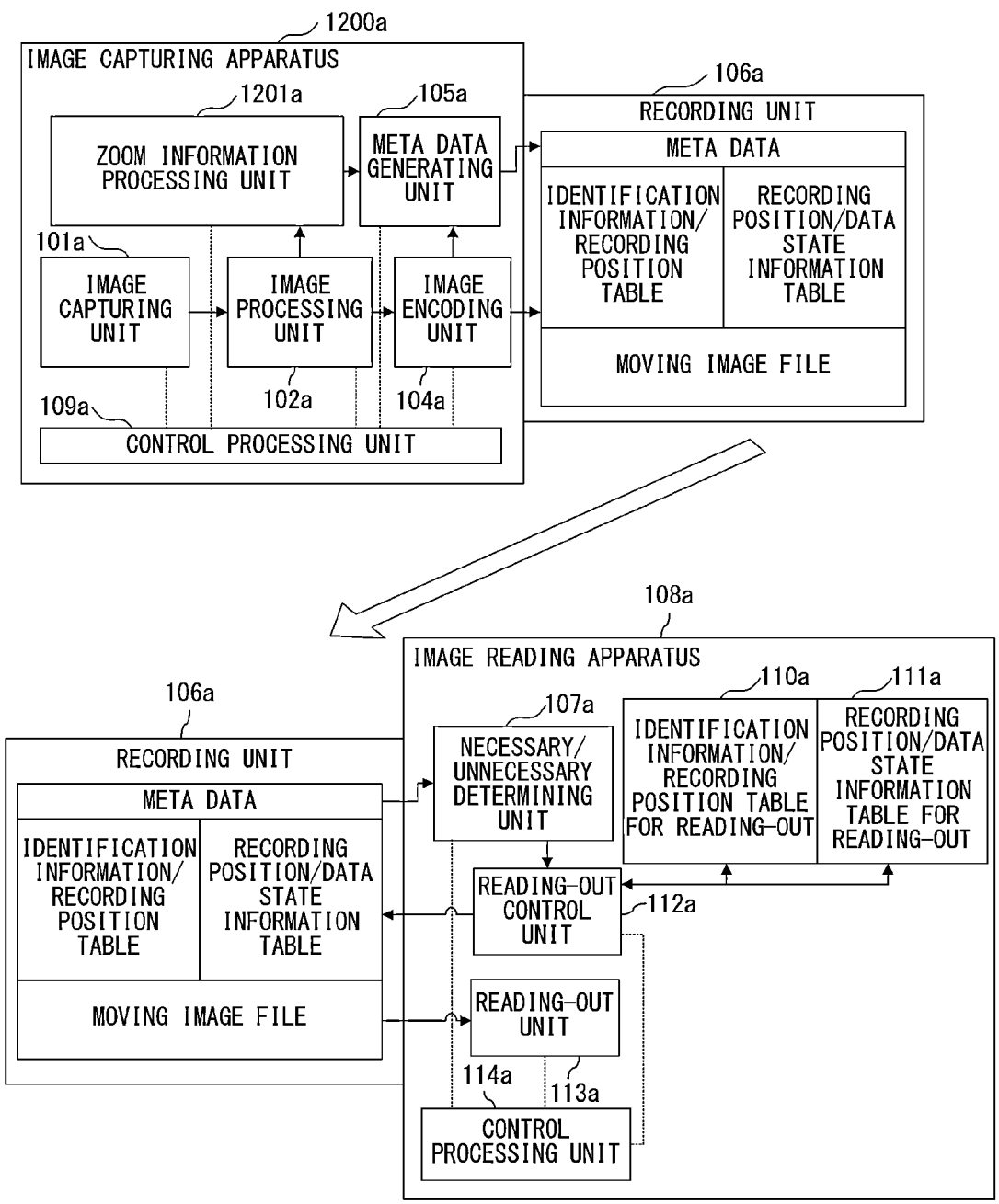
F I G. 3 2

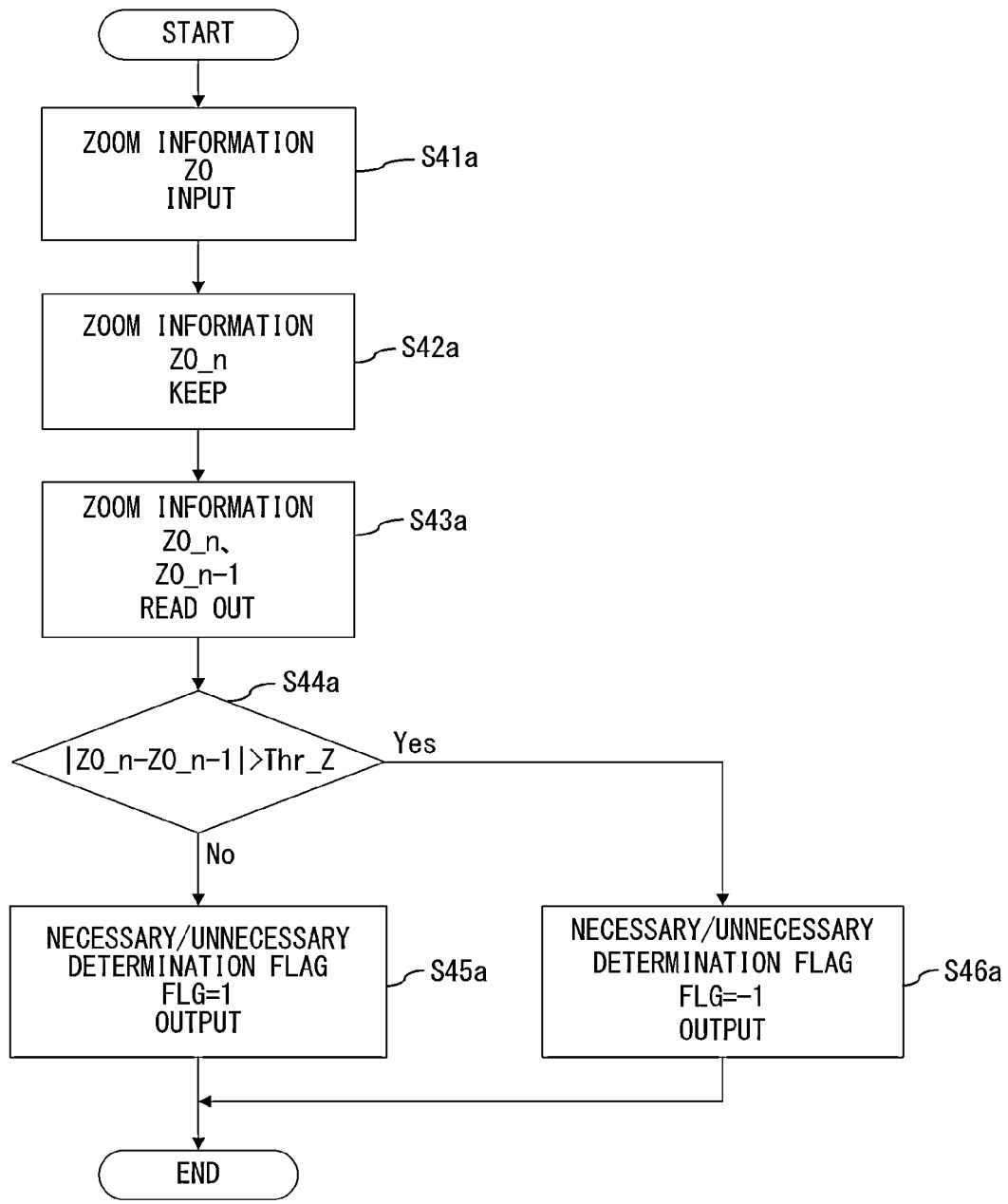
F I G. 33

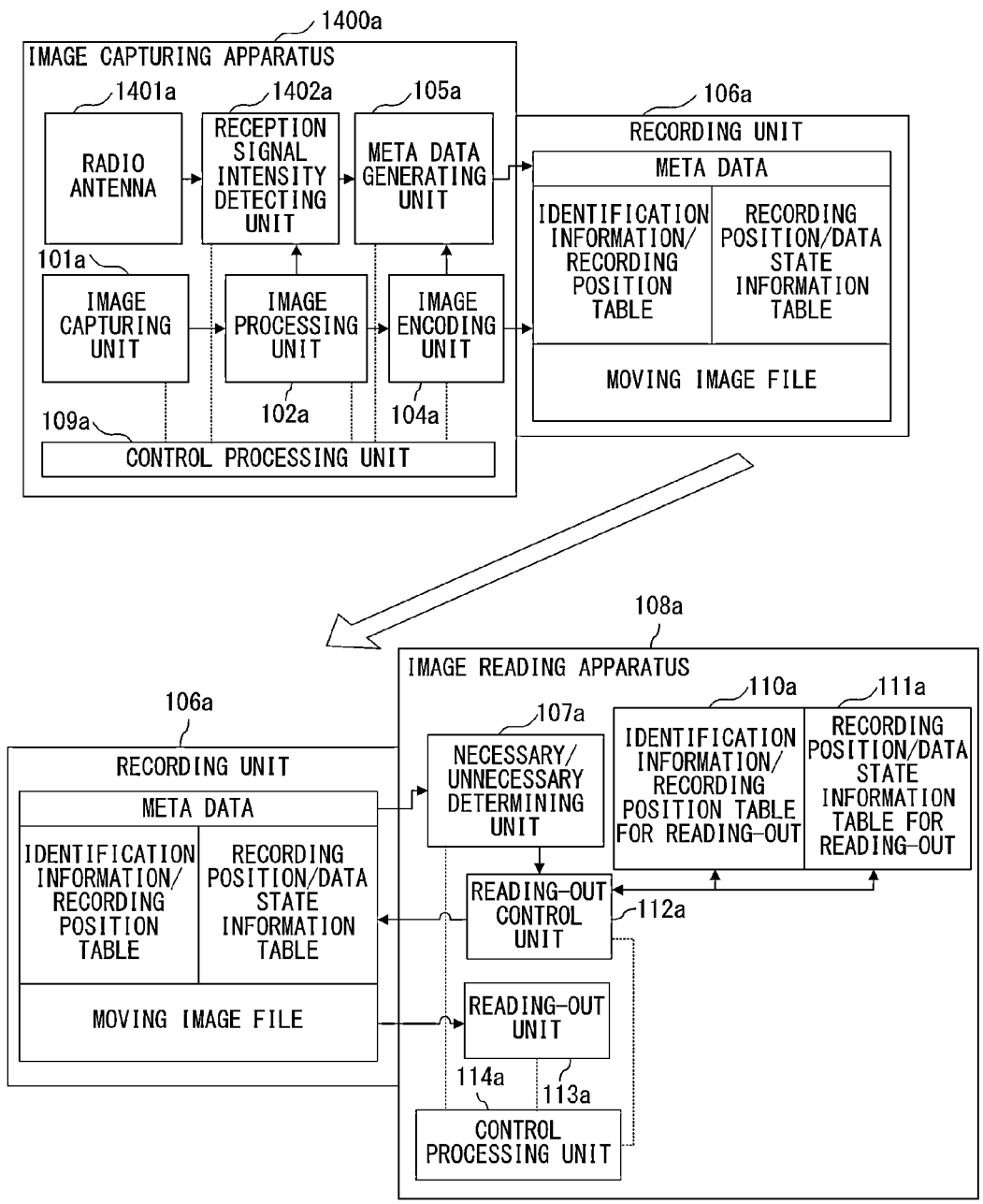
F I G. 3 4

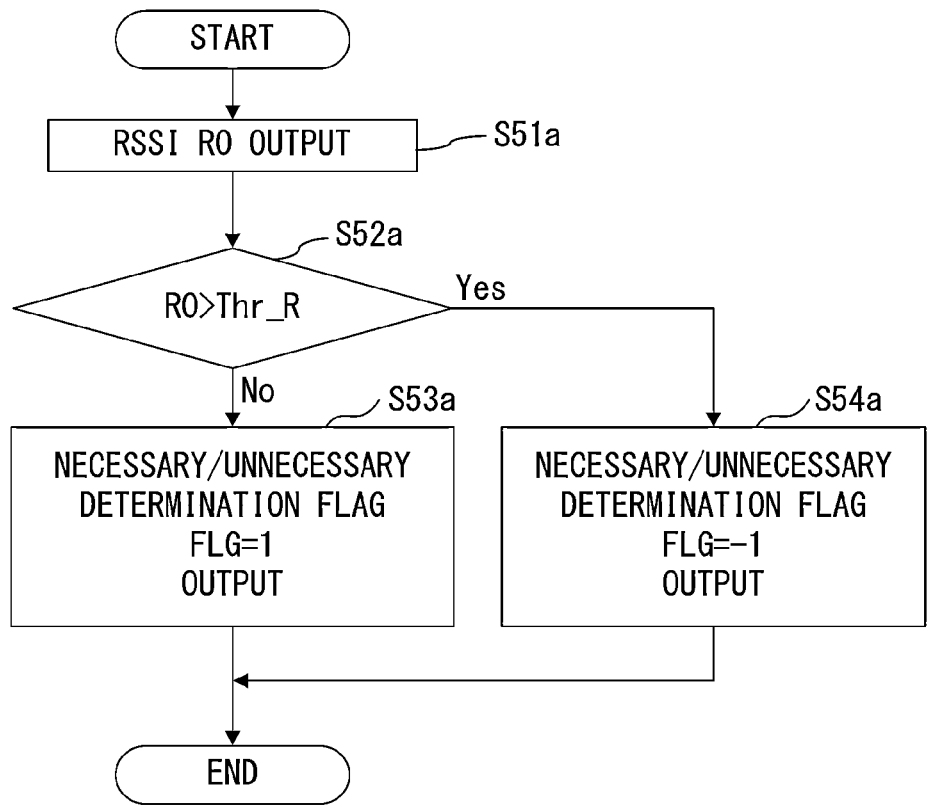
F I G. 3 5

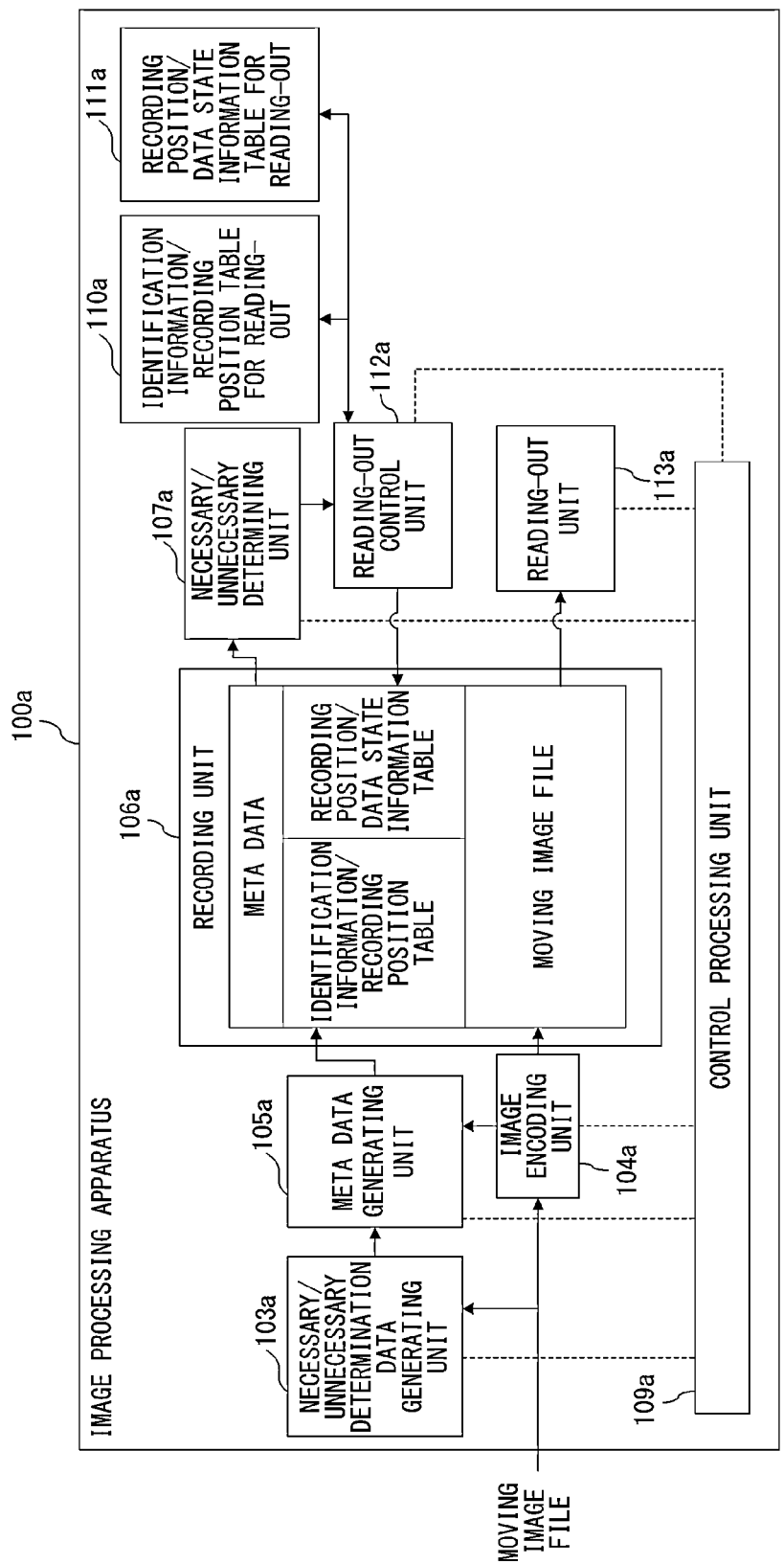
F I G. 37

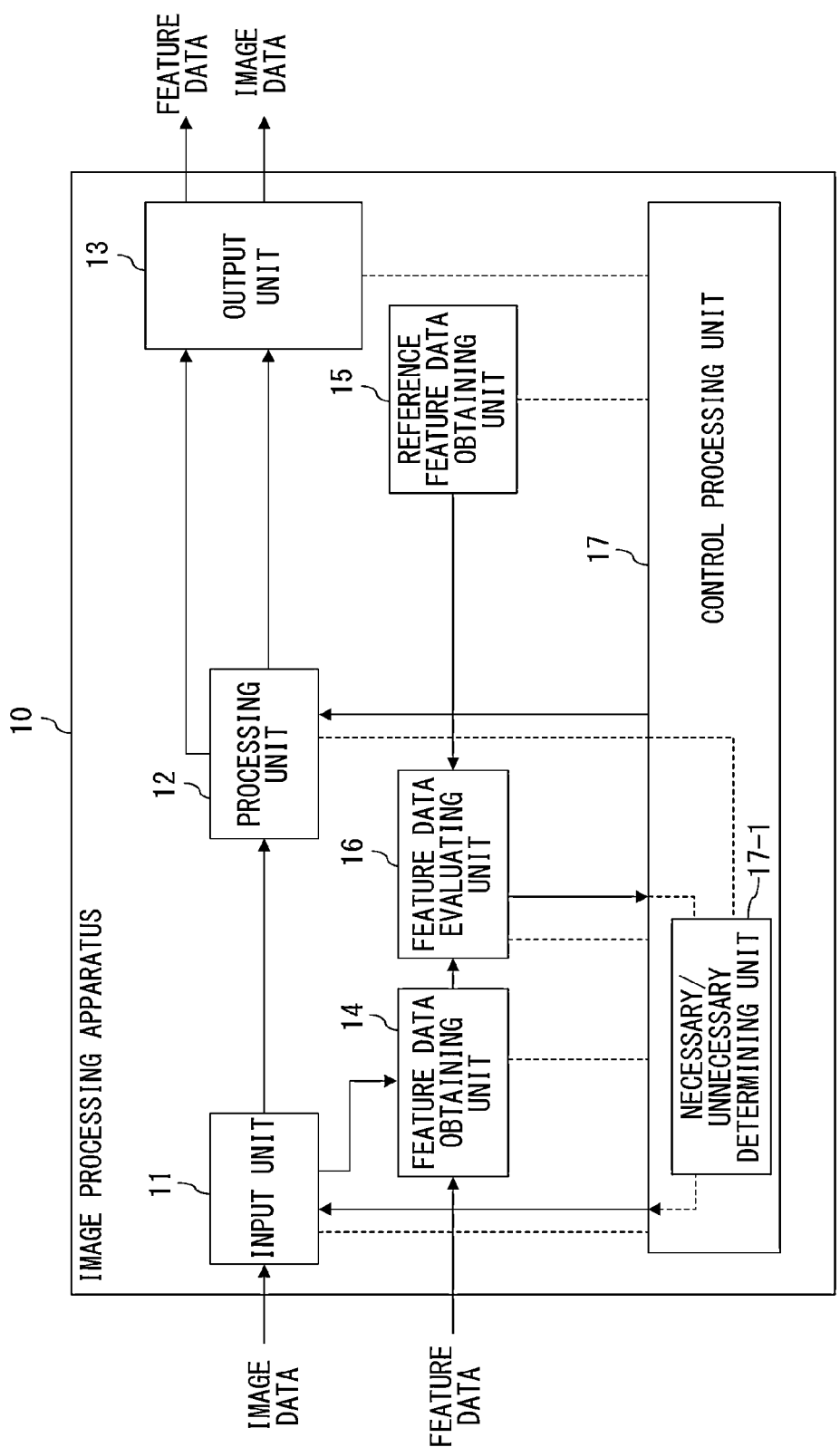
F I G. 38

| FEATURE TYPE | FEATURE DETERMINATION METHOD | REFERENCE FEATURE DATA |
|---|---|---|
| LUMINANCE HISTOGRAM | PEAK POSITION DETERMINATION | PEAK POSITION RANGE 10~245 |
| NUMBER OF FACE DETECTED | NUMBER OF FACE DETECTED DETERMINATION | ONE OR MORE |
| ⋮ | ⋮ | ⋮ |

F I G. 4 0

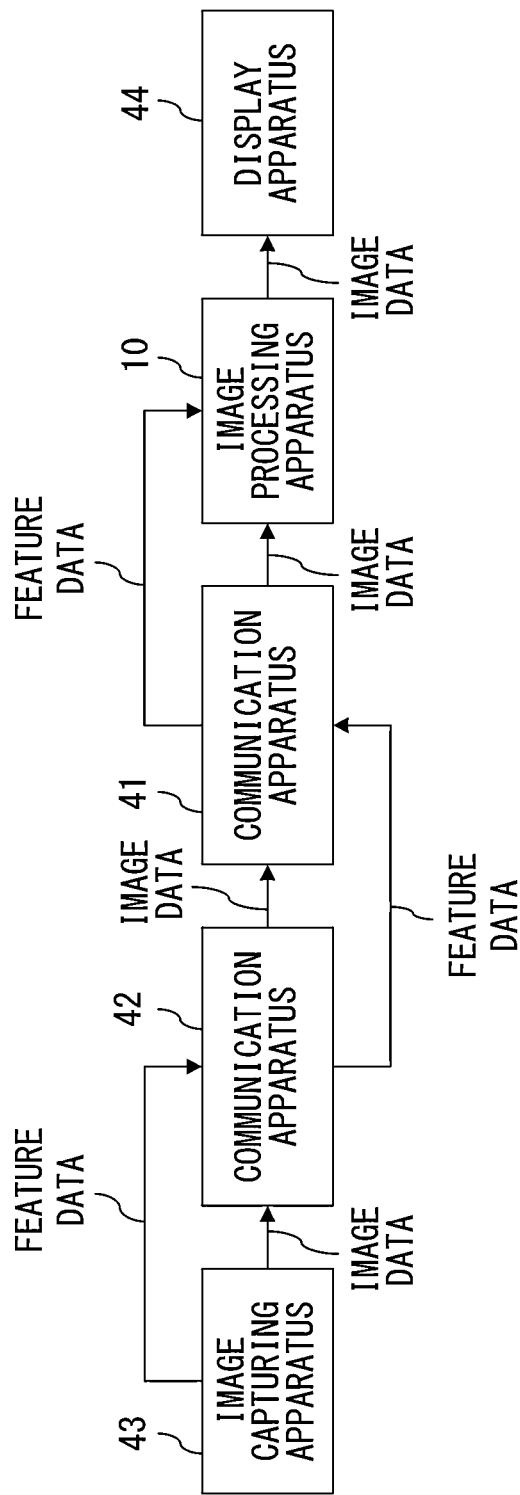
F I G. 41 A

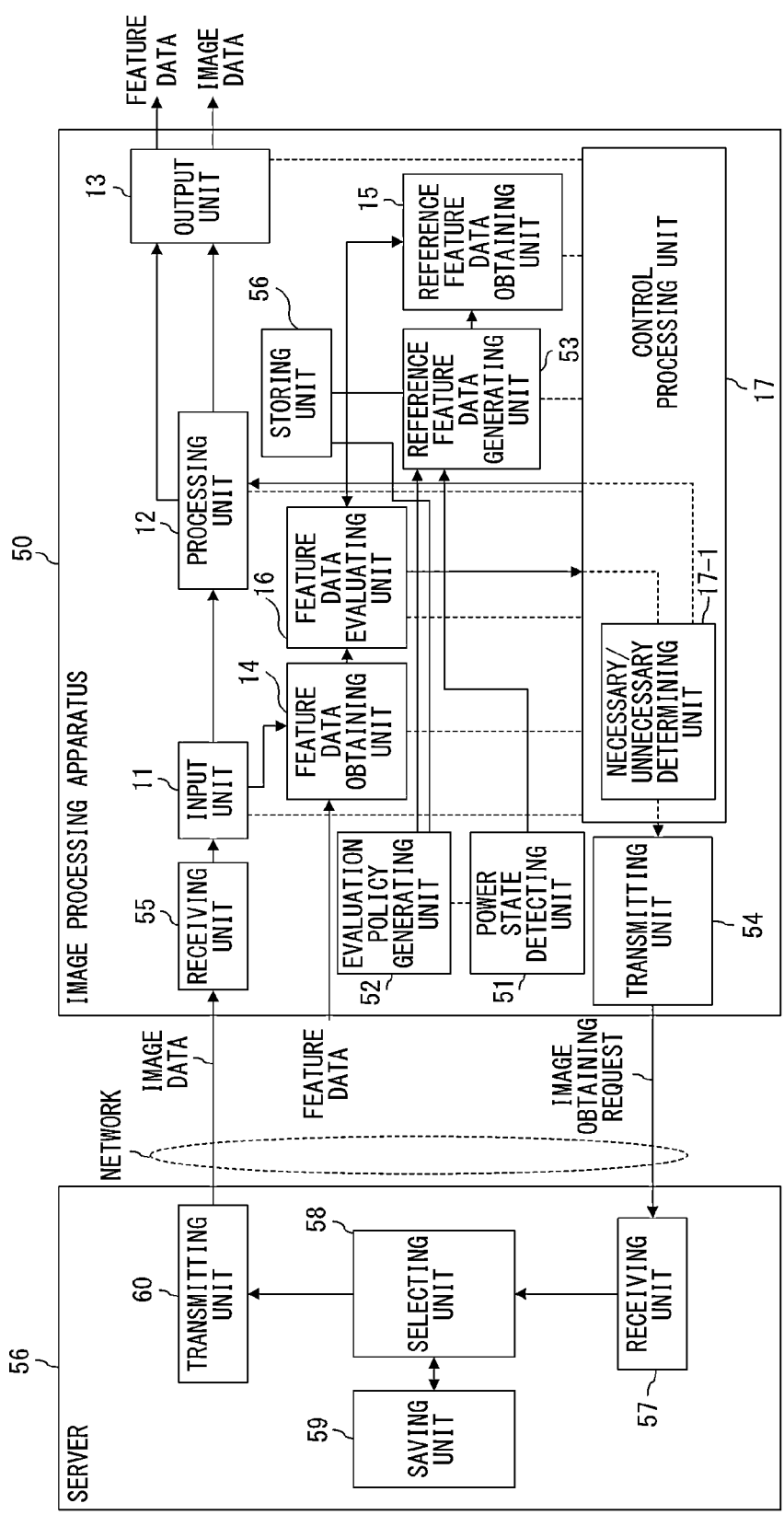
F I G. 42

| POWER TYPE | POWER REMAINING CAPACITY | FEATURE TYPE | FEATURE DETERMINATION METHOD | REFERENCE FEATURE DATA |
|---|---|---|---|---|
| DC | BELOW 20% | RESOLUTION | VALUE DETERMINATION | RESOLUTION: 640 × 480 OR BELOW |
| DC | 20% OR MORE | RESOLUTION | VALUE DETERMINATION | RESOLUTION: 1280 × 960 OR BELOW |
| AC | — | RESOLUTION | VALUE DETERMINATION | RESOLUTION: UNLIMITED |

F I G. 44

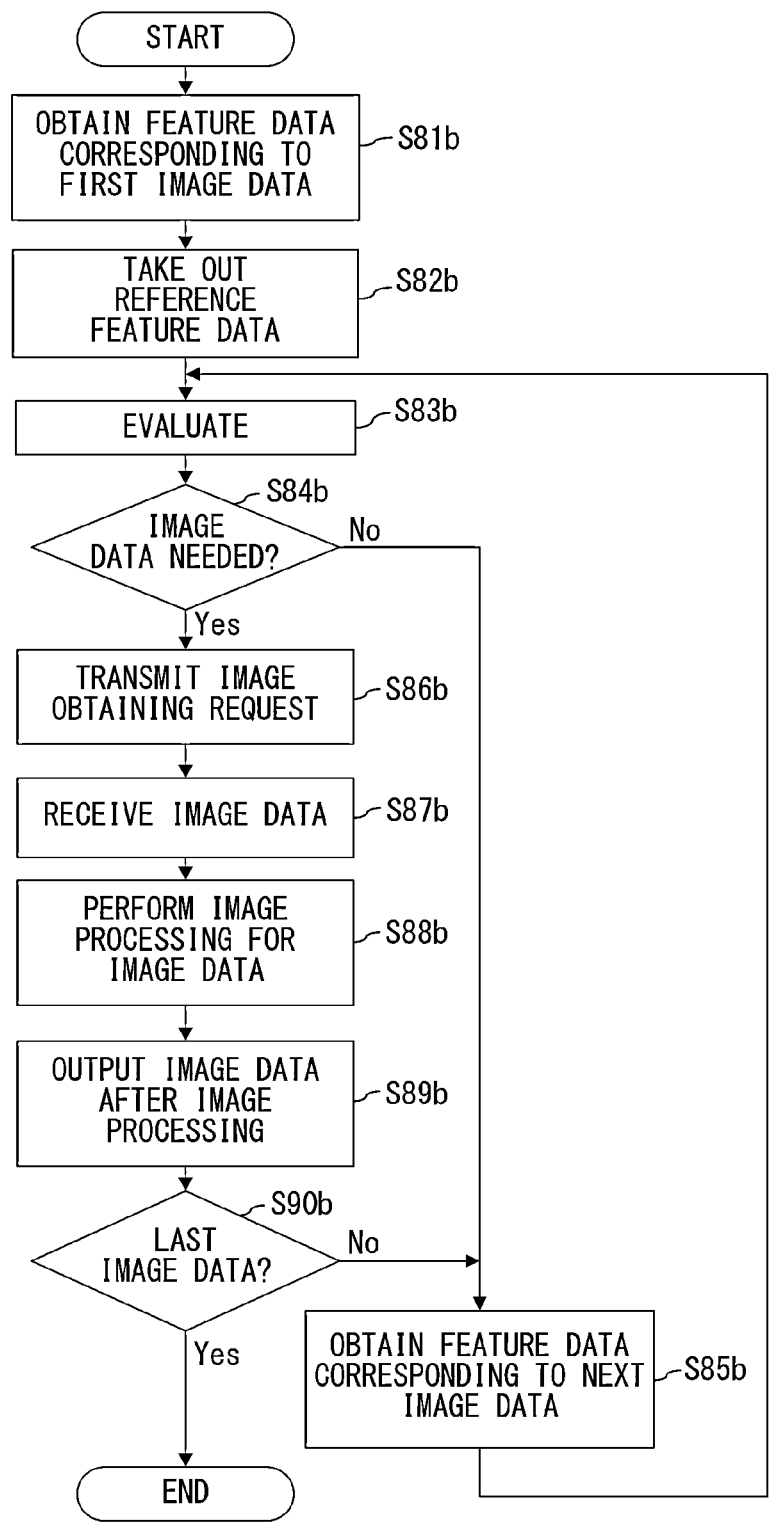
F I G. 45

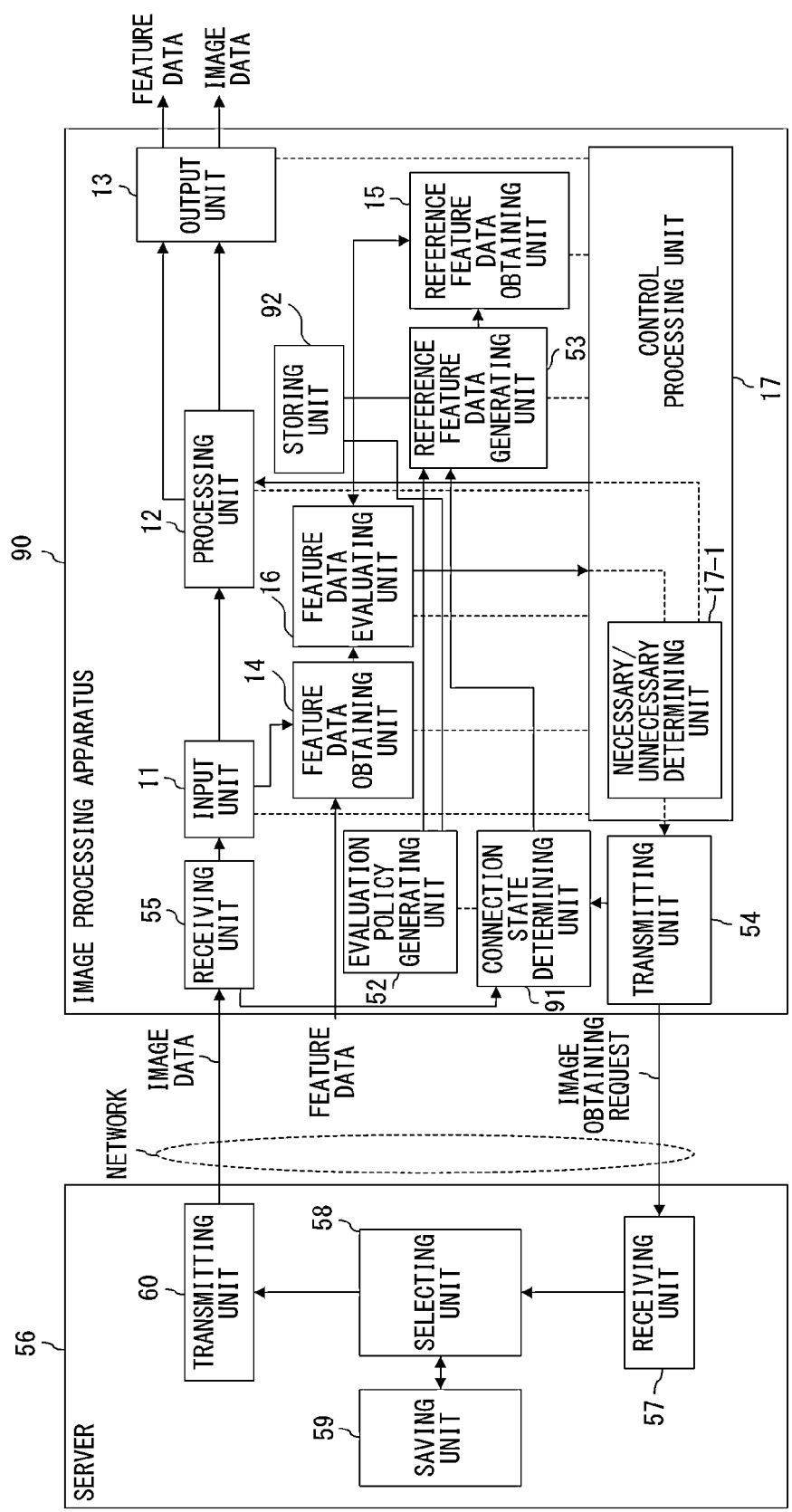
F I G. 46

| CONNECTION STATE | NETWORK TYPE | NETWORK OCCUPANCY | EVALUATION FORMULA | FEATURE ID | FEATURE TYPE | FEATURE DETERMINATION METHOD | REFERENCE FEATURE DATA |
|---|---|---|---|---|---|---|---|
| CONNECTION | WIRED | 50% OR MORE | 1 | 1 | RESOLUTION | VALUE DETERMINATION | RESOLUTION: 640×480 OR BELOW |
| CONNECTION | WIRELESS | 80% OR MORE | 2×3 | 2 | RESOLUTION | VALUE DETERMINATION | RESOLUTION: 640×480 OR BELOW |
| | | | | 3 | IMAGE SIZE | VALUE DETERMINATION | IMAGE SIZE: 20KB OR BELOW |

F I G. 4 8

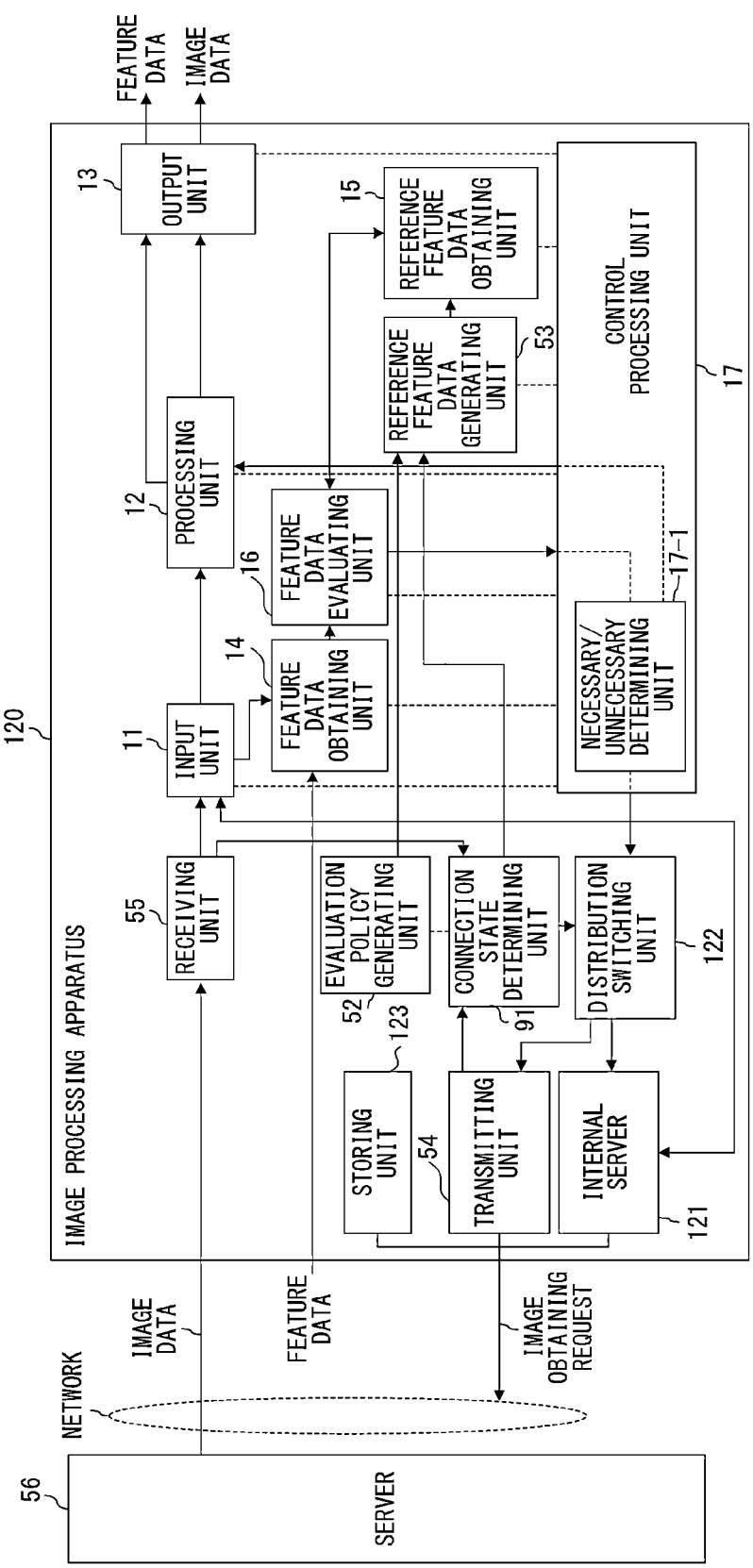
F I G. 49

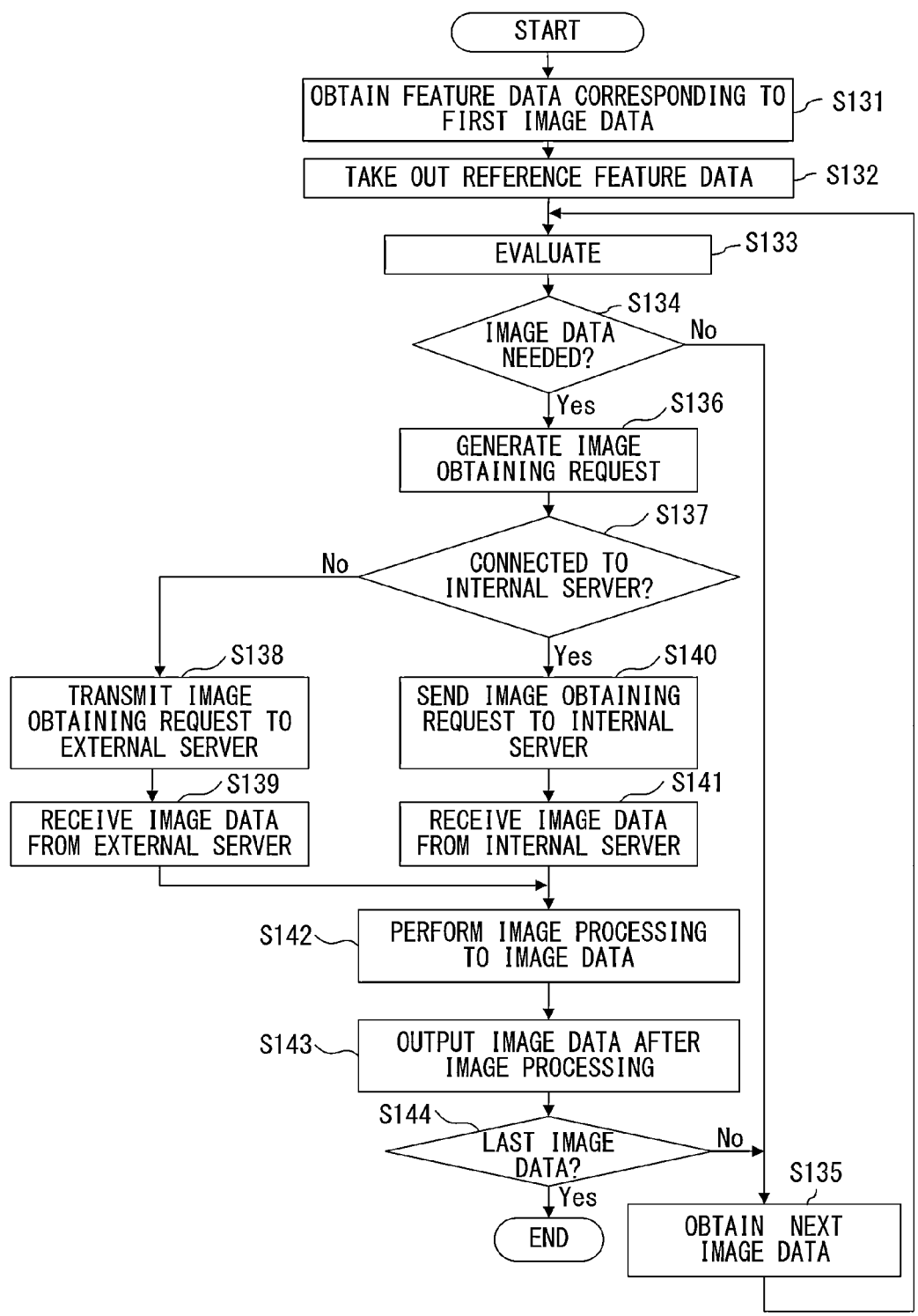
F I G. 50

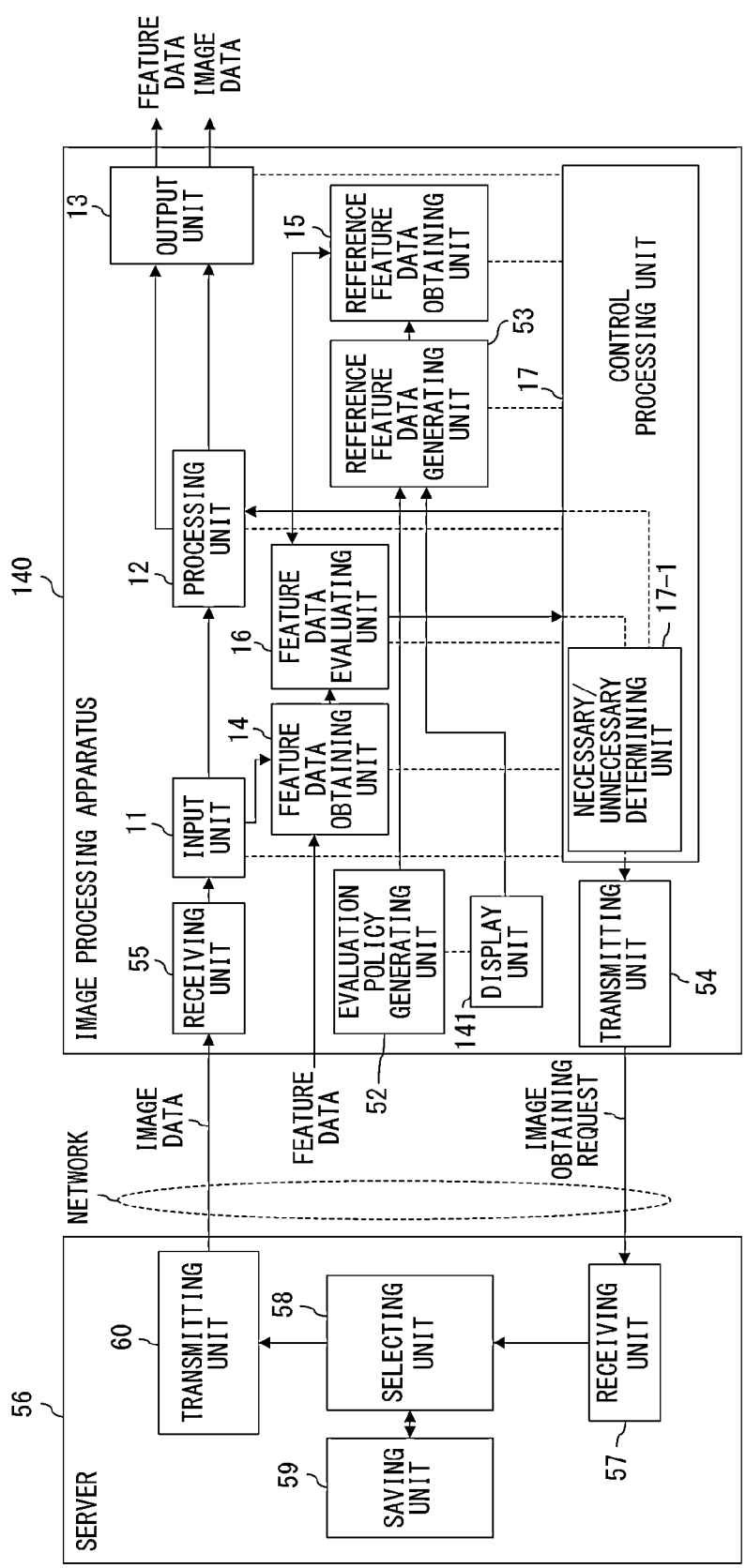
F I G. 51

|  | UPPER LIMIT VALUE OF CAMERA ACCELERATION | UPPER LIMIT VALUE OF CAMERA SPEED |
|---|---|---|
| BACKGROUND PRIORITY MODE | 1G OR BELOW | 1cm/s OR BELOW |
| SUBJECT PRIORITY MODE | 5G OR BELOW | 5cm/s OR BELOW |

F I G. 5 3 A

| | IMAGE EXTRACTION CRITERION | UPPER LIMIT VALUE OF CAMERA ACCELERATION | UPPER LIMIT VALUE OF CAMERA SPEED |
|---|---|---|---|
| PRO MODE | 5 FRAMES PRECEDING AND FOLLOWING SUBJECT-DETECTED FRAME | 5G OR BELOW | 5cm/s OR BELOW |
| AMATEUR MODE | SUBJECT-DETECTED FRAME ONLY | 1G OR BELOW | 1cm/s OR BELOW |

F I G. 53 B

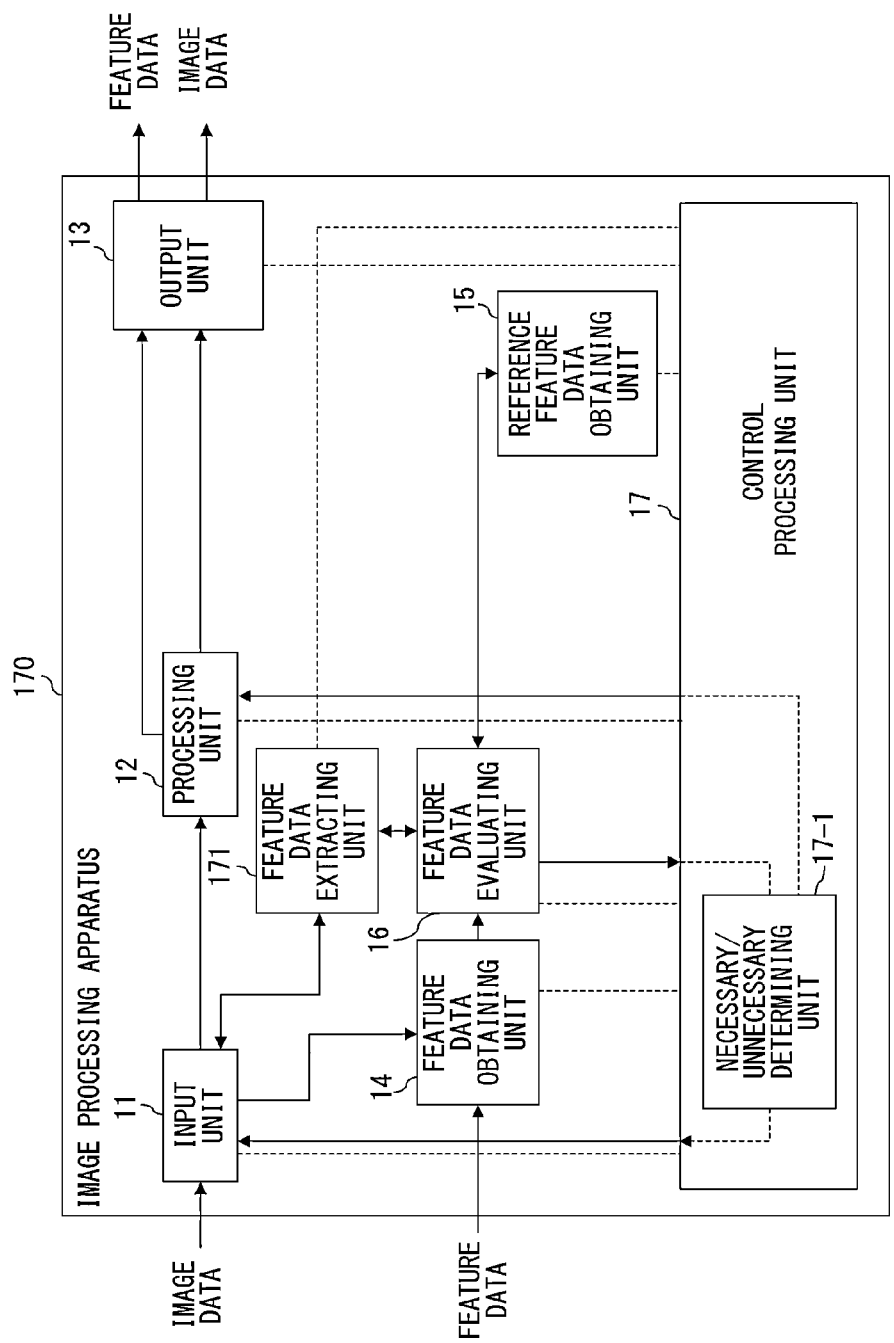
F I G. 54

IMAGE PROCESSING APPARATUS, IMAGE PROCESSING SYSTEM, AND IMAGE READING APPARATUS

CROSS-REFERENCE TO RELATED APPLICATION

This application claims benefit of Japanese Application No. 2011-207818 filed Sep. 22, 2011, this application claims benefit of Japanese Application No. 2011-207819 filed Sep. 22, 2011, and this application claims benefit of Japanese Application No. 2012-002581 filed Jan. 10, 2012, the contents of which are incorporated by this reference.

This application is a continuation of PCT application PCT/JP2012/074227, which was filed on Sep. 21, 2012.

FIELD

The present invention relates to a technique to automatically determine whether each moving image frame of moving images is necessary or unnecessary.

BACKGROUND

In recent years as the resolution and the speed of image capturing apparatuses become higher, the capacity of flash memories become greater and image processing circuits of image processing apparatuses become higher in speed and lower in power, long-time moving image capturing and long-time moving image playback at a high resolution are becoming possible.

However, in some cases such as when the user is not capturing images intentionally at the time of moving image capturing, and when moving images are captured for a long period of time so as not to miss anything in capturing, many unnecessary moving image frames are included in the moving images after capturing. Then, it puts a big load on the editing work and playback work as post-processes, which may decrease the efficiency of the editing work and playback work of moving images. For example, when many unnecessary moving image frames are included in a moving image file, it takes a large amount of troubles and time to find the desired moving image frame, and it takes a large amount of time to load the moving image file onto the editing program and the playback program.

For example, there is a technique to, when editing and playing back moving images, determine a moving image frame with a small amount of gradation change as an unnecessary moving image frame, in the respective moving image frames of a moving image file, and to delete the moving image frame automatically (for example, see Patent documents 1-3).

[Patent document 1] Japanese Laid-open Patent Publication No. 2008-182544

[Patent document 2] Japanese Laid-open Patent Publication No. 2005-295285

[Patent document 3] Japanese Laid-open Patent Publication No. 2000-209483

SUMMARY

An image processing apparatus of the present invention includes a necessary/unnecessary determination data generating unit configured to generate necessary/unnecessary determination data corresponding respectively to each moving image frame of an input moving image, used to determine whether or not the moving image frame is an unnecessary moving image frame; an image encoding unit configured to encode the input moving image, and also to divide each moving image frame of the moving image after encoding respectively into a plurality of pieces of data, and assign identification information respectively to, and record, in a recording unit, those pieces of data; a necessary/unnecessary determining unit configured to determine whether or not the moving image frame corresponding to the necessary/unnecessary determination data is an unnecessary moving image frame, based on the necessary/unnecessary determination data; and a moving image file managing unit configured to rewrite, in a table in the recording unit in which identification information recorded in the recording unit and information indicating a state of data at a recording position in the recording unit corresponding to the identification information are associated, information indicating a state of data at a recording position in the recording unit corresponding to identification information of a moving image frame determined as an unnecessary moving image frame by the necessary/unnecessary determining unit into information that there is no data.

Meanwhile, the image reading apparatus of the present invention includes a necessary/unnecessary determining unit configured to read out, from a recording unit in which necessary/unnecessary determination data corresponding respectively to each moving image frame of an input moving image, used to determine whether or not the moving image frame is an necessary moving image frame; each moving image frame of the moving image after encoding to which identification information is assigned; and meta data in which identification information assigned to the moving image frame and necessary/unnecessary determination data corresponding to the moving image frame are integrated, the meta data, and based on necessary/unnecessary determination data in the meta data, to determine whether or not a moving image frame corresponding to identification information in the meta data is a necessary moving image frame; and a reading-out control unit configured to, using a table in which identification information recorded in the recording unit and information indicating a recording position in the recording unit corresponding to the identification information, read out only a moving image frame recorded at which a recording position in the recording unit corresponding to identification information of a moving image frame determined as a necessary moving image frame by the necessary/unnecessary determining unit.

Meanwhile, an image processing system of the present invention is an image processing system including an image processing apparatus configured to record a moving image in a recording unit and an image reading apparatus configured to readout a moving image from the recording unit, where the image processing apparatus includes a necessary/unnecessary determination data generating unit configured to generate necessary/unnecessary determination data corresponding respectively to each moving image frame of an input moving image, used to determine whether or not the moving image frame is an necessary moving image frame; an image encoding unit configured to encode the input moving image, and assign identification information respectively to, and record, in a recording unit, each moving image frame of the moving image after encoding; and a meta data generating unit configured to generate, and record, in the recording unit, meta data by integrating identification information assigned to the moving image frame and necessary/unnecessary determination data corresponding to the moving image frame; and the image reading apparatus includes a necessary/unnecessary determining unit configured to read out meta data from the recording unit, and based on necessary/unnecessary determination data in the meta data, to determine whether or not a moving image frame corresponding to identification information in the meta data is a necessary moving frame; and a reading-out control unit configured to, using a table in which identification information recorded in the recording unit and information indicating a recording position in the recording unit corresponding to the identification information, read out only a moving image frame recorded at which a recording position in the recording unit corresponding to identification information of a moving image frame determined as a necessary moving image frame by the necessary/unnecessary determining unit.

Meanwhile, an image processing apparatus of the present invention includes a feature data obtaining unit configured to obtain feature data corresponding to image data; a reference feature data obtaining unit configured to obtain reference feature data; a feature data evaluating unit configured to perform evaluation of the feature data based on the reference feature data; a necessary/unnecessary determining unit configured to perform necessary/unnecessary determination of image data corresponding to the feature data based on the evaluation performed by the feature data evaluating unit; and a control processing unit configured to perform control based on the necessary/unnecessary determination.

Meanwhile, a computer-readable recording medium recording a program of the present invention makes a computer function as: a feature data obtaining unit configured to obtain feature data corresponding to image data; a feature data evaluating unit configured to perform evaluation of the feature data based on reference feature data obtained by the reference feature data obtaining unit; a necessary/unnecessary determining unit configured to perform necessary/unnecessary determination of image data based on the evaluation performed by a feature data evaluating unit; and a control processing unit configured to perform control based on the necessary/unnecessary determination.

Meanwhile, an image processing method of the present invention includes obtaining, by a feature data obtaining unit, feature data corresponding to image data; performing, by a feature data evaluating unit, evaluation of the feature data based on reference feature data obtained by the reference feature data obtaining unit; performing, by a necessary/unnecessary determining unit, necessary/unnecessary determination of image data corresponding to the feature data based on the evaluation and performing, by the control processing unit, control based on the necessary/unnecessary determination.

BRIEF DESCRIPTION OF DRAWINGS

FIG. 1 is a diagram illustrating an image processing apparatus of an embodiment of the present invention.

FIG. 3A is a diagram illustrating an example of a directory.

FIG. 3B is a diagram illustrating an example of FAT.

FIG. 3C is a diagram illustrating an example of FAT after information indicating the state of data is rewritten.

FIG. 4 is a diagram illustrating an example of a moving image frame, a unit of compression, and a cluster in a recording unit at the time of encoding in the MPEG format.

FIG. 5B is a diagram illustrating a variation example (part 1) of an image capturing apparatus of embodiment 1.

FIGS. 6A and 6B are a flowchart illustrating operations of a necessary/unnecessary determining unit of embodiment 1.

FIG. 7 is a diagram illustrating an example of a moving image frame determined as necessary and a moving image frame determined as unnecessary in embodiment 1.

FIG. 12 is a flowchart illustrating operations of a necessary/unnecessary determining unit of embodiment 3.

FIG. 14 is a flowchart illustrating operations of a necessary/unnecessary determining unit of embodiment 4.

FIG. 21 is a diagram illustrating an image processing system of another embodiment of the present invention.

FIG. 23A is a diagram illustrating an example of a directory.

FIG. 23B is a diagram illustrating an example of FAT.

FIG. 24 is a flowchart illustrating an example of operations of an image reading apparatus.

FIG. 25 is a diagram illustrating an example of a moving image frame, a unit of compression, and a cluster in a recording unit at the time of encoding in the MPEG format.

FIG. 26A is a diagram illustrating an image processing system including an image capturing apparatus as embodiment 1 of the image processing apparatus illustrated in FIG. 21.

FIG. 30 is a diagram illustrating an image processing system including an image capturing apparatus as embodiment 3 of the image processing apparatus illustrated in FIG. 21.

FIG. 31 is a flowchart illustrating operation of a necessary/unnecessary determining unit in an image processing system including an image capturing apparatus as embodiment 3 of the image processing apparatus illustrated in FIG. 21.

FIG. 32 is a diagram illustrating an image processing system including an image capturing apparatus as embodiment 4 of the image processing apparatus illustrated in FIG. 21.

FIG. 33 is a flowchart illustrating operation of a necessary/unnecessary determining unit in an image processing system including an image capturing apparatus as embodiment 4 of the image processing apparatus illustrated in FIG. 21.

FIG. 34 is a diagram illustrating an image processing system including an image capturing apparatus as embodiment 5 of the image processing apparatus illustrated in FIG. 21.

FIG. 35 is a flowchart illustrating operation of a necessary/unnecessary determining unit in an image processing system including an image capturing apparatus as embodiment 5 of the image processing apparatus illustrated in FIG. 21.

FIG. 37 is a diagram illustrating an image processing apparatus of another embodiment of the present invention.

FIG. 38 is a diagram illustrating an image processing apparatus of another embodiment of the present invention.

FIG. 40 is a diagram illustrating an example of data obtained by a reference feature data obtaining unit.

FIG. 41A is a diagram illustrating an example of peripheral apparatuses of an image processing apparatus.

FIG. 42 is a diagram illustrating another image processing apparatus of the present invention.

FIG. 44 is a diagram illustrating an example of data obtained by a reference feature data obtaining unit.

FIG. 45 is a flowchart illustrating an example of operations of a control processing unit illustrated in FIG. 42.

FIG. 46 is a diagram illustrating an image processing apparatus of another embodiment of the present invention.

FIG. 48 is a diagram illustrating an example of data obtained by a reference feature data obtaining unit.

FIG. 49 is a diagram illustrating an image processing apparatus of another embodiment of the present invention.

FIG. 50 is a flowchart illustrating an example of operations of a control processing unit illustrated in FIG. 49.

FIG. 51 is a diagram illustrating an example of an image processing apparatus of another embodiment of the present invention.

FIG. 53A is a diagram illustrating an example of data obtained by a reference feature data obtaining unit.

FIG. 53B is a diagram illustrating an example of data obtained by a reference feature data obtaining unit.

FIG. 54 is a diagram illustrating an image processing apparatus of another embodiment of the present invention.

DESCRIPTION OF EMBODIMENTS

Figure 2:
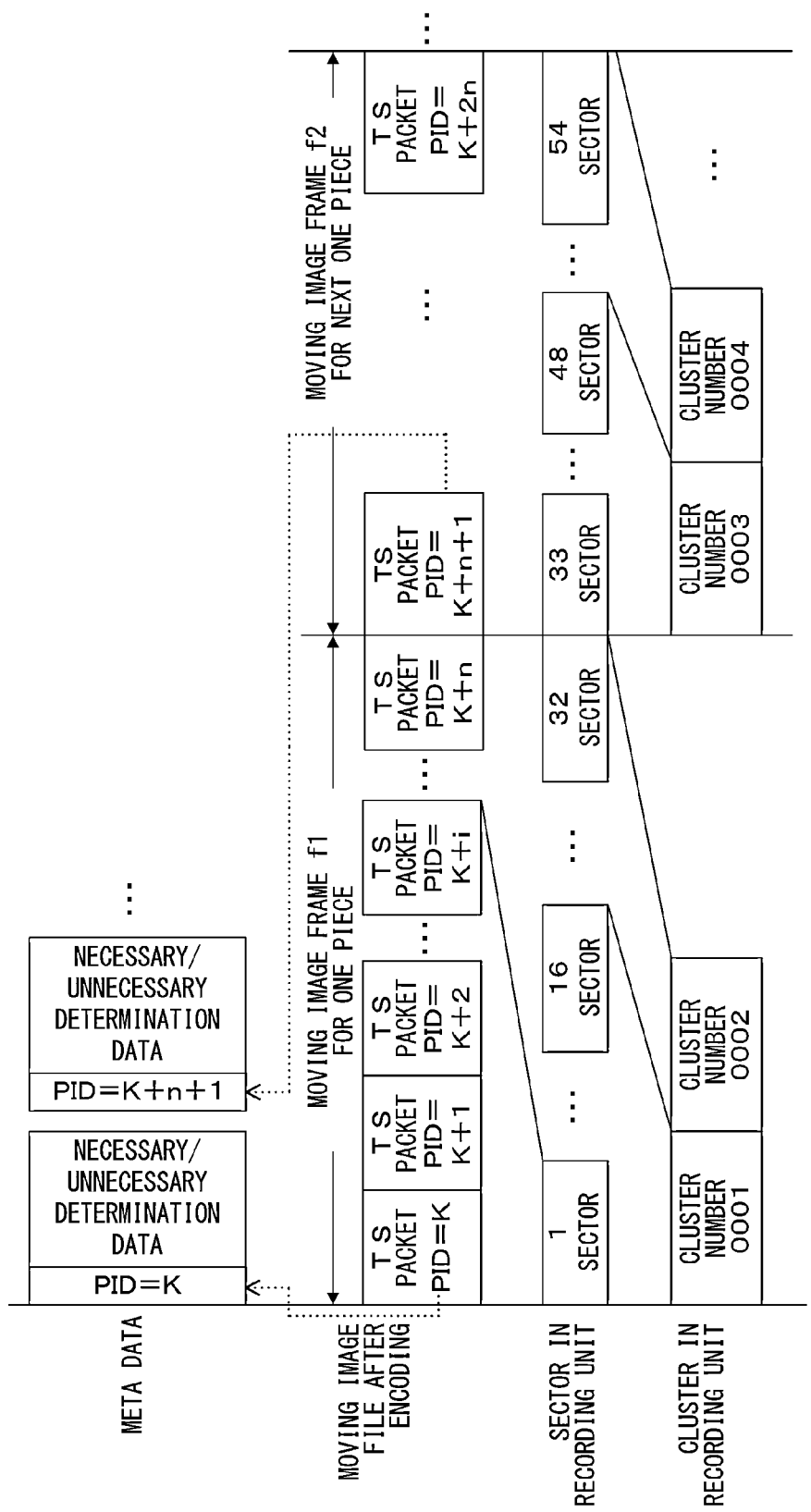
FIG. 2 is a diagram illustrating an example of meta data, a moving image frame, a sector in a recording unit, and a cluster in a recording unit.

FIG. 1 is a diagram illustrating an image processing apparatus of an embodiment of the present invention.

The image processing apparatus 100 of FIG. 1 includes a necessary/unnecessary determination data generating unit 103, an image encoding unit 104, a meta data generating unit 105, a recording unit 106, a necessary/unnecessary determining unit 107, a moving image file managing unit 108, a control processing unit 109. Meanwhile, the control processing unit 109 is supposed to control operations of each unit in the image processing apparatus 100.

The necessary/unnecessary determination data generating unit 103 generates necessary/unnecessary determination data used to determine whether or not it is an unnecessary moving image frame respectively corresponding to each of moving image frame of a moving image file input from outside (for example, an image capturing apparatus, an external recording unit, and the like) to the image processing apparatus 100.

The image encoding unit 104 encodes moving images input from outside to the image processing apparatus 100, and also, while dividing each moving image frame of the moving images after encoding into a plurality of pieces of data respectively, assigns identification information to those pieces of data and records them in the recording unit 106. For example, the image encoding unit 104 performs encoding of input moving images, as illustrated in FIG. 2, in the MPEG2 (Moving Picture Experts Group phase 2) format, and while dividing each moving image frame of the moving images after encoding respectively into a plurality of TS (Transport Stream) packets, assigns "identification information PID (Packet Identification)" (K, K+1, . . . ) respectively to the TS packets, and records them in the recording unit 106.

Meanwhile, the recording unit 106 illustrated in FIG. 1 may be a recording unit (for example, a hard disc, RAM (Random Access Memory)) that is built in the image processing apparatus 100, an external recording unit (for example, a medium such as CD-R (Rewritable Compact Disc), DVD-R (Rewritable Digital Versatile Disc), a memory card, or a USB memory and the like) and the like that maybe inserted/removed to/from the image processing unit 100, and for example, is constituted by a non-volatile memory, or a flash memory In addition, the recording unit 106 includes an identification information/recording position table that indicates correspondence between identification information assigned respectively to each piece of data in the image encoding unit 104 and information indicating the recording position in the recording unit 106. For example, as illustrated in FIG. 3A, the recording unit 106 includes an identification information/recording position table that indicates correspondence between the identification information PID and the cluster number indicating the position of the cluster in the recording unit 106.

In addition, the recording unit 106 includes a recording position/data state information table that indicates correspondence between information indicating the recording position in the recording unit 106 and information indicating the state of the data at each recording position (for example, when data continues to another recording position, information indicating the recording position, information indicating that data ends at the recording position, or information indicating that there is no data at the recording position). For example, as illustrated in FIG. 3B, the recording unit 106 includes a FAT (File Allocation Table) as a recording position/data state information table that indicates correspondence between the cluster number indicating the position of the cluster in the recording unit 106 and information indicating the state of data at each cluster number (for example, when data continues to another cluster, the cluster number indicating the cluster position, information: "FFFF" indicating that data ends at the cluster, or information: "0000" indicating that there is no data in the cluster).

The meta data generating unit 105 generates meta data by integrating one piece of identification information in the identification information assigned respectively to the respective pieces of data after division of the moving image frame after encoding, and necessary/unnecessary determination data corresponding to the moving image frame. For example, as illustrated in FIG. 2, the meta data generating unit 105 generates meta data corresponding to a moving image frame f1 by integrating identification information PID=K of the top TS packet in the respective TS packets after the division of a moving image frame f1 after encoding, and necessary/unnecessary determination data corresponding to the moving image frame f1. In addition, the meta data generating unit 105 generates meta data corresponding to a moving image frame f2 by integrating identification information PID=K+n+1 of the top TS packet in the respective TS packets after the division of a moving image frame f2 after encoding, and necessary/unnecessary determination data corresponding to the moving image frame f2. Meanwhile, the identification information PID integrated with the necessary/unnecessary determination data is not limited to the identification information PID of the top TS packet in the respective TS packet after the division of the moving image frame after encoding.

Based on the necessary/unnecessary determination data in meta data, the necessary/unnecessary determining unit 107 determines whether or not the moving image frame corresponding to the identification information in the meta data is an unnecessary moving image frame.

The moving image file managing unit 108 identifies the recording position in the recording unit 106 corresponding to the identification information of the moving image frame determined by the necessary/unnecessary determining unit 107 as an unnecessary moving image frame, using the identification information/recording position table in the recording unit 106. In addition, the moving image file managing unit 108 identifies information indicating the state of data corresponding to the identified recording position, using the recording position/data state information table in the recording unit 106, and rewrite the identified information indicating the state of data into information indicating that there is no data.

For example, when the moving image frame f2 illustrated in FIG. 2 is determined as unnecessary, the moving image file managing unit 108 identifies "0003" as the cluster number indicating the position of the cluster in the recording unit 106 corresponding to the identification information PID=K+n+1 of the moving image frame f2, using the directory illustrated in FIG. 3A. Next, the moving image file managing unit 108 rewrite the information "0004" indicating the state of data at the identified cluster number "0003" into "0000', using the FAT illustrated in FIG. 3B, and also rewrites the information "FFFF" indicating, in a case in which the moving image frame f2 is also recorded in another cluster, the state of data at the cluster number "0004" indicating the position of the cluster into "0000'.

Meanwhile, the recording unit 106 may include a table in which all the pieces identification information recorded in the recording unit 106, and information that indicates the state of data at the recording position of the recording unit 106 corresponding respectively to each of the pieces of identification information. In addition, in this case, the moving image file managing unit 108 may be configured to, using the table, rewrite information that indicates the state of data at the recording position in the recording unit 106 corresponding to the identification information of a moving image frame determined as an unnecessary moving image frame by the necessary/unnecessary determining unit 107 into information indicating that there is no data.

Since the image processing apparatus 100 of an embodiment of the present invention is configured to rewrite information that indicates the state of data at the recording position in the recording unit 106 corresponding to the moving image frame determined as an unnecessary moving image frame in the respective moving image frames of moving images into information indicating that there is no data, in the stage before the editing work and playback work, when reading out moving images from the recording unit 106 at the time of editing and playing back the moving images, those other than the unnecessary moving image frame are read out. Thus, since the unnecessary moving image frame may be removed from the moving image file in the stage before the editing work and the playback work, the time taken to load the moving image file onto the editing program and the playback program may be shortened at the time of editing work and the playback work, and the decrease in the efficiency of the editing work and the playback work may be suppressed.

In addition, since the image processing apparatus 100 of the embodiment of the present invention only rewrite the information that indicates the state of data at the recording position in the recording unit 106, to read out those other than the unnecessary moving image frame from the recording unit 106, the data processing amount may be reduced, and the load put on the image processing apparatus 100 may be suppressed.

In addition, since the image processing apparatus 100 of the embodiment of the present embodiment uses identification information assigned to each piece of data after the division of the moving image frame after encoding, to identify the recording position in the recording unit 106 corresponding to the unnecessary moving image frame, the data processing amount may be reduced, and the load put on the image processing apparatus 100 may be suppressed.

Meanwhile, the necessary/unnecessary determining unit 107 may be configured to send top information Ki indicating the top moving image frame in a plurality of successive unnecessary moving image frames, and last information Kj indicating the last moving image frame to the moving image file managing unit 108. That is, a flag indicating the top of moving images determined as unnecessary, and a flag indicating the last, may be described on the identification information PID. In this case, the moving image file managing unit 108 rewrites information that indicates the state of data at the recording position in the recording unit 106 corresponding respectively to the top information Ki and the last information Kj into information indicating that there is no data and also, rewrites information that indicates the state of data at the recording position in the recording unit 106 corresponding to the moving image frames between the respective moving image frames corresponding to the top information Ki and the last information Kj into information that there is no data. In addition, the moving image file managing unit 108 may also be configured to rewrite, when both of the flag indicating the top of the unnecessary moving image frames and the flag indicating the last of the unnecessary moving image frames are present, information that indicates the state of data at the recording position in the recording unit 106 corresponding to the identification information of the moving image frame that exits between the top of the unnecessary moving image frames and the last of the unnecessary moving image frames into information indicating that there is no data.

In addition, regarding the timing of the rewriting of data of the recording unit 106 mentioned above, the rewriting of data may be performed when the pair of the flag indicating the top of unnecessary determination and the flag indicating the last is received.

In addition, in the image encoding unit 104, when encoding in the MPEG format is performed to input moving images, for example, as illustrated in FIG. 4, encoding is performed in the unit of compression (for example, I frame (Intra Picture), B1 frame-B3 frame (Bidirectionally Predictive Picture), P frame (Predictive Picture)) of SH (Sequence Header) and GOP (Group Of Picture). In such a case, the moving image file managing unit 108 writes all the pieces of information that indicates the state of data at the recording position in the recording unit 106 corresponding to the range from the GOP in which the top frame of unnecessary moving image is included to GOP in which the last frame of unnecessary moving image is included into information indicating that there is no data. In the example in FIG. 4, all the pieces of information that indicates the state of data at the recording position in the recording unit 106 corresponding to the range from the cluster number "0002" corresponding to GOP in which the top frame B1 of unnecessary moving image is included to the cluster number "0014" corresponding to GOP in which the last frame B2 of unnecessary moving image is included are rewritten into "0000".

In addition, the recording unit 106 may include a table for recovery with the same content as the FAT. In this case, the moving image file managing unit 108 is able to get information indicating the state of data at the recording position in the recording unit 106 corresponding to the identification information of data being the recovery target back to the original information, using the table for recovery. Accordingly, even after a determination as an unnecessary moving image frame is made and information that indicates the state of data at the recording position in the recording unit 106 corresponding to the identification information of the moving image frame is rewritten into information indicating that there is no data, the moving image frame may be put back to the state being available to be read out.

Figure 5A:
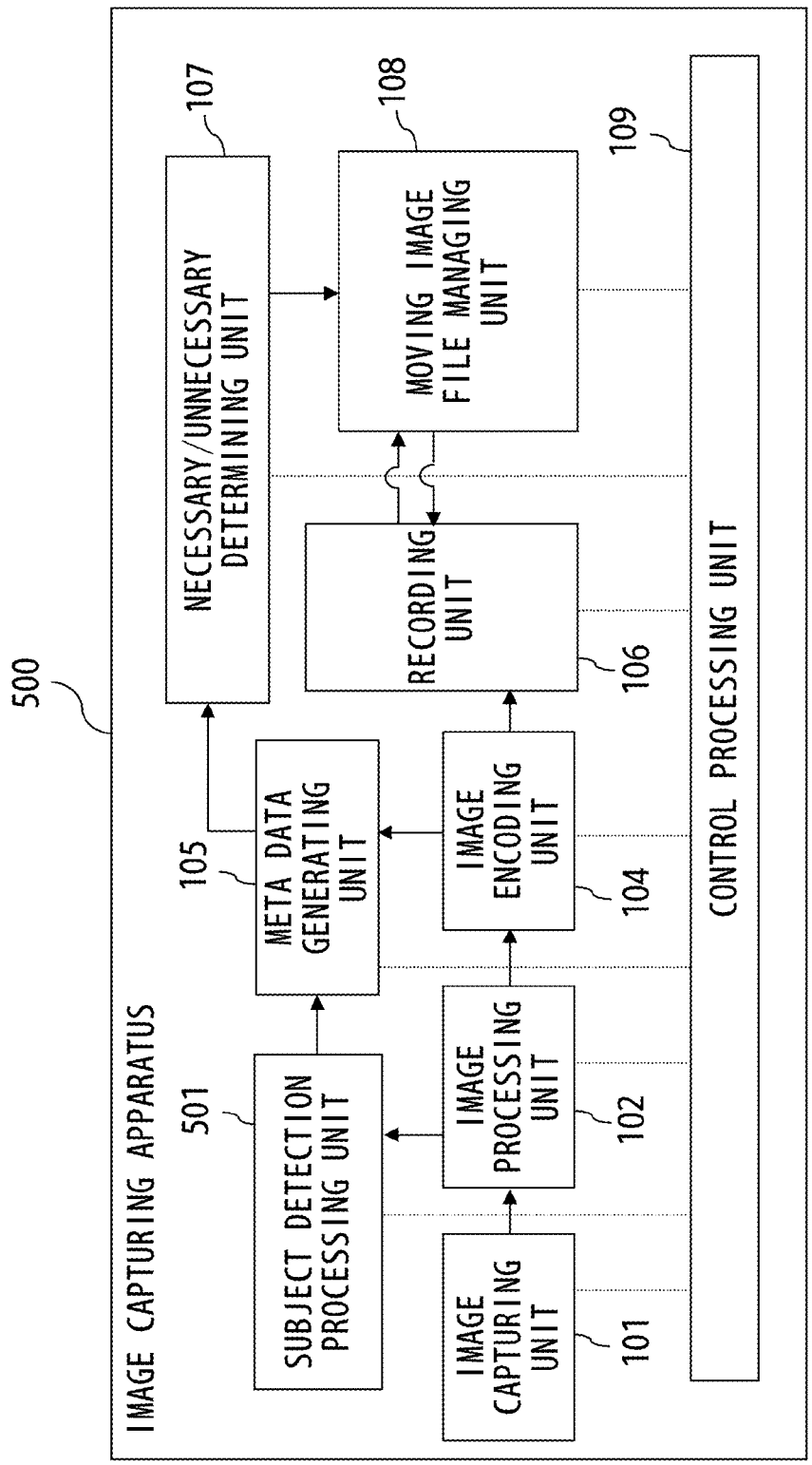
FIG. 5A is a diagram illustrating an image capturing apparatus of embodiment 1.

FIG. 5A is a diagram illustrating an image capturing unit 500 being embodiment 1 of the image processing apparatus 100 illustrated in FIG. 1. Meanwhile, to the same configuration as the configuration illustrated in FIG. 1, the same numeral is assigned and explanation for the configuration is omitted.

The image capturing unit 500 illustrated in FIG. 5A includes an image capturing unit 101, an image processing unit 102, a necessary/unnecessary determination data generating unit 103, an image encoding unit 104, a meta data generating unit 105, a recording unit 106, a necessary/unnecessary determining unit 107, a moving image file managing unit 108, and a control processing unit 109.

The image capturing unit 101 converts the subject image whose image is formed on the imaging device such as the CCD (Charge Coupled Device) by the lens into an electric signal, to obtain moving images composed of still image frames or a plurality of moving image frames.

The image processing unit 102 performs various image processing such as sharpness correction, contrast correction, luminance/chrominance signal generation and white balance correction, to the still image or each moving image frame of the moving image obtained by the image capturing unit 101.

The image encoding unit 104 performs encoding in the JPEG (Joint Photographic Experts Group) format to the still image frame after image processing. In addition, the image encoding unit 104 performs encoding in the MPEG format and the like to the moving image after image processing.

The image capturing unit 500 illustrated in FIG. 5A is characterized in that a subject detection processing unit 501 is included as the necessary/unnecessary determination data generating unit 103, and by the subject detection processing unit 501, in each moving image frame of the moving image after image processing, respectively, the "position of the subject" and the "size of the subject" as the necessary/unnecessary determination data are detected, and the meta data generating unit 105, the detected "position of the subject" and the "size of the subject" and the identification information PID are integrated, and output to the necessary/unnecessary determining unit 107 as meta data.

Figure 6A:
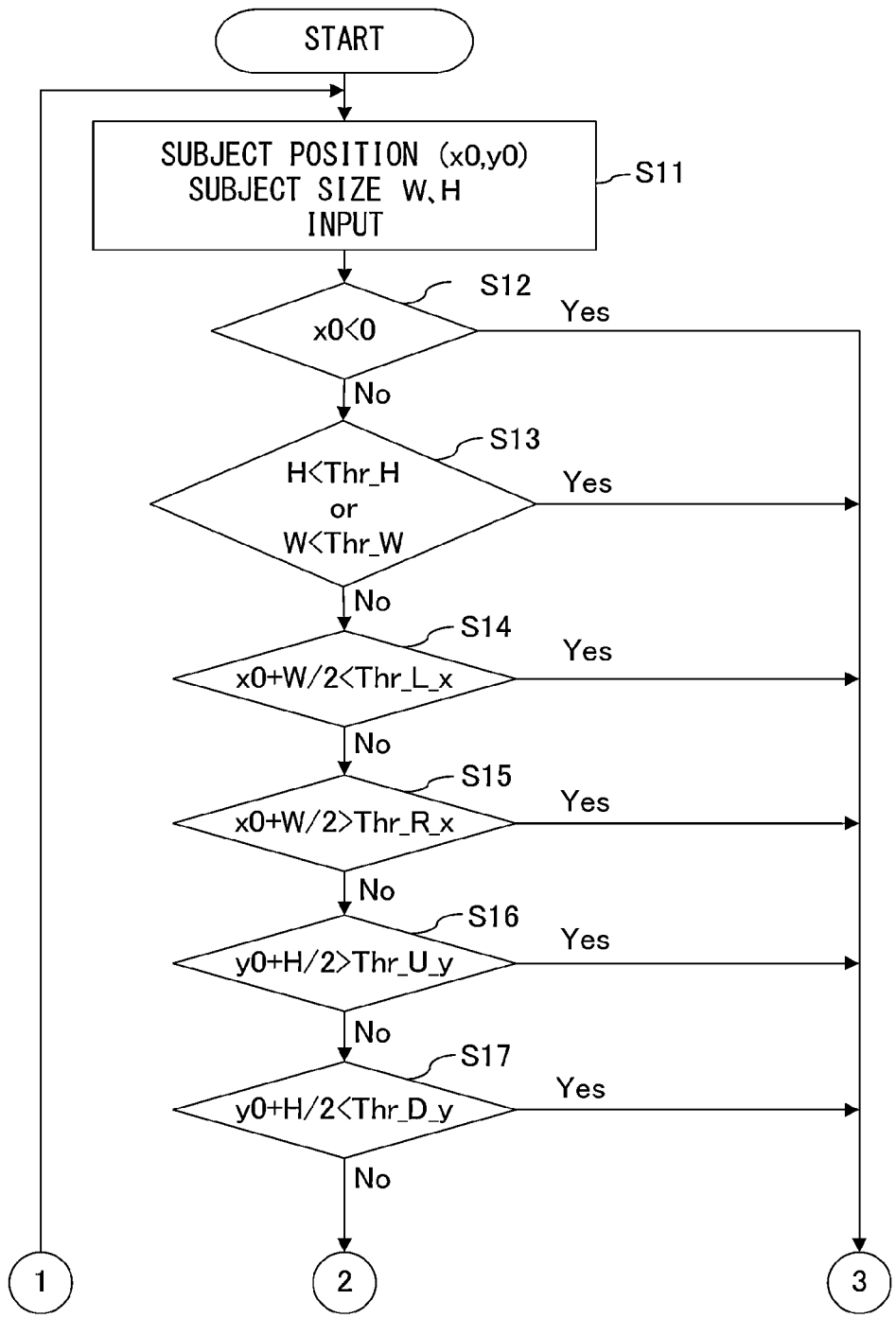

FIGS. 6A and 6B are a flowchart illustrating an example of operations of the necessary/unnecessary determining unit 107 in the image capturing unit 500 illustrated in FIG. 5A.

First, when the image capturing unit 101 starts obtaining the moving image frame and the meta data generating unit 105 starts outputting meta data, the necessary/unnecessary determining unit 107 inputs the "position of the subject" and the "size of the subject" (S11). Meanwhile, after detecting the subject within the moving image frame after image processing, the subject detection processing unit 501 regards a rectangular area enclosing the detected subject as the subject area, and regards the upper-left pixel position (x0, y0) of the subject area as the "position of the subject". In addition, the subject detection processing unit 501 regards the number of pixels in the lateral direction of the subject area as W as the "size of the subject", and also regards the number of pixels in the vertical direction of the subject area as H. Meanwhile, when no subject is detected from the moving image frame, the subject detection processing unit 501 makes x0 a smaller value than 0. In addition, the upper-left pixel position of the moving image frame is regarded as (1, 1).

Next, the necessary/unnecessary determining unit 107 judges whether or not x0 is smaller than 0, that is, whether or not a subject has been detected (S12).

When a determination is made that a subject has been detected (No in S12), the necessary/unnecessary determining unit 107 determines whether or not W is smaller than a threshold Thr_W, or whether or not H is smaller than a threshold Thr_H, that is, whether or not the subject is smaller than a prescribed size (S13). Meanwhile, the threshold Thr_W and the threshold Thr_H may be set in advance by the user and the like.

When a determination is made that the subject is larger than the prescribed size (No in S13), the necessary/unnecessary determining unit 107 determines whether or not x0+W/2 is smaller than a threshold Thr_L_x, that is, whether or not the subject area deviates outwards from the left edge of the moving image frame (S14). Meanwhile, the threshold Thr_L_x may be set in advance by the user and the like.

When it is determined that the subject area does not deviate outwards from the left edge of the moving image frame (No in S14), the necessary/unnecessary determining unit 107 determines whether or not x0+W/2 is larger than a threshold Thr_R_x, that is, whether the right edge of the subject area deviates outwards from the right edge of the moving image frame (S15). Meanwhile, the threshold Thr_R_x may be set in advance by the user and the like.

When it is determined that the right edge of the subject area does not deviate outwards from the right edge of the moving image frame (No in S15), the necessary/unnecessary determining unit 107 determines whether or not y0+H/2 is larger than a threshold Thr_U_y, that is, whether or not the upper edge of the subject area deviates outwards from the upper edge or the moving image frame (S16). Meanwhile, the threshold Thr_U_y may be set in advance by the user and the like.

When it is determined that the upper edge of the subject area does not deviate outwards from the upper edge or the moving image frame (No in S16), the necessary/unnecessary determining unit 107 determines whether or not y0+H/2 is smaller than the threshold Thr_D_y, that is, whether or not the bottom edge of the subject area deviates outwards from the bottom edge of the moving image frame (S17). Meanwhile, the threshold Thr_D_y may be set in advance by the user and the like.

When it is determined that the bottom edge of the subject area does not deviate outwards from the bottom edge of the moving image frame (No in S17), the necessary/unnecessary determining unit 107 determines that the moving image frame is a moving image frame that is necessary at the time of editing and playback, sets necessary/unnecessary determination flag FLG_n=1 (S18), and keeps the necessary/unnecessary determination flag FLG_n=1 in a storing unit that is inside or outside the necessary/unnecessary determining unit 107 (S19).

Next, the necessary/unnecessary determining unit 107 reads out, from the storing unit, the necessary/unnecessary determination flag FLG_n of the currently-obtained moving image frame and the necessary/unnecessary determination flag FLG_n−1 of the last-obtained moving image frame (S20), and determines whether or not the multiplication result of the necessary/unnecessary determination flag FLG_n and the necessary/unnecessary determination flag FLG_n−1 is smaller than zero, that is, whether or not the last-obtained moving image frame is the last moving image frame in one or more moving image frames that are unnecessary at the time of editing and playback (S21).

When it is determined that the last-obtained moving image frame is the last moving image frame in one or more moving image frames that are unnecessary at the time of editing and playback (Yes in S21), the necessary/unnecessary determining unit 107 integrates last information kj indicating the last moving image frame in one or more unnecessary moving image frames and the identification information PID corresponding to the last-obtained moving image frame (S22), and outputs it to the moving image file managing unit 108 (S23). For example, in a case in which a plurality of moving image frames with identification information PID=7 through 12, as illustrated in FIG. 7, when the necessary/unnecessary determination flag FLG_n is corresponding to the identification information PID=7 is "−1", and, the necessary/unnecessary determination flag FLG_n−1 corresponding to identification information PID=8 is "1", the necessary/unnecessary determining unit 107 integrates the last information Kj and the identification information PID=7, and outputs it to the moving image file managing unit 108.

Next, upon receiving a moving image capturing termination instruction and the like from the user and determining that the moving image capturing has been terminated (Yes in S24), the necessary/unnecessary determining unit 107 terminates the determination process of the unnecessary moving image frame, and upon determining that the moving image capturing has not been terminated yet (No in S24), returning to S11, inputs meta data corresponding to the moving image frame to be obtained next.

On the other hand, when it is determined that the last-obtained moving image frame is not the last moving image frame in one or more moving image frames that are unnecessary at the time of editing and playback, that is, the currently-obtained moving image frame is also a moving image frame that is necessary at the time of editing and playback and necessary moving image frames have been obtained successively (No in S21), the necessary/unnecessary determining unit 107 does not execute S22 and S23, and determines whether or not the moving image capturing has been terminated (S24).

Meanwhile, when upon determining at least one of "no subject has been detected (Yes in S12)", "the subject is smaller than a prescribed size (Yes in S13)", "the subject area deviates outwards from the left edge of the moving image frame (Yes in S14)", "the subject area deviates outwards from the right edge of the moving image frame (Yes in S15)", "the subject area deviates outwards from the upper edge of the moving image frame (Yes in S16)", and "the subject area deviates outwards from the bottom edge of the moving image frame (Yes in S17)", the necessary/unnecessary determining unit 107 determines that the moving image frame is a moving image frame that is unnecessary at the time of editing and playback, sets the necessary/unnecessary determination flag FLG_n=−1 (S25), and keeps the necessary/unnecessary determination flag FLG_n=−1 in a storing unit that is inside or outside the necessary/unnecessary determining unit 107 (S26).

Next, the necessary/unnecessary determining unit 107 reads out the necessary/unnecessary determination flag FLG_n of the currently-obtained moving image frame and the necessary/unnecessary determination flag FLG_n−1 of the last-obtained moving image frame from the storing unit (S27), and determines whether or not the multiplication result of the necessary/unnecessary determination flag FLG_n and the necessary/unnecessary determination flag FLG_n−1 is smaller than zero, that is, whether or not the currently-obtained moving image frame is the top moving image frame in one or more moving image frames that are unnecessary at the time of editing and playback (S28).

When it is determined that the currently-obtained moving image frame is the top moving image frame in one or more moving image frames that are unnecessary at the time of editing and playback (Yes in S28), the necessary/unnecessary determining unit 107 integrates top information ki indicating the top moving image frame in one or more unnecessary moving image frames and the identification information PID corresponding to the currently-obtained moving mage frame (S29), outputs it to the moving image file managing unit 108 (S30), and determines whether or not the moving frame capturing has been terminated (S24). For example, in a case in which a plurality of moving image frames with identification information PID=7 through 12, as illustrated in FIG. 7, when the necessary/unnecessary determination flag FLG_n is corresponding to the identification information PID=12 is "−1", and, the necessary/unnecessary determination flag FLG_n−1 corresponding to identification information PID=11 is "1", the necessary/unnecessary determining unit 107 integrates the top information Ki and the identification information PID=12, and outputs it to the moving image file managing unit 108.

On the other hand, when it is determined that the currently-obtained moving image frame is not the top moving image frame in one or more moving image frames that are unnecessary at the time of editing and playback, that is, the last-obtained moving image frame is also a moving image frame that is unnecessary at the time of editing and playback and unnecessary moving image frames have been obtained successively (No in S28), the necessary/unnecessary determining unit 107 does not execute S29 and S30, and determines whether or not the moving image capturing has been terminated (S24).

Then, when the top information Ki and the last information Kj are output from the necessary/unnecessary determining unit 107, the moving image file managing unit 108 rewrites information that indicates the state of data at the recording positions in the recording unit 106 corresponding to all the identification information between the identification information PID output together with the top information Ki and the identification information PID output together with the last information kj respectively into information indicating that there is no data.

The image capturing unit 500 illustrated in FIG. 5A is effective in reducing the amount of data of moving images obtained when the subject moves wildly such as when watching a sport and a race, as whether a moving image frame is necessary/unnecessary is determined according to the position and the size of the subject.

Figure 8:
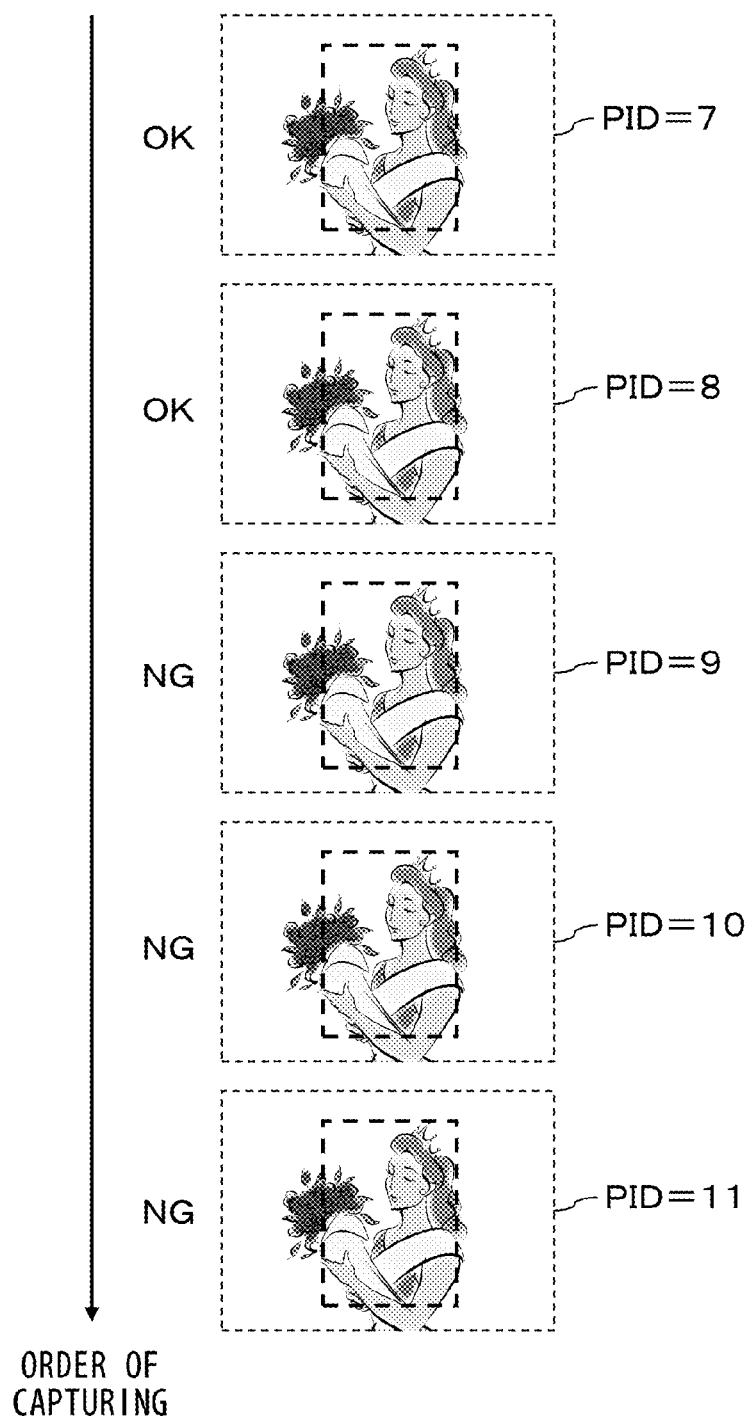
FIG. 8 is a diagram illustrating another example of a moving image frame determined as necessary and a moving image frame determined as unnecessary in embodiment 1.

Meanwhile, in the operation example of the necessary/unnecessary determining unit 107 illustrated in FIG. 6, the configuration is made so that the composition indices described in meta data are based on the position and the size of the subject, and necessary/unnecessary determination is performed about the moving image frame, but the configuration may also be made, when, as illustrated in FIG. 8, moving image frames of similar compositions are obtained successively, these moving image frames are determined as unnecessary moving image frames at the time of editing and playback. For example, when it is determined that the difference in the composition of the moving image frame corresponding to identification information PID=7 illustrated in FIG. 8 and the composition of the moving image frames corresponding to identification information PID=8, is equal to or smaller than a prescribed value, the necessary/unnecessary determining unit 107 sets top information Ki for the moving image frame corresponding to identification information PID=9. In addition, when there are successive frames equal to or more than a prescribed number whose difference in the composition is equal to or smaller than the prescribed value, top information Ki is set for the moving image frame of the identification information corresponding to the last part of the successive frames.

Figure 5C:
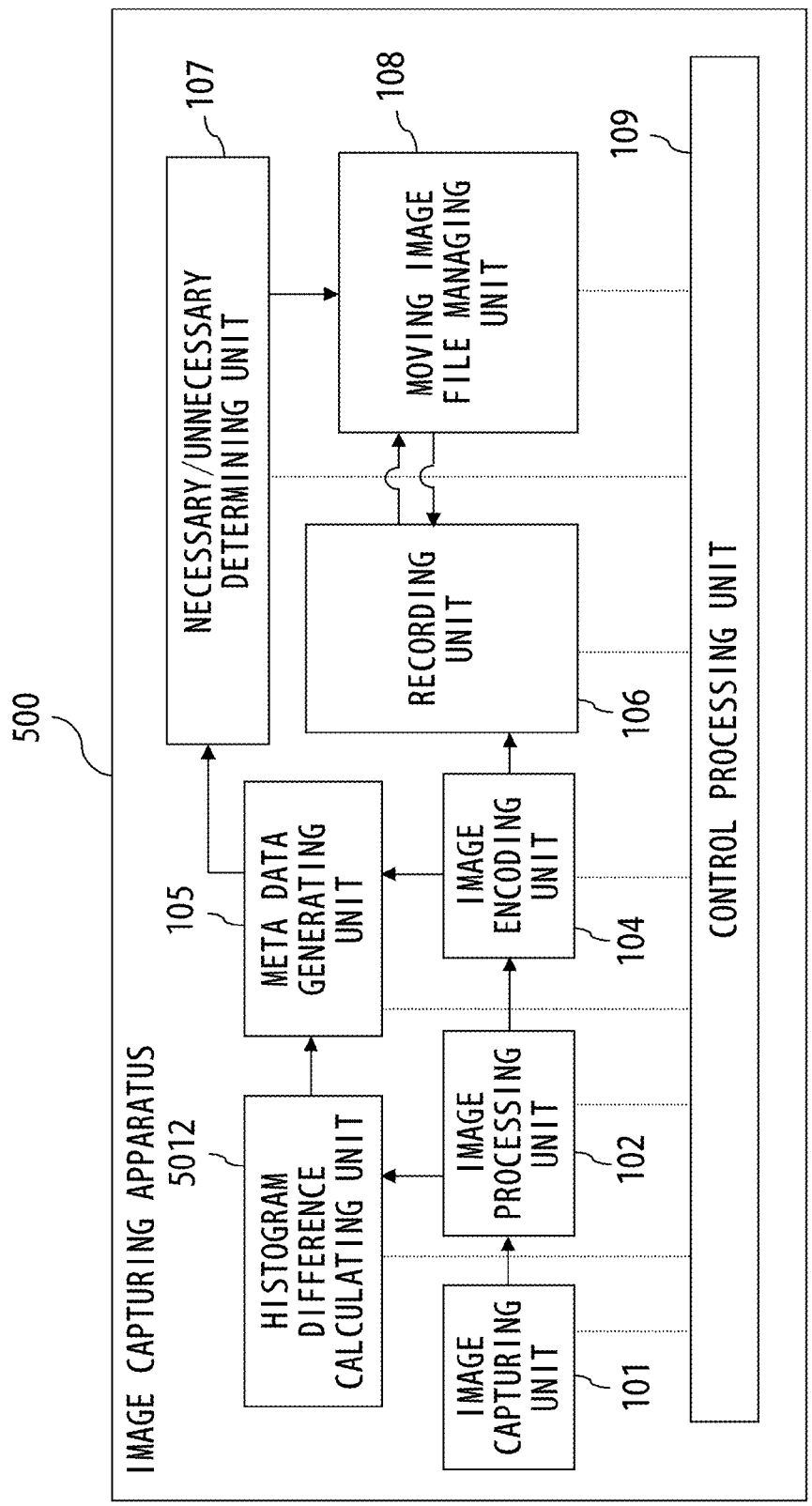
FIG. 5C is a diagram illustrating a variation example (part 2) of an image capturing apparatus of embodiment 1.

Meanwhile, as the method to measure the difference between the frames, besides the difference in the composition indices illustrated in FIG. 8, that is, in detection of the position size of the subject, the difference between frames may also be obtained based on the statistic of the images. When the total value of the differences of the level differences between frames is equal to or smaller than a prescribed value, determination of a case in which the total value of the amounts of change of the histogram of the compared frames is equal to or smaller than a prescribed value as unnecessary, and the like, may be used. When using the difference between frames, for example, as illustrated in FIG. 5B, instead of the subject detection processing unit 501, a difference calculating unit 5011 that integrates the differences between frames is provided. Meanwhile, when the histogram is used, for example, as illustrated in FIG. 5C, instead of the subject detection processing unit 501, a histogram difference calculating unit 5012 that calculates the histogram and calculates the difference in the histograms between frames or their integral is provided.

Figure 9:
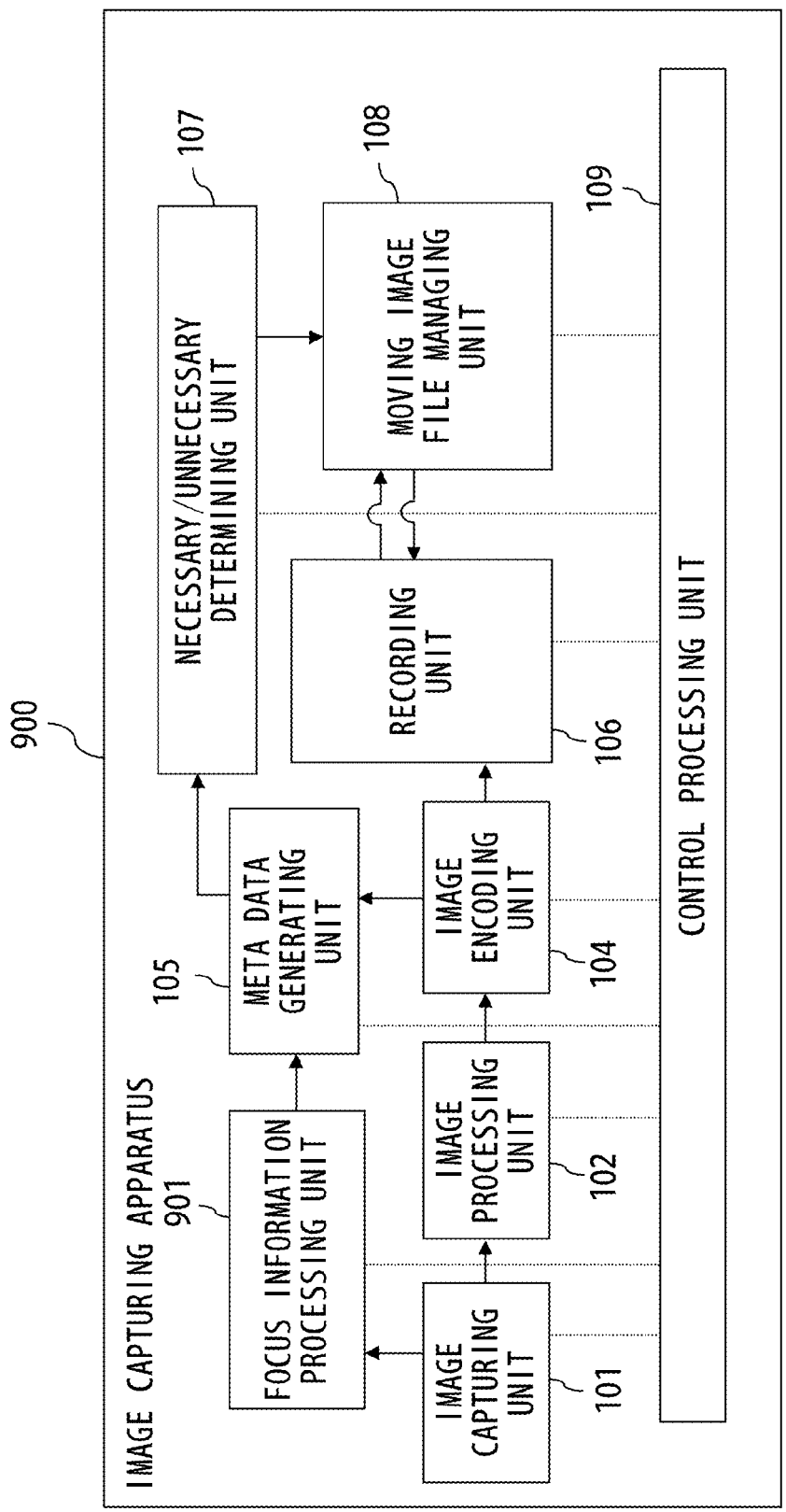
FIG. 9 is a diagram illustrating an image capturing apparatus of embodiment 2.

FIG. 9 is a diagram illustrating an image capturing unit 900 being embodiment 2 of the image processing apparatus 100 illustrated in FIG. 1. Meanwhile, to the same configuration as the configuration illustrated in FIG. 5, the same numeral is assigned and explanation for the configuration is omitted.

The image capturing unit 900 illustrated in FIG. 9 is characterized in that it includes a focus information processing unit 901 as the necessary/unnecessary determination data generating unit 103, and that, by the focus information processing unit 901, for each moving image frame of the moving image after image processing, respectively, "focus information" is set as the necessary/unnecessary determination data, and by the meta data generating unit 105, the "focus information" and the identification information PID are integrated and output to the necessary/unnecessary determining unit 107 as meta data.

Figure 10:
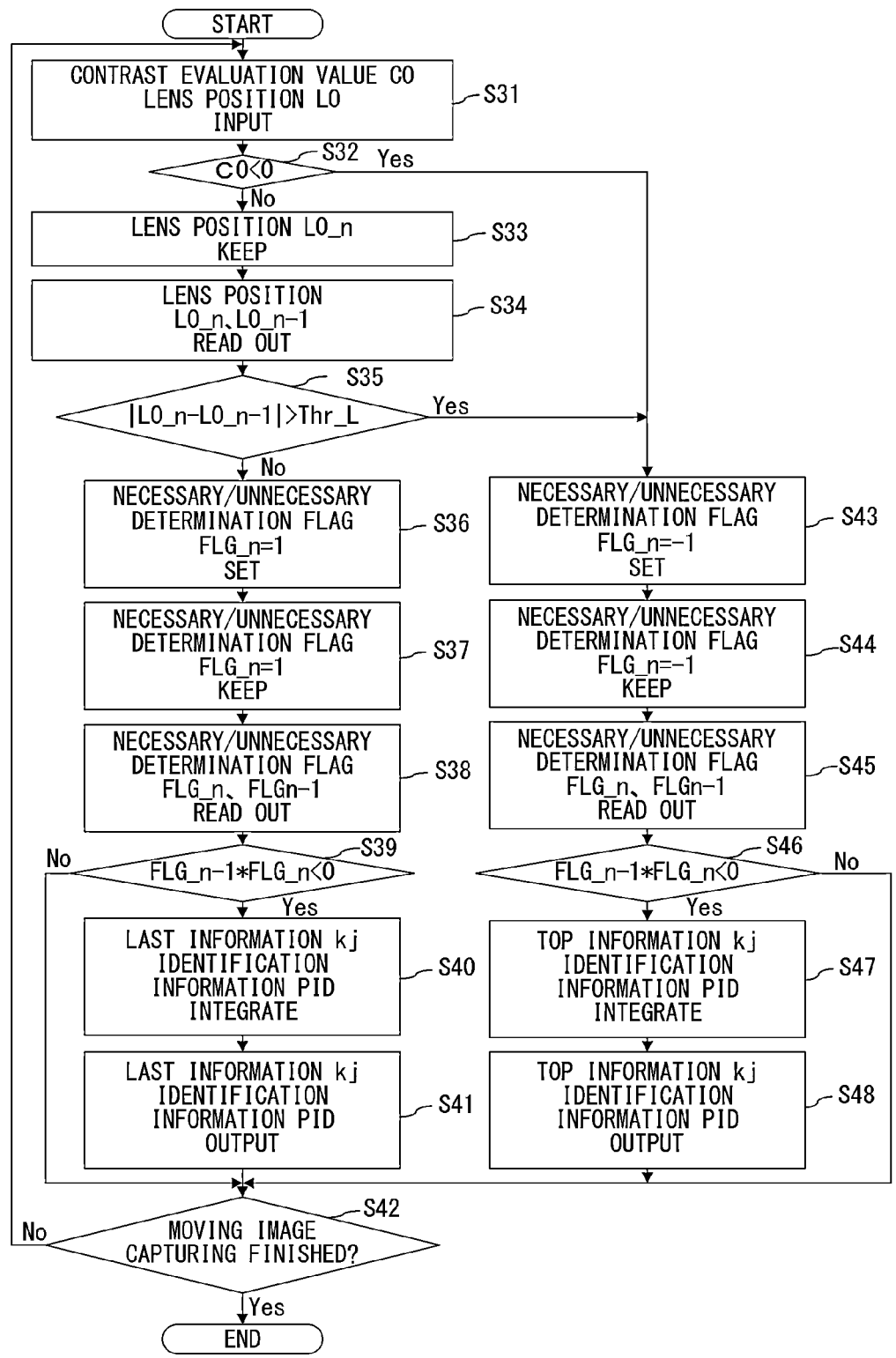
FIG. 10 is a flowchart illustrating operations of a necessary/unnecessary determining unit of embodiment 2.

FIG. 10 is a flowchart illustrating an example of the operations of the necessary/unnecessary determining unit 107 in the image capturing unit 900 illustrated in FIG. 9.

First, when the image capturing unit 101 starts obtaining the moving image frame and the meta data generating unit 105 starts outputting meta data, the necessary/unnecessary determining unit 107 inputs "focus information" represented in the meta data (S31). Meanwhile, every time when the image capturing unit 101 obtains a moving image frame, the focus information processing unit 901 obtains a contrast evaluation value C0 corresponding to the moving image frame from the image processing unit 102, and also obtains the lens position L0 of the focus lens from the image capturing unit 101 and output them to the meta data generating unit 105. In addition, when the contrast evaluation value C0 is smaller than 0, it is assumed that the focusing has failed, that is, the focus lens is out of focus.

Next, when the necessary/unnecessary determining unit 107 determines that the C0 is equal to or larger than 0, that is, the focus lens is in focus (No in S32), it keeps the lens position L0_n corresponding to the currently-obtained moving image frame in a storing unit that is inside or outside the necessary/unnecessary determining unit 107 (S33).

Next, the necessary/unnecessary determining unit 107 reads out the lens position L0_n corresponding to the currently-obtained moving image frame and the lens position L0_n−1 corresponding to the last-obtained moving image frame from the storing unit (S34), and determines whether or not the absolute value of the difference between the lens position L0_n and the lens position L0_n−1 is larger than a threshold Thr_L, that is, whether or not the focus is unstable (S35).

When it is determined that the focus is stable (No in S35), the necessary/unnecessary determining unit 107 determines that the moving image frame as a moving image frame that is necessary at the time of editing and playback, sets the necessary/unnecessary determination flag FLG_n=1 (S36), and keeps the necessary/unnecessary determination flag FLG_n=1 in a storing unit that is inside or outside the necessary/unnecessary determining unit 107 (S37).

Next, the necessary/unnecessary determining unit 107 reads out the necessary/unnecessary determination flag FLG_n of the currently-obtained moving image frame and the necessary/unnecessary determination flag FLG_n−1 of the last-obtained moving image frame from the storing unit (S38), and determines whether or not the multiplication result of the necessary/unnecessary determination flag FLG_n and the necessary/unnecessary determination flag FLG_n−1 is smaller than zero, that is, whether or not the last-obtained moving image frame is the last moving image frame in one or more moving image frames that are unnecessary at the time of editing and playback (S39).

When it is determined that the last moving-image frame is the last moving image frame in one or more moving image frames that are unnecessary at the time of editing and playback (Yes in S39), the necessary/unnecessary determining unit 107 integrates last information Kj indicating the last moving image frame in one or more unnecessary moving image frames and the identification information PID corresponding to the last-obtained moving image frame (S40), and outputs it to the moving image file managing unit 108 (S41).

Upon receiving a moving image capturing termination instruction and the like from the user and determining that the moving image capturing has been terminated (Yes in S42), the necessary/unnecessary determining unit 107 terminates the determination process of the unnecessary moving image frame, and upon determining that the moving image capturing has not been terminated yet (No in S42), returns to S31, and inputs meta data corresponding to the moving image frame to be obtained next.

On the other hand, when it is determined that the last-obtained moving image frame is not the last moving image frame in one or more moving image frames that are unnecessary at the time of editing and playback, that is, the currently-obtained moving image frame is also a moving image frame that is necessary at the time of editing and playback and necessary moving image frames have been obtained successively (No in S39), the necessary/unnecessary determining unit 107 does not execute S40 and S41, and determines whether or not the moving image capturing has been terminated (S42).

Meanwhile, when the necessary/unnecessary determining unit 107 determines that the focus has failed (Yes in S32) or that the focus is not stable (Yes in S35), it determines the moving image frame at that time as a moving image frame that is unnecessary at the time of editing or playback, sets the necessary/unnecessary determination flag FLG_n=−1 (S43), and keeps the necessary/unnecessary determination flag FLG_n=−1 in a storing unit that is inside or outside the necessary/unnecessary determining unit 107 (S44).

Next, the necessary/unnecessary determining unit 107 reads out the necessary/unnecessary determination flag FLG_n of the currently-obtained moving image frame and the necessary/unnecessary determination flag FLG_n−1 of the last-obtained moving image frame from the storing unit (S45), and determines whether or not the multiplication result of the necessary/unnecessary determination flag FLG_n and the necessary/unnecessary determination flag FLG_n−1 is smaller than zero, that is, whether or not the currently-obtained moving image frame is the top moving image frame in one or more moving image frames that are unnecessary at the time of editing and playback (S46).

When it is determined that the currently-obtained moving image frame is the top moving image frame in one or more moving image frames that are unnecessary at the time of editing and playback (Yes in S46), the necessary/unnecessary determining unit 107 integrates top information ki indicating the top moving image frame in one or more unnecessary moving image frames and the identification information PID corresponding to the currently-obtained moving mage frame (S47), outputs it to the moving image file managing unit 108 (S48), and determines whether or not the moving image capturing has been terminated (S42).

On the other hand, when it is determined that the currently-obtained moving image frame is not the top moving image frame in one or more moving image frames that are unnecessary at the time of editing and playback, that is, the last-obtained moving image frame is also a moving image frame that is unnecessary at the time of editing and unnecessary moving image frames have been obtained successively (No in S46), the necessary/unnecessary determining unit 107 does not execute S47 and S48, and determines whether or not the moving image capturing has been terminated (S42).

Then, when the top information Ki and the last information Kj are output from the necessary/unnecessary determining unit 107, the moving image file managing unit 108 rewrites information that indicates the state of data at the recording positions in the recording unit 106 corresponding to all the identification information between the identification information PID output together with the top information Ki and the identification information PID output together with the last information kj respectively into information indicating that there is no data.

The image capturing unit 900 illustrated in FIG. 9 is effective in reducing the amount of data of moving images obtained when not only the subject but also the person who is capturing the image is moving, as the necessary/unnecessary determination of about a moving image frame is made according to whether or not focusing has failed or whether or not the focus is unstable.

Figure 11:
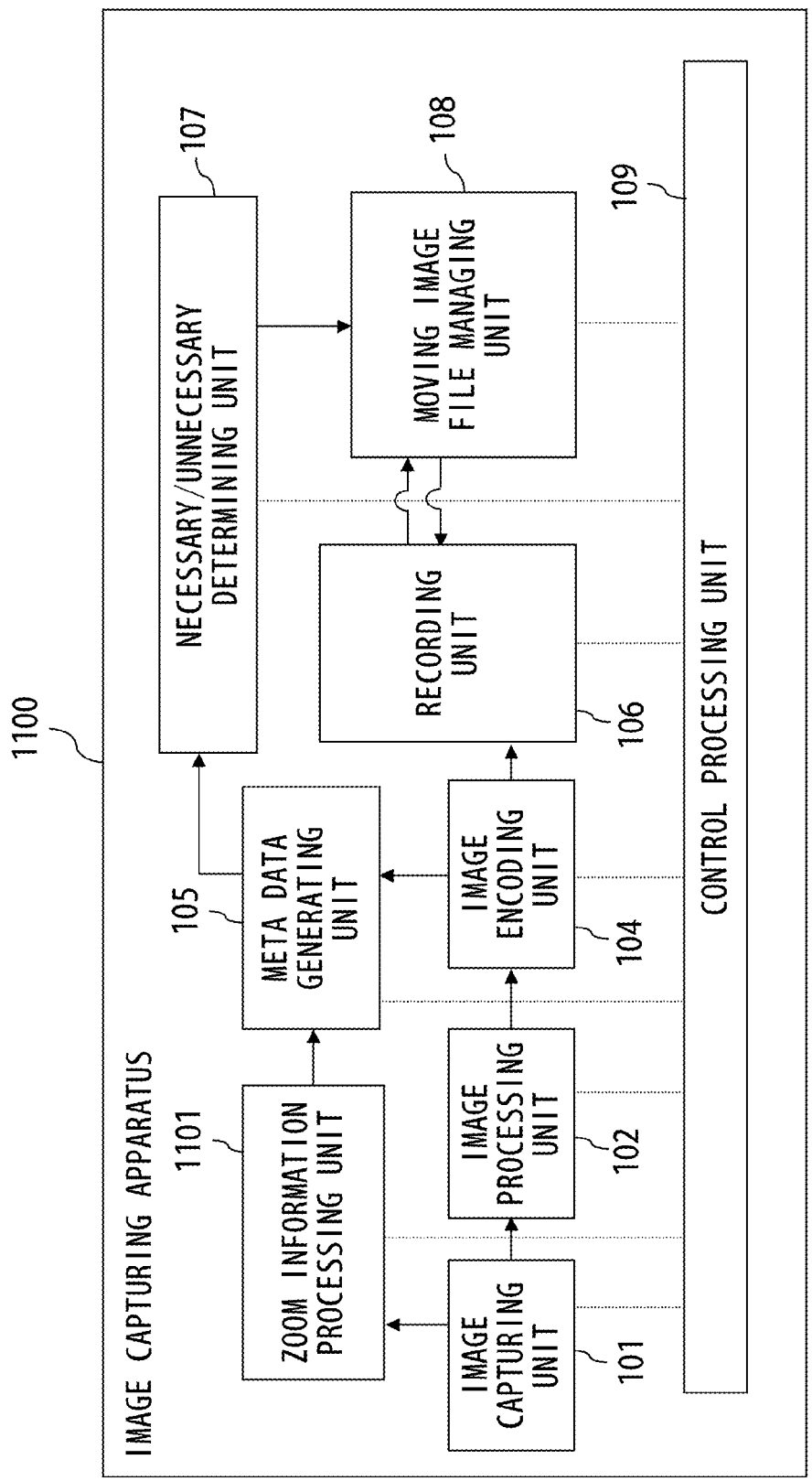
FIG. 11 is a diagram illustrating an image capturing apparatus of embodiment 3.

FIG. 11 is a diagram illustrating an image capturing unit 1100 being embodiment 3 of the image processing apparatus 100 illustrated in FIG. 1. Meanwhile, to the same configuration as the configuration illustrated in FIG. 5, the same numeral is assigned and explanation for the configuration is omitted.

The image capturing unit 1100 illustrated in FIG. 11 is characterized in that it includes a zoom information processing unit 1101 as the necessary/unnecessary determination data generating unit 103, and the by the zoom information processing unit 1101, for each moving image frame of the moving image after image processing, respectively, "zoom information" is set as the necessary/unnecessary determination data, and by the meta data generating unit 105, the "zoom information" and the identification information PID are integrated and output to the necessary/unnecessary determining unit 107 as meta data.

FIG. 12 is a flowchart illustrating an example of the operations of the necessary/unnecessary determining unit 107 in the image capturing unit 1100 illustrated in FIG. 11.

First, when the image capturing unit 101 starts obtaining the moving image frame and the meta data generating unit 105 starts outputting meta data, the necessary/unnecessary determining unit 107 inputs "zoom information" represented in the meta data (S51). Meanwhile, every time when the image capturing unit 101 obtains a moving image frame, the zoom information processing unit 1101 obtains zoom information Z0 (for example, the lens position, the amount of lens movement of the zoom lens and the like) corresponding to the moving image frame from the image capturing unit 101, and outputs it to the meta data generating unit 105.

Next, the necessary/unnecessary determining unit 107 keeps the input zoom information Z0 in a storing unit that is inside or outside the necessary/unnecessary determining unit 107 (S52).

Next, the necessary/unnecessary determining unit 107 reads out the zoom information Z0_n corresponding to the currently-obtained moving image frame and the zoom information Z0_n−1 corresponding to the last-obtained moving image frame from the storing unit (S53), and determines whether or not the absolute value of the difference between the zoom information Z0_n and the zoom information Z0_n−1 is larger than a threshold Thr_Z, that is, whether or not the lens position of the zoom lens is unstable (S54).

When it is determined that the lens position of the zoom lens is stable (No in S54), the necessary/unnecessary determining unit 107 determines that the currently-obtained moving image frame is a moving image frame that is necessary at the time of editing and playback, sets necessary/unnecessary determination flag FLG_n=1 (S55), and keeps the necessary/unnecessary determination flag FLG_n=1 in a storing unit that is inside or outside the necessary/unnecessary determining unit 107 (S56).

Next, the necessary/unnecessary determining unit 107 reads out the necessary/unnecessary determination flag FLG_n of the currently-obtained moving image frame and the necessary/unnecessary determination flag FLG_n−1 of the last-obtained moving image frame from the storing unit (S57), and determines whether or not the multiplication result of the necessary/unnecessary determination flag FLG_n and the necessary/unnecessary determination flag FLG_n−1 is smaller than zero, that is, whether or not the last-obtained moving image frame is the last moving image frame in one or more moving image frames that are unnecessary at the time of editing and playback (S58).

When it is determined that the last-obtained moving image frame is the last moving image frame in one or more moving image frames that are unnecessary at the time of editing and playback (Yes in S58), the necessary/unnecessary determining unit 107 integrates the last information Kj indicating the last moving image frame in one or more unnecessary moving image frames and the identification information PID corresponding to the last-obtained moving image frame identification information (S59), and outputs it to the moving image file managing unit 108 (S60).

Next, upon receiving a moving image capturing termination instruction and the like from the user and determining that the moving image capturing has been terminated (Yes in S61), the necessary/unnecessary determining unit 107 terminates the determination process of the unnecessary moving image frame, and upon determining that the moving image capturing has not been terminated yet (No in S61), returns to S51, and inputs meta data corresponding to the moving image frame to be obtained next.

On the other hand, when it is determined that the last-obtained moving image frame is not the last moving image frame in one or more moving image frames that are unnecessary at the time of editing and playback, that is, the currently-obtained moving image frame is also a moving image frame that is necessary at the time of editing and playback and necessary moving image frames have been obtained successively (No in S58), the necessary/unnecessary determining unit 107 does not execute S59 and S60, and determines whether or not the moving image capturing has been terminated (S61).

Meanwhile, when the necessary/unnecessary determining unit 107 determines that the lens position of the zoom lens is unstable (Yes in S54), it determines that the currently-obtained moving image frame as a moving image frame that is unnecessary at the time of editing and playback, sets the necessary/unnecessary determination flag FLG_n=−1 (S62), and keeps the necessary/unnecessary determination flag FLG_n=−1 in a storing unit that is inside or outside the necessary/unnecessary determining unit 107 (S63).

Next, the necessary/unnecessary determining unit 107 reads out, from the storing unit, the necessary/unnecessary determination flag FLG_n of the currently-obtained moving image frame and the necessary/unnecessary determination flag FLG_n−1 of the last-obtained moving image frame (S64), and determines whether or not the multiplication result of the necessary/unnecessary determination flag FLG_n and the necessary/unnecessary determination flag FLG_n−1 is smaller than zero, that is, whether or not the currently-obtained moving image frame is the top moving image frame in one or more moving image frames that are unnecessary at the time of editing and playback (S65).

When it is determined that the currently-obtained moving image frame is the top moving image frame in one or more unnecessary moving image frames at the time of editing and playback (Yes in S65), the necessary/unnecessary determining unit 107 integrates the top information ki indicating the top moving image frame in one or more unnecessary moving image frames and the identification information PID corresponding to the currently-obtained moving mage frame (S66), and outputs it to the moving image file managing unit 108 (S67), and determines whether or not the image capturing has been terminated (S61).

On the other hand, when it is determined that the currently-obtained moving image frame is not the top moving image frame in one or more moving image frames that are unnecessary at the time of editing and playback, that is, the last-obtained moving image frame is also a moving image frame that is unnecessary at the time of editing and playback and unnecessary moving image frames have been obtained successively (No in S65), the necessary/unnecessary determining unit 107 does not execute S66 and S67, and determines whether or not the moving image capturing has been terminated (S61).

Then, when the top information Ki and the last information Kj are output from the necessary/unnecessary determining unit 107, the moving image file managing unit 108 rewrites information that indicates the state of data at the recording positions in the recording unit 106 corresponding to all the identification information between the identification information PID output together with the top information Ki and the identification information PID output together with the last information kj respectively into information indicating that there is no data.

The image capturing unit 1100 illustrated in FIG. 11 is effective in reducing the amount of data of moving images obtained when, for example, the subject is moving in the forward/backward directions with respect to the person who is capturing the image, as the necessary/unnecessary determination of about a moving image frame is made according to whether or not the lens position of the zoom lens is unstable.

Meanwhile, the information used for the necessary/unnecessary determination process of about the unnecessary moving image frame is not limited to the position and size of the subject, the focus information or the zoom information, as in embodiments 1 through 3 described above. For example, the histogram of the luminance gradation of the respective image frames after image processing.

In addition, two or more pieces of information from the position and size of the subject, the focus information or the zoom information and the histogram of the luminance gradation mentioned above may be combined and used for the necessary/unnecessary determination process of about the unnecessary moving image frame.

Figure 13:
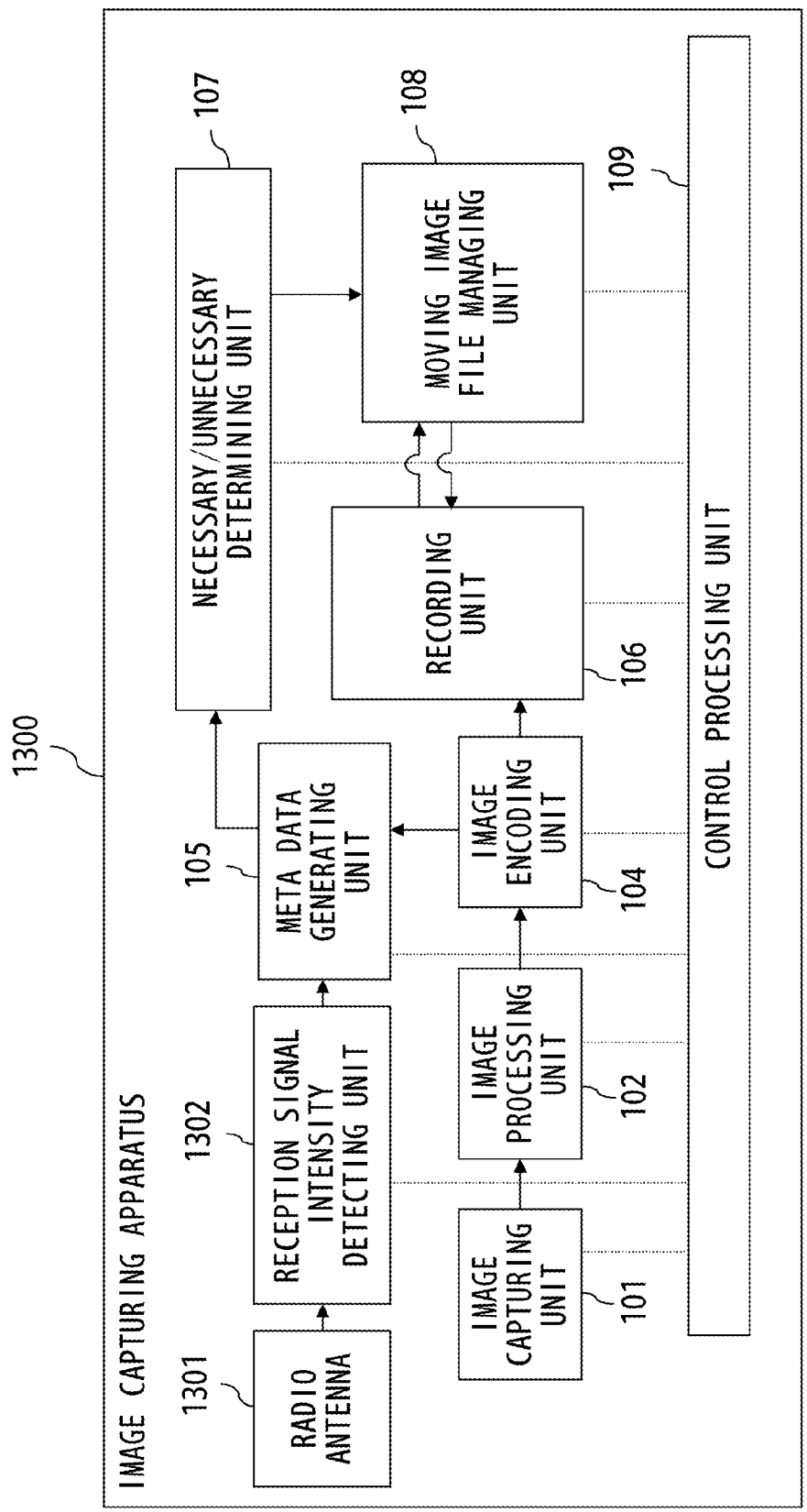
FIG. 13 is a diagram illustrating an image capturing apparatus of embodiment 4.

FIG. 13 is a diagram illustrating an image capturing unit 1300 being embodiment 4 of the image processing apparatus 100 illustrated in FIG. 1. Meanwhile, to the same configuration as the configuration illustrated in FIG. 5, the same numeral is assigned and explanation for the configuration is omitted.

The image capturing unit 1300 illustrated in FIG. 13 is characterized in that it includes a radio antenna 1301 and a reception signal strength detecting unit 1302 as the necessary/unnecessary determination data generating unit 103, and by the reception signal strength detecting unit 1302, for each moving image frame of the moving image after image processing, respectively, RSSI (Received Signal Strength Indication) R0 detected as the necessary/unnecessary determination data generating unit 103, and by the meta data generating unit 105, the RSSI R0 and the identification information PID are integrated and output to the necessary/unnecessary determining unit 107 as meta data. Meanwhile, the radio antenna 1301 is supposed to receive a signal transmitted from a transmitter provided in the subject, and a signal transmitted from the image capturing unit 1300 and reflected on the subject.

FIG. 14 is a flowchart illustrating an example of the operations of the necessary/unnecessary determining unit 107 in the image capturing unit 1300 illustrated in FIG. 13.

First, when the image capturing unit 101 starts obtaining the moving image frame and the meta data generating unit 105 starts outputting meta data, the necessary/unnecessary determining unit 107 inputs "RSSI" represented in the meta data (S71). Meanwhile, every time when the image capturing unit 101 obtains a moving image frame, the reception signal strength detecting unit 1302 associates the level of the reception signal received by the radio antenna 1301 with the moving image frame and outputs it to the meta data generating unit 105 as the RSSI R0.

Next, the necessary/unnecessary determining unit 107 determines whether or not the input RSSI R0 is larger than a threshold Thr_R, that is, whether or not the subject is at a far position with respect to the image capturing unit 1300 (S72).

When it is determined that the subject is not at a far position (No in S72), the necessary/unnecessary determining unit 107 determines the currently-obtained moving image frame is a moving image frame that is necessary at the time of editing and playback, sets necessary/unnecessary determination flag FLG_n=1 (S73), and keeps the necessary/unnecessary determination flag FLG_n=1 in a storing unit that is inside or outside the necessary/unnecessary determining unit 107 (S74).

Next, the necessary/unnecessary determining unit 107 reads out, from the storing unit, the necessary/unnecessary determination flag FLG_n of the currently-obtained moving image frame and the necessary/unnecessary determination flag FLG_n−1 of the last-obtained moving image frame (S75), and determines whether or not the multiplication result of the necessary/unnecessary determination flag FLG_n and the necessary/unnecessary determination flag FLG_n−1 is smaller than zero, that is, whether or not the last-obtained moving image frame is the last moving image frame in one or more moving image frames that are unnecessary at the time of editing and playback (S76).

Figure 15:
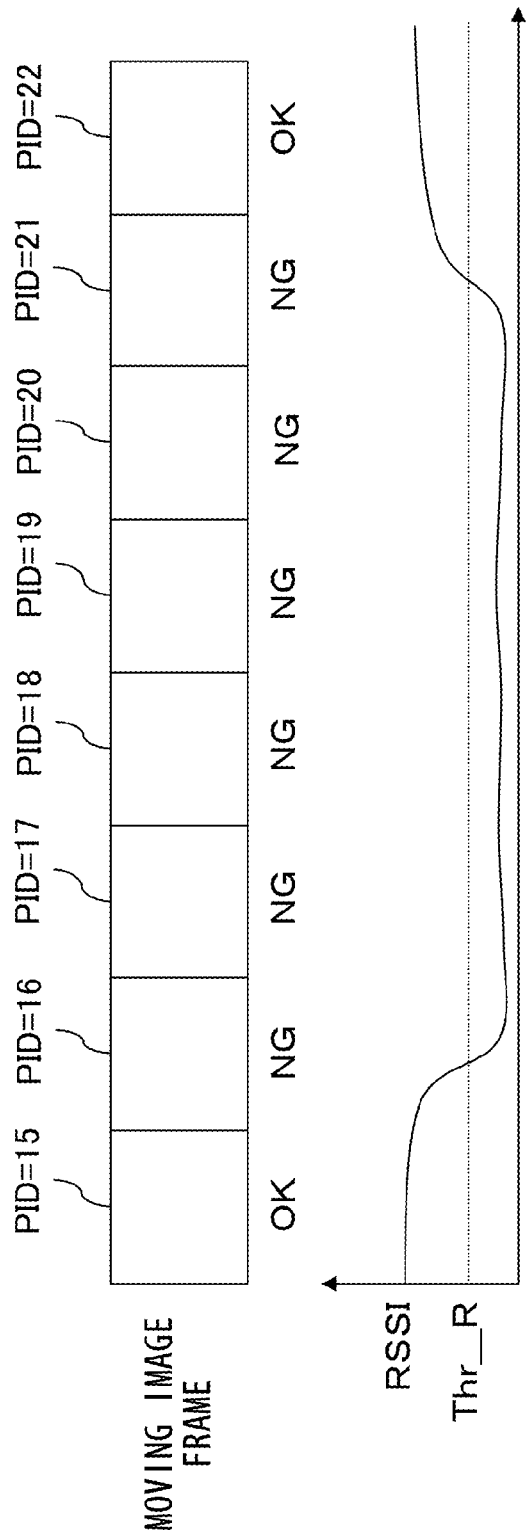
FIG. 15 is a diagram illustrating another example of a moving image frame determined as necessary and a moving image frame determined as unnecessary in embodiment 4.

When it is determined that the last moving image frame is the last moving image frame in one or more moving image frames that are unnecessary at the time of editing and playback (Yes in S76), the necessary/unnecessary determining unit 107 integrates the last information Kj indicating the last moving image frame in one or more unnecessary moving image frames and the identification information PID corresponding to the last-obtained moving image frame (S77), and outputs it to the moving image file managing unit 108 (S78). For example, in a case in which a plurality of moving image frames of identification information PID=15 through 22 are obtained as illustrated in FIG. 15, and when the necessary/unnecessary determination flag FLG_n corresponding to identification information PID=22 is "1" and the necessary/unnecessary determination flag FLG_n−1 corresponding to identification information PID=21 is "−1", the necessary/unnecessary determining unit 107 integrates the last information Kj and the identification information PID=21 and outputs it to the moving image file managing unit 108.

Next, upon receiving a moving image capturing termination instruction and the like from the user and determining that the moving image capturing has been terminated (Yes in S79), the necessary/unnecessary determining unit 107 terminates the determination process of the unnecessary moving image frame, and upon determining that the moving image capturing has not been terminated yet (No in S79), returns to S71, and inputs meta data corresponding to the moving image frame to be obtained next.

On the other hand, when it is determined that the last-obtained moving image frame is not the last moving image frame in one or more moving image frames that are unnecessary at the time of editing and playback, that is, the currently-obtained moving image frame is also a moving image frame that is necessary at the time of editing and playback and necessary moving image frames have been obtained successively (No in S76), the necessary/unnecessary determining unit 107 does not execute S77 and S78, and determines whether or not the moving image capturing has been terminated (S79).

Meanwhile, when the necessary/unnecessary determining unit 107 determines that the subject is at a far position (Yes in S72), it determines that the currently-obtained moving image is an unnecessary moving image frame at the time of editing and playback, sets the necessary/unnecessary determination flag FLG_n=−1 (S80), and keeps the necessary/unnecessary determination flag FLG_n=−1 in a storing unit that is inside or outside the necessary/unnecessary determining unit 107 (S81).

Next, the necessary/unnecessary determining unit 107 reads out the necessary/unnecessary determination flag FLG_n of the currently-obtained moving image frame and the necessary/unnecessary determination flag FLG_n−1 of the last-obtained moving image frame from the storing unit (S82), determines whether or not the multiplication result of the necessary/unnecessary determination flag FLG_n and the necessary/unnecessary determination flag FLG_n−1 is smaller than zero, that is, whether or not the currently-obtained moving image frame is the top moving image frame in one or more moving image frames that are unnecessary at the time of editing and playback (S83).

When it is determined that the currently-obtained moving image frame is the top moving image frame in one or more moving image frames that are unnecessary at the time of editing and playback (Yes in S83), the necessary/unnecessary determining unit 107 integrates top information ki indicating the top moving image frame in one or more unnecessary moving image frames and the identification information PID corresponding to the currently-obtained moving image frame (S84), outputs it to the moving image file managing unit 108 (S85), and determines whether or not the moving image capturing has been terminated (S79). For example, in a case in which a plurality of moving image frames with identification information PID=15 through 22, as illustrated in FIG. 15, when the necessary/unnecessary determination flag FLG_n is corresponding to the identification information PID=16 is "−1", and, the necessary/unnecessary determination flag FLG_n−1 corresponding to identification information PID=15 is "1", the necessary/unnecessary determining unit 107 integrates the top information Ki and the identification information PID=16, and outputs it to the moving image file managing unit 108.

On the other hand, when it is determined that the currently-obtained moving image frame is not the top moving image frame in one or more moving image frames that are unnecessary at the time of editing and playback, that is, the last-obtained moving image frame is also a moving image frame that is unnecessary at the time of editing and playback and unnecessary moving image frames have been obtained successively (No in S83), the necessary/unnecessary determining unit 107 does not execute S84 and S85, and determines whether or not the moving image capturing has been terminated (S79).

Then, when the top information Ki and the last information Kj are output from the necessary/unnecessary determining unit 107, the moving image file managing unit 108 rewrites information that indicates the state of data at the recording positions in the recording unit 106 corresponding to all the identification information between the identification information PID output together with the top information Ki and the identification information PID output together with the last information kj respectively into information indicating that there is no data.

The image capturing unit 1300 illustrated in FIG. 13 is effective in reducing the amount of data of moving images obtained when, for example, the subject is moving in the forward/backward directions with respect to the image capturing unit 1300, as the necessary/unnecessary determination of about a moving image frame is made according to the RSSI R0.

Meanwhile, in the image capturing unit 1300, the configuration is made so that, in the necessary/unnecessary determining unit 107, the necessary/unnecessary determination of the moving image frame is made based on whether or not the RSSI R0 is larger than the threshold Thr_R, but the configuration may also be made so that, the necessary/unnecessary determination of the moving image frame is made based on whether or not the RSSI R0 is larger than the threshold Thr_R is made in the reception signal strength detecting unit 1302. When making the configuration in this way, in the meta data generating unit 105, meta data is generated by a flag indicating a unnecessary moving image frame and the identification information corresponding to the moving image frame are integrated. In addition, the moving image file managing unit 108 rewrites the information that indicates the state of data at the recording position in the recording unit 106 corresponding to the identification information in the meta data into information indicating that there is no data. In addition, the necessary/unnecessary determining unit 107 may be omitted.

Figure 16:
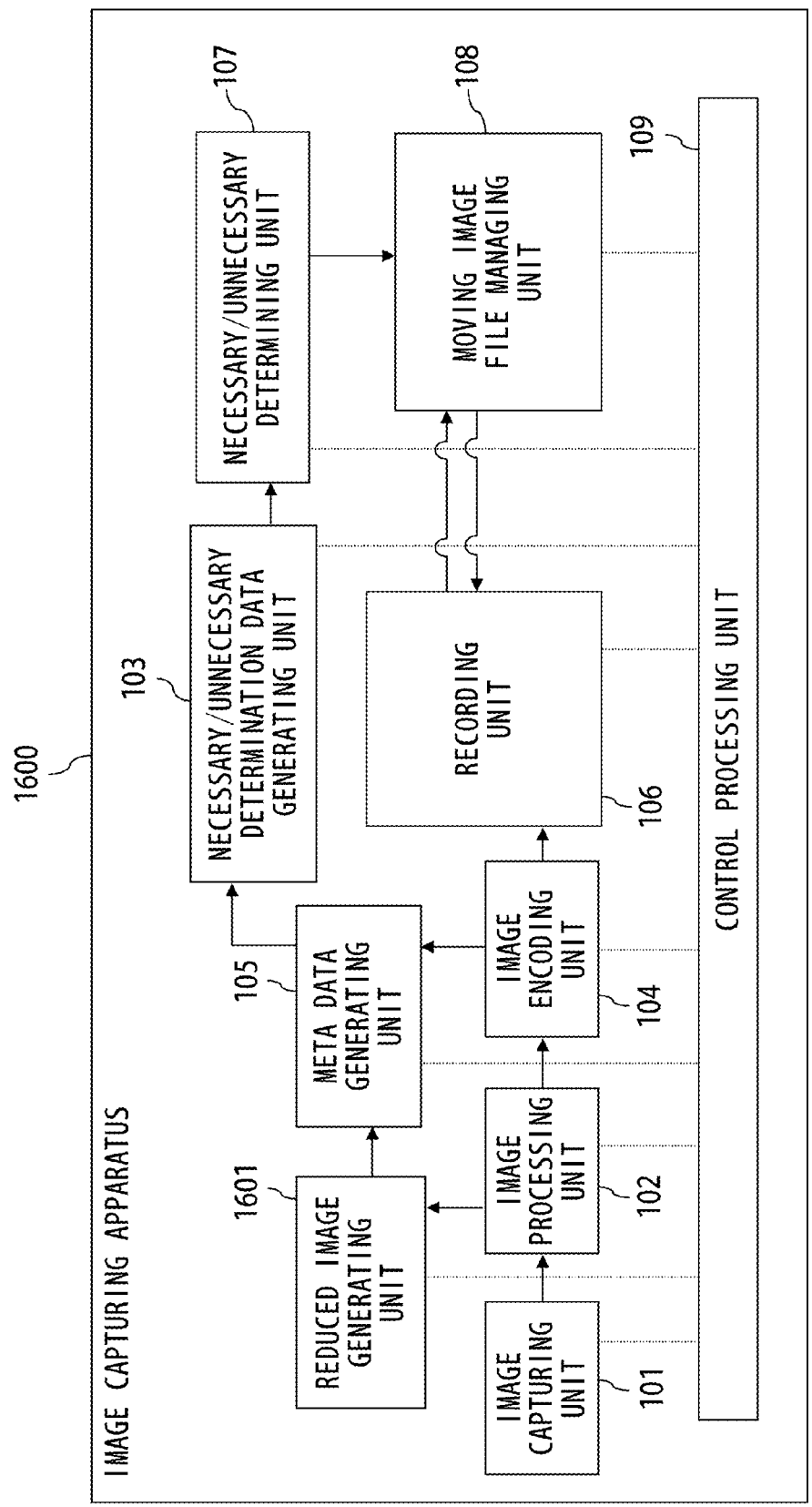
FIG. 16 is a diagram illustrating an image capturing apparatus of embodiment 5.

FIG. 16 is a diagram illustrating an image capturing unit 1600 being embodiment 5 of the image processing apparatus 100 illustrated in FIG. 1. Meanwhile, to the same configuration as the configuration illustrated in FIG. 5, the same numeral is assigned and explanation for the configuration is omitted.

The image capturing unit 1600 is characterized in that, instead of the necessary/unnecessary determination data generating unit 103, it includes a reduced image generating unit 1601, and by the reduced image generating unit 1601, the respective moving image frames of the moving image after image processing are respectively reduced, and the reduced images and the identification information PID are integrated and output to the necessary/unnecessary determination data generating unit 103 as meta data.

The necessary/unnecessary determination data generating unit 103 illustrated in FIG. 16 generates the necessary/unnecessary determination data used to determine whether or not the moving image frame corresponding to identification information is an unnecessary moving image frame, based on the reduced image in input meta data. The necessary/unnecessary determination data generated by the necessary/unnecessary determination data generating unit 103 illustrated in FIG. 16 is assumed to be for example, the position and the size of the subject, or the histogram of the illuminance gradation and the like described above.

Meanwhile, the operations of the necessary/unnecessary determining unit 107 and moving image file managing unit 108 illustrated in FIG. 16 are similar to the operations of the necessary/unnecessary determining unit 107 and moving image file managing unit 108 in embodiments 1 through 4 described above. In addition, the necessary/unnecessary determination data generating unit 103 illustrated in FIG. 16 may be provided inside the necessary/unnecessary determining unit 107.

As described above, since the image capturing unit 1600 illustrated in FIG. 16 uses a reduced image when generating the necessary/unnecessary determination data, the load put on the image capturing unit 1600 when generating the necessary/unnecessary determination data may be suppressed.

Figure 17:
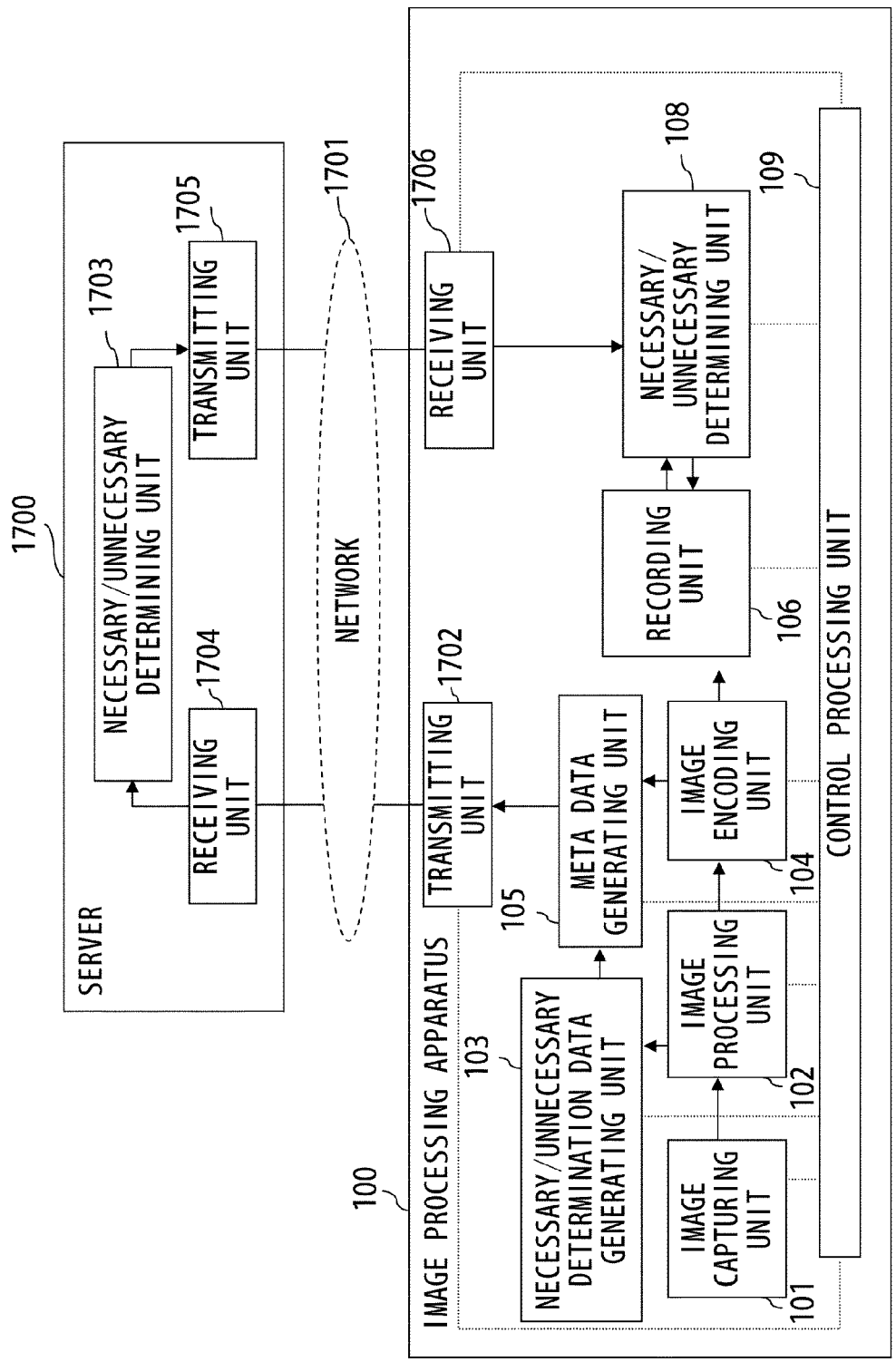
FIG. 17 is a diagram illustrating an image processing system of an embodiment of the present invention.

FIG. 17 is a diagram illustrating an image processing system as a variation example in which a part of functions of the image capturing apparatus illustrated in FIG. 16 are placed outside. Meanwhile, to the same configuration as the configuration illustrated in FIG. 1, the same numeral is assigned and explanation for the configuration is omitted.

The image processing system illustrated in FIG. 17 includes the image processing apparatus 100 and a server 1700, and the image processing apparatus 100 and the server 1700 transmits/receives data to/from each other via a network 1701.

The image processing apparatus 100 illustrated in FIG. 17 differs from the image processing apparatus 100 illustrated in FIG. 1 in that the server 1700 that is outside the image processing apparatus 100 is made to perform the determination process of the unnecessary moving image frame.

That is, a transmitting unit 1702 of the image processing apparatus 100 illustrated in FIG. 17 transmits meta data generated in the meta data generating unit 105 of the server 1700.

Meanwhile, the necessary/unnecessary determining unit 1703 of the server 1700 illustrated in FIG. 17 determines whether or not the moving image frame corresponding to the identification information in the meta data is an unnecessary moving image frame, based on the necessary/unnecessary determination data in meta data received by the receiving unit 1704, and transmits the determination result to the image processing apparatus 100 by the transmitting unit 1705.

Then, the moving image file managing unit 108 of the image processing apparatus 100 illustrated in FIG. 17 identifies the recording position in the recording unit 106 corresponding to the identification information of a moving image frame determined as an unnecessary moving image frame according to the determination result received by the receiving unit 1706, using the identification information/recording position table in the recording unit 106. In addition, the moving image file managing unit 108 identifies information that indicates the state of data corresponding to the identified recording position, using the recording position/data state information table in the recording unit 106, and rewrites the identified information that indicates the state of data into information that indicates that there is no data.

Meanwhile, the recording unit 106 illustrated in FIG. 17 may include a table in which all the pieces of identification information recorded in the recording unit 106 and information that indicates the state of data at the recording position in the recording unit 106 respectively corresponding to each of the pieces of identification information are associated. In addition, in this case, the moving image file managing unit 108 illustrated in FIG. 17 may be configured to rewrite, using this table, information that indicates the state of data at the recording position in the recording unit 106 corresponding to identification information of a moving image frame determined as an unnecessary moving image frame, transmitted from the server 1700, into information that indicates that there is no data.

In addition, the image processing apparatus 100 illustrated in FIG. 17 may be replaced with one of the image capturing unit in embodiments 1 through 5 described above.

As described above, the image processing system illustrated in FIG. 17 is configured to perform the necessary/unnecessary determination process about a moving image frame at the server 1700 side that is outside the image processing apparatus 100, and the load put on the image processing apparatus 100 may be suppressed.

Figure 18:
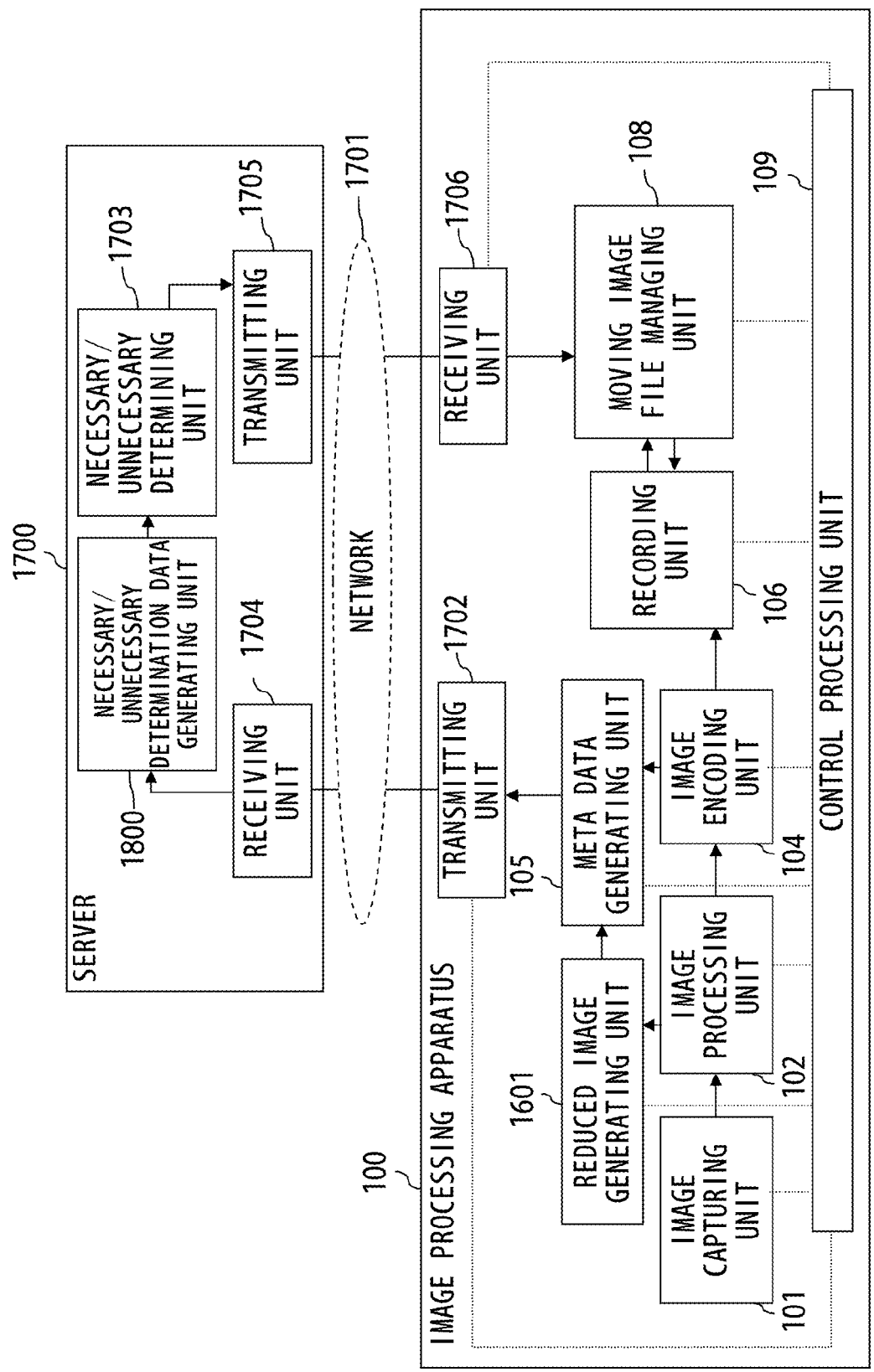
FIG. 18 is a diagram illustrating an image processing system of another embodiment of the present invention.

FIG. 18 is a diagram illustrating another example of an image processing system as a variation example in which a part of functions of the image capturing apparatus illustrated in FIG. 16 are placed outside. Meanwhile, to the same configuration as the configuration of the image processing system illustrated in FIG. 17, the same numeral is assigned and explanation for the configuration is omitted.

The image processing system illustrated in FIG. 18 differs from the image processing system illustrated in FIG. 17 in that, instead of the necessary/unnecessary determination data generating unit 103, the reduced image generating unit 1601 illustrated in FIG. 16 is provided in the image processing apparatus 100, and also, a necessary/unnecessary determination data generating unit 1800 is provided in the server 1700.

That is, by the reduced image generating unit 1601 of the image processing apparatus 100, a reduced image of each of the respective moving image frames of moving images after image processing is generated, and the reduced image and the identification information PID are integrated by the meta data generating unit 105 and transmitted, as meta data, from the image processing apparatus 100 to the server 1700 via the network 1701.

In addition, by the necessary/unnecessary determination data generating unit 1800 of the server 1700, based on the reduced image in received meta data, the unnecessary/unnecessary determination data used to determine whether or not the moving image frame corresponding to the identification information in the meta data is unnecessary is generated. Meanwhile, the necessary/unnecessary determination data generated by the necessary/unnecessary determination data generating unit 1800 is assumed to be for example, the position and the size of the subject, or the histogram of the illuminance gradation and the like described above.

In addition, the necessary/unnecessary determining unit 1703 of the server 1700 determines whether or not the moving image frame corresponding to the identification information in received meta data is a moving image frame that is unnecessary moving image frame at the time of editing, based on the necessary/unnecessary determination data generated by the necessary/unnecessary determination data generating unit 1800, and transmits the determination result to the image processing apparatus 100 by the transmitting unit 1705.

Then, the moving image file managing unit 108 of the image processing apparatus 100 identifies the recording position in the recording unit 106 corresponding to the identification information of the moving image frame determined as an unnecessary moving image frame, received by the receiving unit 1706, using the identification information/recording position table in the recording unit 106. In addition, the moving image file managing unit 108 identifies information that indicates the state of data corresponding to the identified recording position, using a recording position/data state information table in the recording unit 106 and rewrites the identified information that indicates the state of data into information indicating that there is no data.

Meanwhile, the recording unit 106 illustrated in FIG. 18 may include a table in which all the pieces of identification information recorded in the recording unit 106 and information that indicates the state of data at the recording position in the recording unit 106 respectively corresponding to each of the pieces of identification information are associated. In addition, in this case, the moving image file managing unit 108 illustrated in FIG. 18 may be configured to rewrite, using this table, information that indicates the state of data at the recording position in the recording unit 106 corresponding to identification information of a moving image frame determined as an unnecessary moving image frame, transmitted from the server 1700, into information that indicates that there is no data.

As described above, since the image processing system illustrated in FIG. 18 includes the necessary/unnecessary determination data generating unit 1800 in the server 1700, the load put on the image processing apparatus 100 may be suppressed. In addition, since the image processing system illustrated in FIG. 18 uses a reduced image when generating the necessary/unnecessary determination data, the load put on the server 1700 when generating the necessary/unnecessary determination data may be suppressed.

Figure 19:
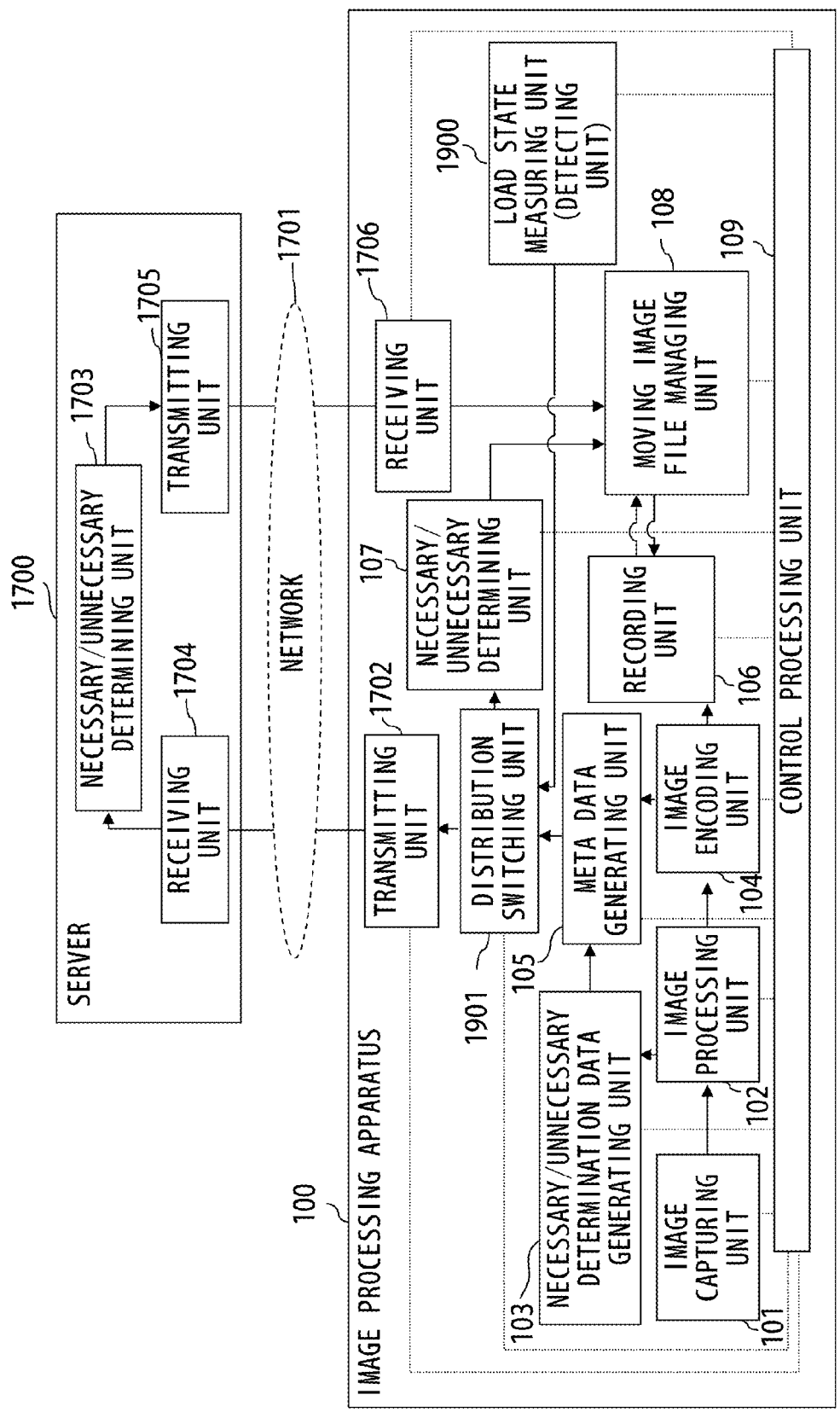
FIG. 19 is a diagram illustrating an image processing system of another embodiment of the present invention.

FIG. 19 is a diagram illustrating another example of the image processing system in FIGS. 17, 18. Meanwhile, to the same configuration as the configuration of the image processing apparatus 100 illustrated in FIG. 1 and the same configuration as the image processing system illustrated in FIG. 17, the same numeral is assigned and explanation for the configuration is omitted.

The image processing system illustrated in FIG. 19 differs from the image processing system illustrated in FIG. 17 in that the image processing apparatus 100 further includes the necessary/unnecessary determining unit 107, a load state measuring unit 1900, and a distribution switching unit 1901.

The load state measuring unit 1900 is an example of a detecting unit that detects information for determining whether or not the image processing apparatus 100 is in a state in which a load may be applied. Meanwhile, the detecting unit in the claims is, for example, the load state measuring unit 1900 in FIG. 19.

The load state measuring unit 1900 measures the state of the load on the resources (for example, the CPU, the memory and the like) of the image processing apparatus 100.

According to the state of the load measured by the load state measuring unit 1900, the distribution switching unit 1901 switches the transmission destination of meta data generated in by the meta data generating unit 105 to either one of the necessary/unnecessary determining unit 1703 of the server 1700 and the necessary/unnecessary determining unit 107 of the image processing apparatus 100. For example, when the load put on the resources of the image processing apparatus 100 is high, the meta data is transmitted to the necessary/unnecessary determining unit 1703 of the server 1700, and when the load put on the resources of the image processing apparatus 100 is not high, the meta data is transmitted to the necessary/unnecessary determining unit 107 of the image processing apparatus 100.

As described above, the image processing system illustrated in FIG. 19 is configured so that, when the load put on the resources of the image processing apparatus 100 is high, it is determined that it is impossible to sufficiently use the resources of the image processing apparatus 100 in performing the necessary/unnecessary determination process about the moving image frame, and the server 1700 that is outside the image processing apparatus 100 is made to perform the necessary/unnecessary determination about the moving image frame, and therefore, the efficiency of the necessary/unnecessary determination process of about the moving image frame may be improved.

Figure 20:
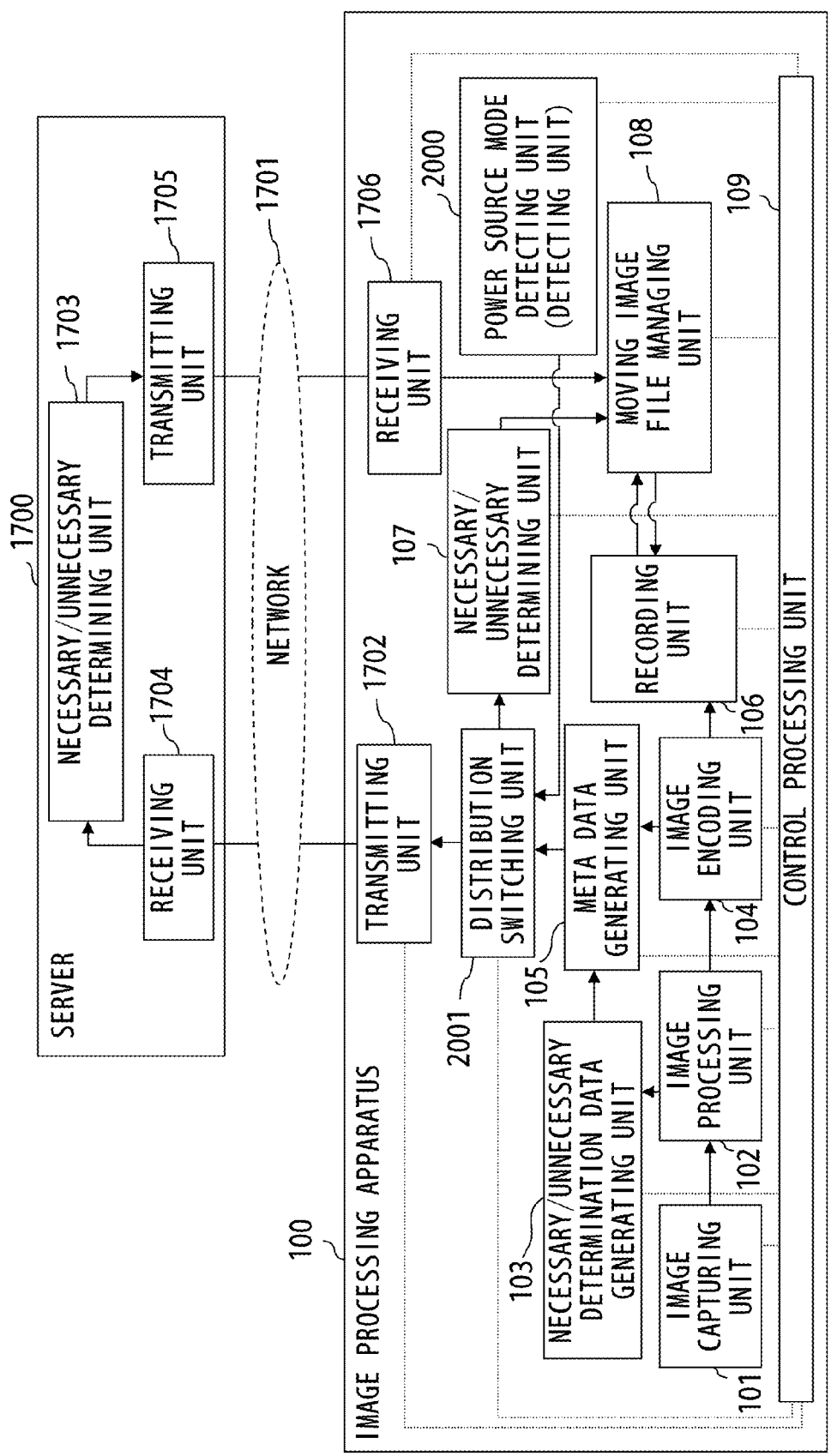
FIG. 20 is a diagram illustrating an image processing system of another embodiment of the present invention.

FIG. 20 is a diagram illustrating another embodiment of the image processing system illustrated in FIG. 19. Meanwhile, to the same configuration as the image processing system illustrated in FIG. 17, the same numeral is assigned, and explanation of the configuration is omitted.

The image processing system illustrated in FIG. 20 differs from the image processing system illustrated in FIG. 17 in that the image processing apparatus 100 further includes the necessary/unnecessary determining unit 107, a power source mode detecting unit 2000 and a distribution switching unit 2001.

The power source mode detecting unit 2000 is an example of a detecting unit that detects information for determining whether or not the image processing apparatus 100 is in a state in which a load may be applied. Meanwhile, the detecting unit in the claims is, for example, the power source mode detecting unit 2000.

The power source mode detecting unit 2000 detects the power source mode of the image processing apparatus 100 (for example, a start-up mode in which the power is supplied to all of the respective units of the image processing apparatus 100 and a power-saving (standby) mode in which the power is supplied to a part of the respective units of the image processing apparatus 100).

According to the power source mode detected by the power source mode detecting unit 2000, the distribution switching unit 2001 switches the transmission destination of meta data generated in by the meta data generating unit 105 to either one of the necessary/unnecessary determining unit 1703 of the server 1700 and the necessary/unnecessary determining unit 107 of the image processing apparatus 100. For example, when the power source mode of the image processing apparatus 100 is the "power-saving (standby) mode", the meta data is transmitted to the necessary/unnecessary determining unit 1703 of the server 1700, and when the power source mode of the image processing apparatus 100 is the "start-up mode", the meta data is transmitted to the necessary/unnecessary determining unit 107 of the image processing apparatus 100.

As described above, the image processing system illustrated in FIG. 20 is configured so that, when the power source mode of the image processing apparatus 100 is the "power-saving (standby) mode", it is determined that it is impossible to sufficiently use the resources of the image processing apparatus 100 in performing the necessary/unnecessary determination process about the moving image frame, and the server 1700 that is outside the image processing apparatus 100 is made to perform the necessary/unnecessary determination process about the moving mage frame, and therefore, the efficiency of the necessary/unnecessary determination process of about the moving image frame may be improved.

FIG. 21 is a diagram illustrating an image processing system of another embodiment of the present invention.

The image processing system illustrated in FIG. 21 includes an image processing apparatus 100a that records input moving images in a recording unit 106a, and an image reading apparatus 108a that reads out moving images from the recording unit 106a.

The recording unit 106a illustrated in FIG. 21 may be a recording unit that is built inside the image processing apparatus 100a (for example, a hard disk, RAM (Random Access Memory) and the like), or may be an external recording unit that is insertable/removable to/from the image processing apparatus 100 (for example, a medium such as a CD (Compact Disc), DVD (Digital Versatile Disc) and the like, a ROM (Read Only Memory), a memory card constituted by a non-volatile memory or a flash memory and the like, or a USB memory and the like. The recording unit 106a illustrated in FIG. 21 is assumed as an external recording unit. Meanwhile, when the recording unit 106a is built in the image processing apparatus 100a, the image processing apparatus 100a and the image reading apparatus 108a connected to each other by a communication line and the like.

The image processing apparatus 100a includes a subject detection processing unit 103a, an image encoding unit 104a, a meta data generating unit 105a, and a control processing unit 109a. Meanwhile, the control processing unit 109a, controls the operation of the respective units of the image processing apparatus 100a.

The subject detection processing unit 103a generates necessary/unnecessary determination data used to determine whether or not it is an unnecessary moving image frame respectively corresponding to each of moving image frame of a moving image input from outside (for example, an image capturing apparatus, an external recording unit, and the like) to the image processing apparatus 100a.

Figure 22:
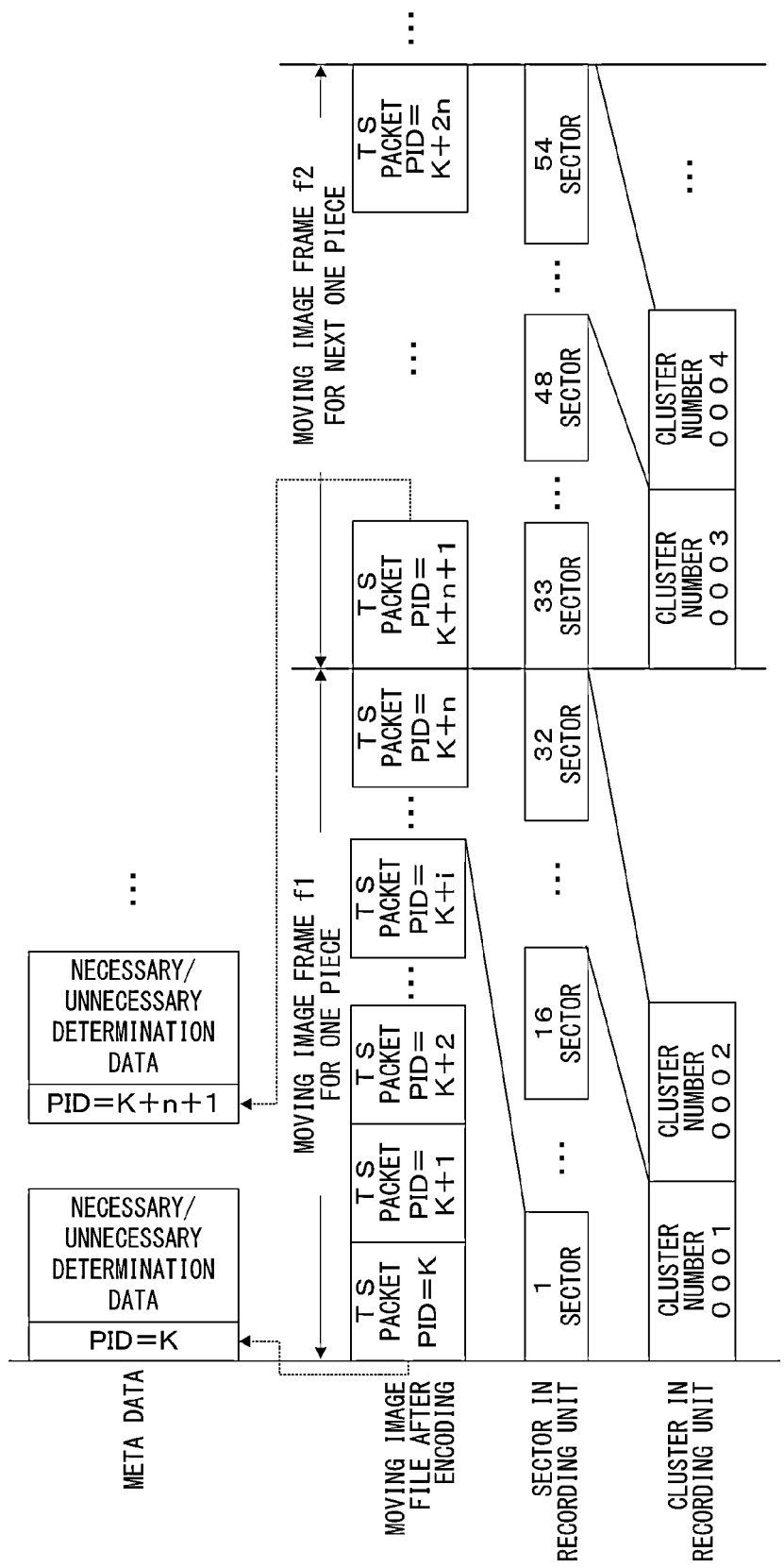
FIG. 22 is a diagram illustrating an example of meta data, a moving image frame, a sector in a recording unit, and a cluster in a recording unit.

The image encoding unit 104a encodes moving images input from outside to the image processing apparatus 100a, and also, while dividing each moving image frame of the moving images after encoding into a plurality of pieces of data respectively, assigns identification information to those pieces of data and records them in the recording unit 106a. For example, the image encoding unit 104a performs encoding of input moving images, as illustrated in FIG. 22, in the MPEG2 format, and while dividing each moving image frame of the moving images after encoding respectively into a plurality of TS packets, assigns identification information PID (K, K+1, . . . ) respectively to the TS packets, and records them in the recording unit 106a.

Meanwhile, the recording unit 106a includes an identification information/recording position table that indicates correspondence between identification information assigned respectively to each piece of data in the image encoding unit 104a and information indicating the recording position in the recording unit 106a. For example, as illustrated in FIG. 23A, the recording unit 106a includes an identification information/recording position table that indicates correspondence between the identification information PID and the cluster number indicating the position of the cluster in the recording unit 106a.

In addition, the recording unit 106a includes a recording position/data state information table that indicates correspondence between information indicating the recording position in the recording unit 106a and information indicating the state of the data at each recording position (for example, when data continues to another recording position, information indicating the recording position, information indicating that data ends at the recording position, or information indicating that there is no data at the recording position). For example, as illustrated in FIG. 23B, the recording unit 106a includes a FAT as a recording position/data state information table that indicates correspondence between the cluster number indicating the position of the cluster in the recording unit 106a and information indicating the state of data at each cluster number (for example, when data continues to another cluster, the cluster number, information: "FFFF" indicating that data ends at the cluster, or information: "0000" indicating that there is no data in the cluster).

The meta data generating unit 105a generates meta data by integrating one piece of identification information in the identification information assigned respectively to the respective pieces of data after division of the moving image frame after encoding, and necessary/unnecessary determination data corresponding to the moving image frame, and records the generated meta data in the recording unit 106a. For example, as illustrated in FIG. 22, the meta data generating unit 105a generates meta data corresponding to a moving image frame f1 by integrating identification information PID=K of the top TS packet in the respective TS packets after the division of a moving image frame f1 after encoding, and necessary/unnecessary determination data corresponding to the moving image frame f1, and records it in the recording unit 106a. In addition, the meta data generating unit 105a generates meta data corresponding to a moving image frame f2 by integrating identification information PID=K+n+1 of the top TS packet in the respective TS packets after the division of a moving image frame f2 after encoding, and necessary/unnecessary determination data corresponding to the moving image frame f2, and records it in the recording unit 106a. Meanwhile, the identification information PID integrated with the necessary/unnecessary determination data is not limited to the identification information PID of the top TS packet in the respective TS packet after the division of the moving image frame after encoding.

Meanwhile, the image encoding unit 104a may be configured to encode moving images input from outside to the image processing apparatus 100a, and also, to assign identification information respectively to the respective moving image frames of the moving image after encoding, and to record them in the recoding unit 106a. In this case, in the image encoding unit 104a, an identification information/recording position table indicating the identification information assigned respectively to the respective moving image frames and information indicating the recording position in the recording unit 106a is provided in the recording unit 106a. Meanwhile, the meta data generating unit 105a generates meta data by integrating identification information assigned to the moving image frame after encoding and necessary/unnecessary determination data corresponding to the moving image frame, and records the generated meta data in the recording unit 106a.

In addition, the image reading apparatus 108a illustrated in FIG. 21 is a personal computer and the like, and includes a necessary/unnecessary determining unit 107a, an identification information/recording position table for reading-out 110a, a recording position/data state information table for reading-out 111a, a reading-out control unit 112a, reading-out unit 113a, control processing unit 114a. Meanwhile, the control processing unit 114a controls the respective units in the image reading apparatus 108a. In addition, the necessary/unnecessary determining unit 107a, reading-out control unit 112a, the reading-out unit 113a, and the control processing unit 114a are constituted by a microcomputer and the like.

Based on the necessary/unnecessary determination data in the meta data read out from the recording unit 106a, the necessary/unnecessary determining unit 107a determines whether or not the moving image frame corresponding to the identification information in the meta data is an unnecessary moving image frame.

The identification information/recording position table for reading-out 110a is a table with the same contents as the identification information/recording position table in the recording unit 106a, and is similar to the directory illustrated in FIG. 23A for example.

The recording position/data state information table for reading-out 111a is a table with the same contents as the recording position/data state information table in the recording unit 106a, and is similar to the FAT illustrated in FIG. 23B.

Using the identification information/recording position table for reading-out 110a and the recording position/data state information table for reading-out 111a, the reading-out control unit 112a reads out, from the recording unit 106a, only the moving image frame that is determined as a necessary moving image frame by the necessary/unnecessary determining unit 107a, in the respective moving image frames of the moving image file recorded in the recording unit 106a.

The reading-out unit 113a outputs the moving image file read out from the recording unit 106a by the reading-out control unit 112a to an editing program and a playback program of moving images executed inside or outside the image reading apparatus 108a, or, to a display apparatus provided inside or outside the image reading apparatus 108a.

FIG. 24 is a flowchart illustrating an example of the operations of the image reading apparatus 108a.

First, when there is a reading-out request of the moving image file in the recording unit 106a from an editing program and a playback program of moving images executed inside or outside the image reading apparatus 108a (Yes in S11a), the necessary/unnecessary determining unit 107a reads out, from the recording unit 106a, meta data corresponding to one or more moving image frames in the respective moving image frames of the moving image file indicated in the reading-out request and the like (S12a).

Next, based on the necessary/unnecessary determination data in the read out meta data, the necessary/unnecessary determining unit 107a determines whether or not the moving image frame corresponding to the identification information in the meta data is a necessary moving image frame (S13a).

When it is determined that it is not a necessary moving image frame (No in S13a), the necessary/unnecessary determining unit 107a determines whether or not all the necessary moving image frames in the respective moving image frames in the moving image file indicated in the reading-out request and the like have been read out from the recording unit 106*a* (S14*a*).

When the necessary/unnecessary determining unit 107*a* determines that all the necessary moving image frames have been read out (Yes in S14*a*), it terminates the reading-out process, and when it determines that all the necessary moving image frames have not been read out (No in S14*a*), returning to S12*a*, it reads out meta data corresponding to next one or more moving image frame from the recording unit 106*a*.

In addition, in S13*a* above, when it is determined that the moving image frame corresponding to the identification information in the meta data read out from the recording unit 106*a* is a necessary moving image frame (Yes in S13*a*), the reading-out control unit 112*a* refers to the identification information/recording position table for reading-out 110*a* and the recording position/data state information table for reading-out 111*a* (S15*a*), reads out the necessary moving image frame from the recording unit 106*a* (S16*a*), and determines whether or not all the necessary moving image frames have been read out (S14*a*).

For example, when the moving image frame f2 illustrated in FIG. 22 is determined as necessary, the reading-out control unit 112*a* identifies, using the directory illustrated in FIG. 23A, "0003" as the cluster number indicating the position of the cluster in the recording unit 106*a* corresponding to identification information PID=K+n+1 of the moving image frame f2. Next, the reading-out control unit 112*a* reads out, using the FAT illustrated in FIG. 23B, data recorded at the identified cluster number "0003", and also reads out data recorded at the next cluster number "0004".

Meanwhile, while in the flowchart illustrated in FIG. 24, the configuration is made so that the necessary/unnecessary determination about moving image frames is made for each piece of meta data, that is, for each moving image frame, the configuration may also be made so that the necessary/unnecessary determination about moving image frames is made for every prescribed number of moving image frames. Meanwhile, the prescribed number of moving image frames may be set in advance by the user and the like based on the amount of the moving image frames that are necessary at the time of editing and playback. By making the configuration in such a way, the calculation amount of the necessary/unnecessary determining unit 107*a* may be reduced.

In addition, a table in which all the pieces of identification information recorded in the recording unit 106*a* and information indicating the recording position in the recording unit 106*a* corresponding respectively to the pieces of identification information are associated may be provided. In this case, the reading-out control unit 112*a* may be configured to read out, using this table, only the data recorded at the recorded position in the recording unit 106*a* corresponding to the identification information of the moving image frame determined as a necessary moving image frame by the necessary/unnecessary determining unit 107*a*, from the recording unit 106*a*.

The image processing system illustrated in FIG. 21 is configured so that, in the precedent stage of the editing work and the playback work, the moving image frame determined as a necessary moving image frame in the respective moving image frames of the moving image file is read out from the recording unit 106*a*, and therefore, when reading out the moving image file from the recording unit 106*a*, moving image frames other than unnecessary moving image frames are read out. As described above, since it is possible to read out the moving image file from which unnecessary moving image frames are removed in the precedence stage of the editing work and the playback work, the time taken to load the moving image file onto the editing program and the playback program may be shortened at the time of the editing work and the playback work, and the decrease in the efficiency of the editing work and the playback work may be suppressed.

In addition, the image processing system illustrated in FIG. 21 is configured to use the identification information assigned to each piece of data or each moving image frame after the division of the moving image frame to identify the recording position in the recording unit 106*a* corresponding to the necessary moving image frame, and therefore, the data processing in generating meta data and in reading out meta data may be reduced, and the load put on the image processing apparatus 100*a* and the image reading apparatus 108*a* may be suppressed.

Meanwhile, when performing encoding in the MPEG format to an input moving image, the image encoding unit 104*a* performs the encoding, as illustrated in FIG. 25 for example, in the unit of compression of SH and GOP (for example, I frame (Intra Picture), B1 frame through B3 frame, P frame). In this case, the reading-out control unit 112*a* reads out, from the recording unit 106*a*, the GOP including the necessary moving image frame. In the example in FIG. 25, data recorded at the cluster number "0002" corresponding to the GOP including the top frame B1 of the necessary moving image is read out from the recording unit 106*a*, and also, data recorded at the cluster number "0014" corresponding to the GOP including the last frame B2' of the necessary moving image is read out.

FIG. 26A is a diagram illustrating an image processing system including an image capturing unit 600*a* as embodiment 1 of the image processing apparatus 100*a*. To the same configuration as the configuration illustrated in FIG. 21, the same numeral is assigned and explanation for it is omitted.

The image capturing unit 600*a* illustrated in FIG. 26A is, for example, a digital camera and the like, and includes an image capturing unit 101*a*, an image processing unit 102*a*, a subject detection processing unit 601*a*, an image encoding unit 104*a*, a meta data generating unit 105*a*, and a control processing unit 109*a*.

For example, the image capturing unit 101*a* converts the subject image whose image is formed on the imaging device such as the CCD (Charge Coupled Device) by the lens into an electric signal, to obtain moving images composed of still image frames or a plurality of moving image frames.

The image processing unit 102*a* performs various image processing such as sharpness correction, contrast correction, luminance/chrominance signal generation and white balance correction, to the still image or each moving image frame of the moving image obtained by the image capturing unit 101*a*.

The image encoding unit 104*a* performs encoding in the JPEG (Joint Photographic Experts Group) format to the still image frame after image processing. In addition, the image encoding unit 104*a* performs encoding in the MPEG format and the like to the moving image after image processing.

The image capturing unit 600*a* illustrated in FIG. 26A is characterized in that a subject detection processing unit 601*a* is included as the necessary/unnecessary determination data generating unit 103, and by the subject detection processing unit 601*a*, in each moving image frame of the moving image after image processing, respectively, the "position of the subject" and the "size of the subject" as the necessary/unnecessary determination data are detected, and the meta data generating unit 105*a*, the detected "position of the subject" and the "size of the subject" and the identification information PID are integrated, and recorded in the recording unit 106*a* as meta data.

Figure 26B:
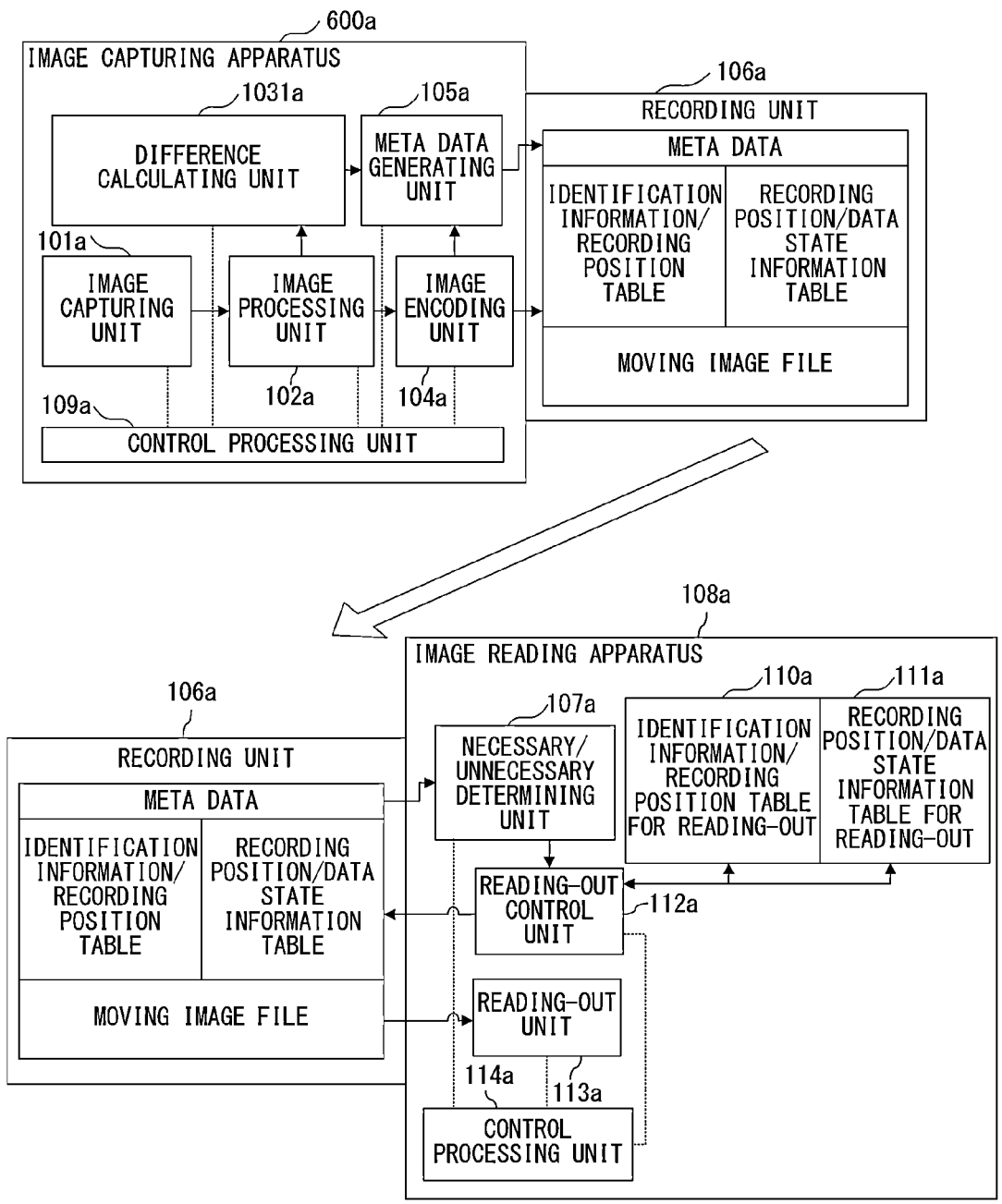
FIG. 26B is a diagram illustrating a variation example (part 1) of an image processing system including an image capturing apparatus as embodiment 1 of the image processing apparatus illustrated in FIG. 21.
Figure 27:
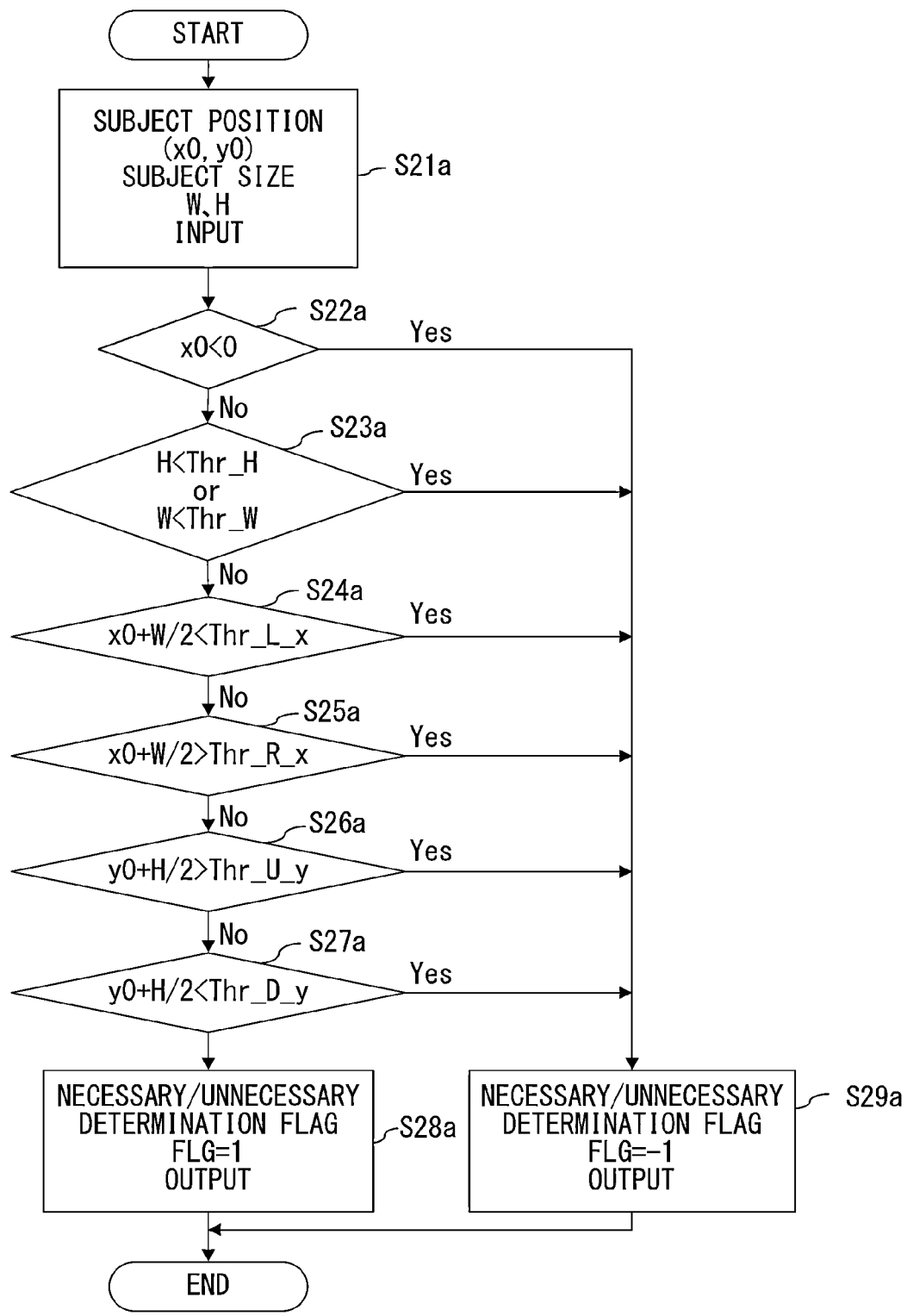
FIG. 27 is a flowchart illustrating operation of a necessary/unnecessary determining unit in an image processing system including an image capturing apparatus as embodiment 2 of the image processing apparatus illustrated in FIG. 21.

FIG. 27 is a flowchart illustrating an example of the operations of the necessary/unnecessary determining unit 107a illustrated in FIG. 26A.

First, the necessary/unnecessary determining unit 107a inputs the "position of the subject" and the "size of the subject" indicated in meta data read out from the recording unit 106a (S21a). Meanwhile, after detecting the subject within the moving image frame after image processing, the subject detection processing unit 601a regards a rectangular area enclosing the detected subject as the subject area, and regards the upper-left pixel position (x0, y0) of the subject area as the "position of the subject". In addition, the subject detection processing unit 601a regards the number of pixels in the lateral direction of the subject area as W as the "size of the subject", and also regards the number of pixels in the vertical direction of the subject area as H. Meanwhile, when no subject is detected from the moving image frame, the subject detection processing unit 601a makes x0 a smaller value than 0. In addition, the upper-left pixel position of the moving image frame is assumed as (1, 1).

Next, the necessary/unnecessary determining unit 107a determines whether or not x0 is smaller than 0, that is, whether or not the subject has been detected (S22a).

When it has been determined that the subject has been detected (No in S22a), the necessary/unnecessary determining unit 107a determines whether or not W is smaller than a Thr_W, or whether or not H is smaller than a threshold Thr_H, that is, whether or not the subject is smaller than a prescribed size (S23a). Meanwhile, the threshold Thr_W and the threshold Thr_H may be set in advance by the user and the like.

When it is determined that the subject is larger than the prescribed size (No in S23a), the necessary/unnecessary determining unit 107 determines whether or not x0+W/2 is smaller than a threshold Thr_L_x, that is, whether or not the left edge of the subject area deviates outward from the left edge of the moving image frame (S24a). Meanwhile, the threshold Thr_L_x may be set in advance by the user and the like.

When it is determined that the subject area does not deviate outward from the left edge of the moving image frame, (No in S24a), the necessary/unnecessary determining unit 107a determines whether or not x0+W/2 is larger than a threshold Thr_R_x, that is, whether the right edge of the subject area deviates outward from the right edge of the moving image frame (S25a). Meanwhile, the threshold Thr_R_x may be set by the user and the like in advance.

When it is determined that the right edge of the subject area does not deviate from the right edge of the moving image frame (No in S25a), the necessary/unnecessary determining unit 107a determines whether or not y0+H/2 is larger than a threshold Thr_U_y, that is, whether or not the upper edge of the subject area deviates outward from the upper edge of the moving are (S26a). Meanwhile, the threshold Thr_U_y may be set by the user and the like in advance.

When it is determined that the upper edge of the subject area does not deviate from the upper edge of the moving image frame (No in S26a), the necessary/unnecessary determining unit 107a determines whether or not y0+H/2 is smaller than a threshold Thr_D_y, that is, whether or not the bottom edge of the subject area deviates outward from the bottom edge of the moving image frame (S27a). Meanwhile, the threshold Thr_U_y may be set by the user and the like in advance.

Figure 28:
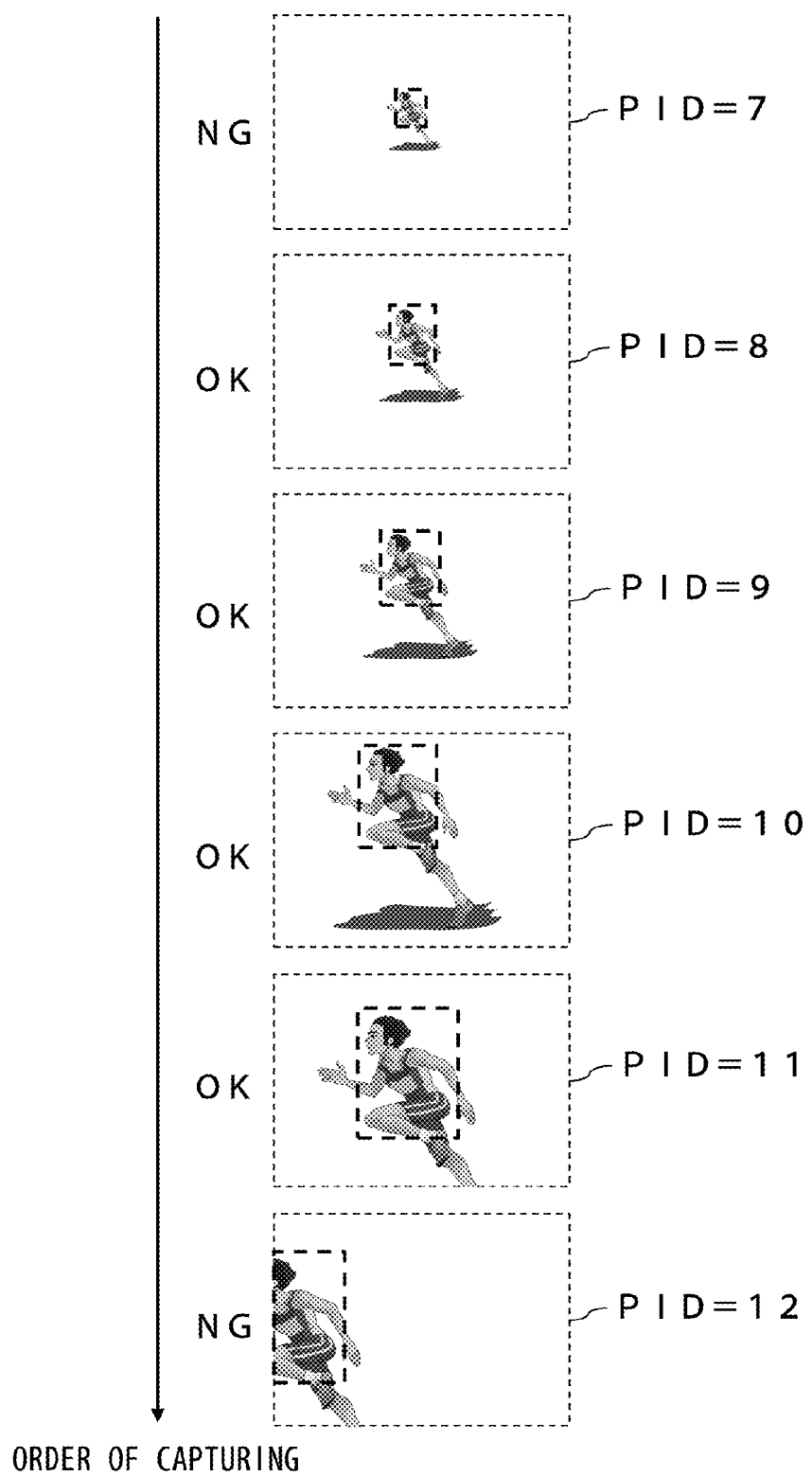
FIG. 28 is a diagram illustrating an example of a moving image frame determined as necessary and a moving image frame determined as unnecessary in an image processing system including an image capturing apparatus as embodiment 2 of the image processing apparatus illustrated in FIG. 21.

When it is determined that the bottom edge of the subject area does not deviate outward from the bottom edge of the moving image frame (No in S27a), the necessary/unnecessary determining unit 107a determines the moving image frame as a moving image frame that is necessary at the time of editing and playback, and together with a necessary/unnecessary determination flag FLG=1 indicating that the moving image frame corresponding to the identification information in meta data read out from the recording unit 106a is a moving image frame that is necessary at the time of editing and playback, outputs the identification information to the reading-out control unit 112a (S28a). For example, as illustrated in FIG. 28, the necessary/unnecessary determining unit 107a determines each moving frame of identification information PID=8 through 11 in which the subject is larger than a prescribed size and the subject exists around the center of the moving image frame as a moving image frame that is necessary at the time of editing and playback (OK).

Meanwhile, when the necessary/unnecessary determining unit 107a makes a determination as at least one of "the subject has not been detected (Yes in S22a)", "the subject is smaller than a prescribed size (Yes in S23a)", "the subject area deviates outward from the left edge of the moving image frame (Yes in S24a)", "the subject area deviates outward from the right edge of the moving image frame (Yes in S25a)", "the subject area deviates outward from the upper edge of the moving image frame (Yes in S26a)", and "the subject area deviates outward from the bottom edge of the moving image frame (Yes in S27a)", it determines the moving image frame as a moving image frame that is unnecessary at the time of editing and playback, and together with a necessary/unnecessary determination flag FLG=−1 indicating that the moving image frame corresponding to the identification information in meta data read out from the recording unit 106a is an unnecessary frame at the time of editing and playback, outputs the identification information to the reading-out control unit 112a (S28a). For example, as illustrated in FIG. 28, the necessary/unnecessary determining unit 107a determines the moving image frame of identification information PID=7 in which the subject is smaller than a prescribed size and the moving image frame of identification information PID=12 in which the subject deviates from the moving image frame as a moving image frame (NG) that is unnecessary at the time of editing and playback.

Then, when the necessary/unnecessary determination flag FLG=1 and the identification information are output from necessary/unnecessary determining unit 107a, the reading-out control unit 112a reads out the moving image frame corresponding to the identification information from the recording unit 106a, and when the necessary/unnecessary determination flag FLG=−1 and the identification information are output from the necessary/unnecessary determining unit 107a, it does not read out the moving image frame corresponding to the identification information from the recording unit 106a.

The image reading apparatus 108a illustrated in FIG. 26A is effective in reducing the amount of data at the time of the reading out of moving image files obtained when the subject moves wildly such as when watching a sport and a race, as whether a moving image frame is necessary/unnecessary is determined according to the position and the size of the subject.

Figure 29:
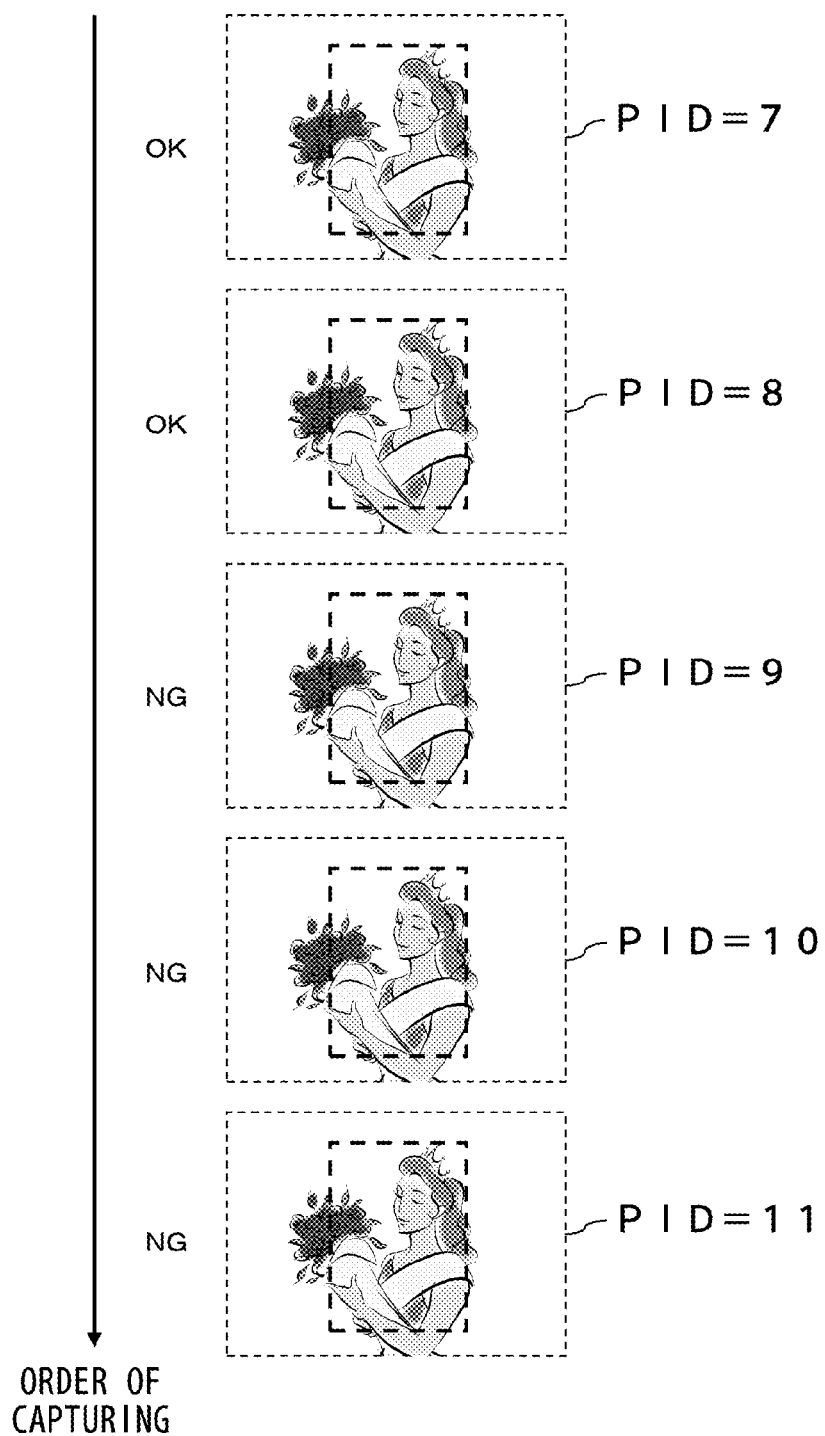
FIG. 29 is a diagram illustrating another example of a moving image frame determined as necessary and a moving image frame determined as unnecessary in an image processing system including an image capturing apparatus as embodiment 2 of the image processing apparatus illustrated in FIG. 21.

Meanwhile, in the operation example of the necessary/unnecessary determining unit 107a illustrated in FIG. 27, the configuration is made so that the composition index described in meta data is based on the position and the size of the subject, and the necessary/unnecessary determination of the moving image frame is performed, but the configuration may also be made, as illustrated in FIG. 29, so that, when moving image frame in similar compositions are obtained successively, these moving image frames are determined as moving image frames that are unnecessary at the time of editing and playback. For example, in the necessary/unnecessary determining unit 107a, when it is determined that the difference between the composition of the moving image frame corresponding to identification information PID=7 and the composition of the moving image frames corresponding to identification information PID=8, 9 is equal to or smaller than a prescribed value, the reading-out control unit 112a does not read out the moving image frames after identification information PID=9 from the recording unit 106a. When there are equal to or more than a prescribed number of successive frames with a difference in composition equal to or smaller than a prescribed value, the reading-out control unit 112a does not read out the moving image frames of identification information corresponding to apart of the successive frames from the recording unit 106a.

Figure 26C:
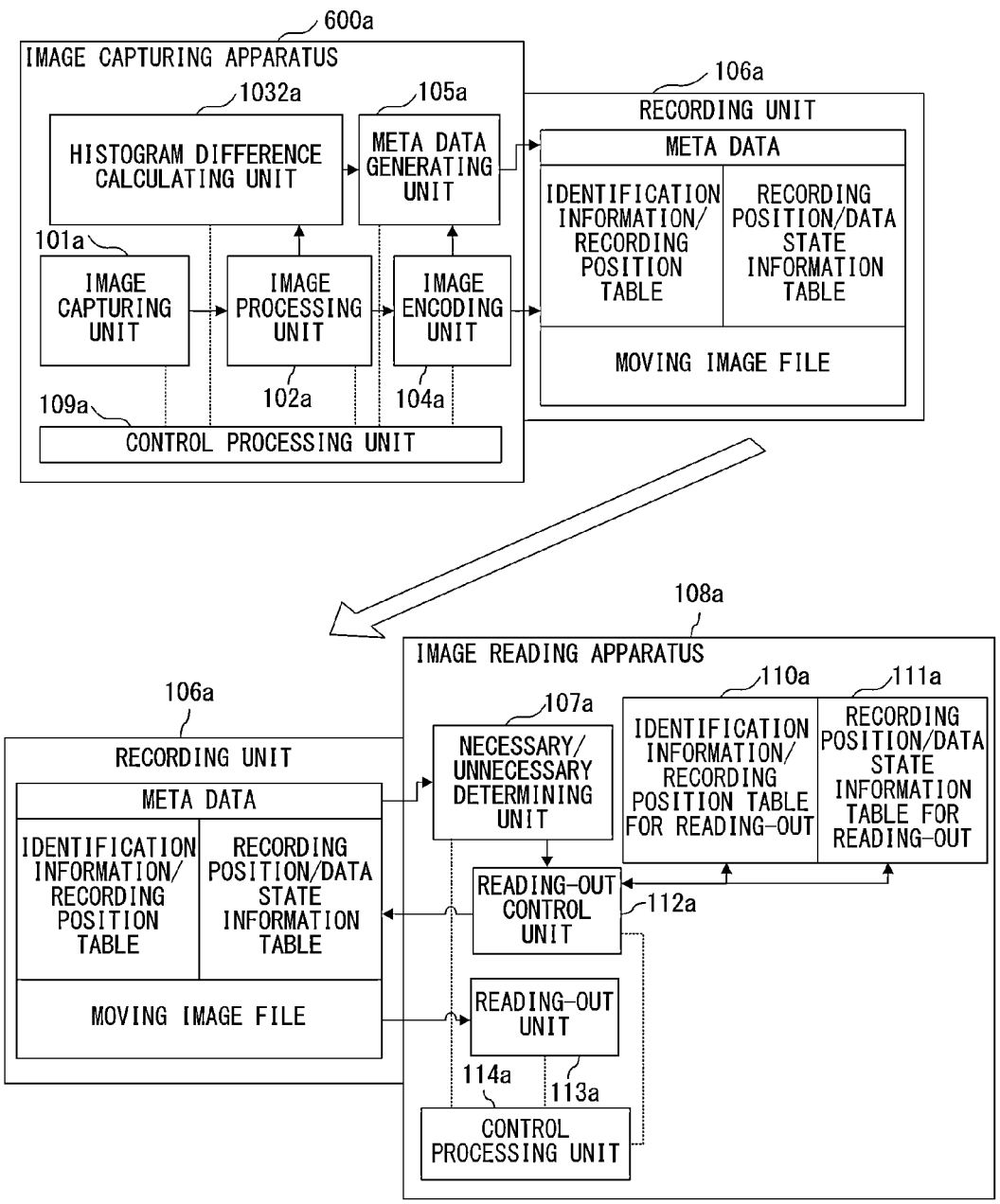
FIG. 26C is a diagram illustrating a variation example (part 2) of an image processing system including an image capturing apparatus as embodiment 1 of the image processing apparatus illustrated in FIG. 21.

Meanwhile, as a method to measure the difference between the frames described above, other than the difference in detection of the composition index, that is, the position size of the subject, the difference between frames may be obtained based on the statistic of the image. Decision as unnecessary when the total value of the differences of the level differences between frames is equal to or smaller than a prescribed value, when the total value of the amounts of change of the histogram of frames to compare is equal to or smaller than a prescribed value, and the like may be used. For example, as illustrated in FIG. 26B, a difference calculating unit 1031a that integrates the differences between frames is provided instead of the subject detection processing unit 103a. In addition, when using histogram, for example, as illustrated in FIG. 26C, a histogram difference calculating unit 1032a that calculates histogram and calculates the differences of the histograms of frames or the integration of them is provided instead of the subject detection processing unit 103a.

FIG. 30 is a diagram illustrating an image processing system including an image capturing apparatus 1000a as embodiment 2 of the image processing apparatus 100a. Meanwhile, to the same configuration as the configuration illustrated in FIG. 26, the same numeral is assigned and description for the configuration is omitted.

The image capturing apparatus 1000a illustrated in FIG. 30 is characterized in that, a focus information processing unit 1001a is provided, and by the focus information processing unit 1001a, for each moving image frame of the moving image after image processing, respectively, "focus information" is set as the necessary/unnecessary determination data, and by the meta data generating unit 105a, the "focus information" and the identification information PID are integrated and recorded in the recording unit 106a as meta data.

FIG. 31 is a flowchart illustrating an example of the operation of the necessary/unnecessary determining unit 107a illustrated in FIG. 30.

First, the necessary/unnecessary determining unit 107a inputs "focus information" indicated in meta data read out from the recording unit 106a (S31a). Meanwhile, every time when the image capturing unit 101a obtains a moving image frame, the focus information processing unit 1001a obtains a contrast evaluation value C0 corresponding to the moving image frame from the image processing unit 102a, and also obtains the lens position L0 of the focus lens from the image capturing unit 101a and output them to the meta data generating unit 105a. In addition, when the focusing has failed, that is, the focus lens is out of focus, the image processing unit 102a makes the contrast evaluation value C0 a smaller value than 0.

Next, when the necessary/unnecessary determining unit 107a determines that C0 is equal to or larger than 0, that is, the focus lens is in focus (No in S32a), it keeps the lens position L0_n corresponding to the currently-obtained moving image frame in a storing unit that is inside or outside the necessary/unnecessary determining unit 107a (S33a).

Next, the necessary/unnecessary determining unit 107a reads out the lens position L0_n corresponding to the currently-obtained moving image frame and the lens position L0_n−1 corresponding to the last-obtained moving image frame from the storing unit described above (S34a), and determines whether or not the absolute value of the difference between the lens position L0_n and the lens position L0_n−1 is larger than a threshold Thr_L, that is, whether or not the focus is unstable (S35a). Meanwhile, the threshold Thr_L may be set by the user and the like in advance.

When it is determined that the focus is stable (No in S35a), the necessary/unnecessary determining unit 107a determines that the moving image frame as a moving image frame that is necessary at the time of editing and playback, and together with a necessary/unnecessary determination flag FLG=1 indicating that the moving image frame corresponding to the identification information in meta data read out from the recording unit 106a is a moving image frame that is a necessary moving image frame at the time of editing and playback, outputs the identification information to the reading-out control unit 112a (S36a).

Meanwhile, when the necessary/unnecessary determining unit 107 determines that the focusing has failed (Yes in S32a) or the focus is unstable (Yes in S35a), it determines that the moving image frame is a moving image frame that is unnecessary at the time of editing and playback, and together with a necessary/unnecessary determination flag FLG=−1 indicating that the moving image frame corresponding to the identification information in meta data read out from the recording unit 106 is a moving image frame that is unnecessary at the time of editing and playback, outputs the identification information to the reading-out control unit 112a (S37a).

Then, when the necessary/unnecessary determination flag FLG=1 and the identification information are output from the necessary/unnecessary determining unit 107a, the reading-out control unit 112a reads out the moving image frame corresponding to the identification information from the recording unit 106a, and when the necessary/unnecessary determination flag FLG=−1 and the identification information are output from the necessary/unnecessary determining unit 107a, it does not read out the moving image frame corresponding to the identification information from the recording unit 106a.

The image reading apparatus 108a illustrated in FIG. 30 is effective reducing the amount of data at the time of the reading out of moving image files obtained when not only the subject but also the person who is capturing the image is moving, as the necessary/unnecessary determination of about a moving image frame is made according to whether or not focusing has failed or whether or not the focus is unstable.

FIG. 32 is a diagram illustrating an image processing system including an image capturing apparatus 1200a as embodiment 3 of the image processing apparatus 100a. Meanwhile, to the same configuration as the configuration illustrated in FIG. 26, the same numeral is assigned and description for the configuration is omitted.

The image capturing apparatus 1200a illustrated in FIG. 32 is characterized in that, a zoom information processing unit 1201a is provided, and by the zoom information processing unit 1201a, for each moving image frame of the moving image after image processing, respectively, "zoom information" is set as the necessary/unnecessary determination data, and by the meta data generating unit 105a, the "zoom information" and the identification information PID are integrated and recorded in the recording unit 106a as meta data.

FIG. 33 is a flowchart illustrating an example of the operation of the necessary/unnecessary determining unit 107a illustrated in FIG. 32.

First, the necessary/unnecessary determining unit 107a inputs the "zoom information" indicated in meta data read out from the recording unit 106a (S41a). Meanwhile, every time when the image capturing unit 101a obtains a moving image frame, the zoom information processing unit 1201a obtains zoom information Z0 (for example, the lens position, the amount of lens movement of the zoom lens and the like) corresponding to the moving image frame from the image capturing unit 101a, and outputs it to the meta data generating unit 105a.

Next, the necessary/unnecessary determining unit 107a keeps the input zoom information Z0 in a storing unit that is inside or outside the necessary/unnecessary determining unit 107a (S42a).

Next, the necessary/unnecessary determining unit 107a reads out the zoom information $Z0\_n$ corresponding to the currently-obtained moving image frame and the zoom information $Z0\_n-1$ corresponding to the last-obtained moving image frame from the storing unit (S43a), and determines whether or not the absolute value of the difference between the zoom information $Z0\_n$ and the zoom information $Z0\_n-1$ is larger than a threshold Thr_Z, that is, whether or not the lens position of the zoom lens is not stable (S44a). Meanwhile, the threshold Thr_Z may be set by the user and the like in advance.

When it is determined that the lens position of the zoom lens is stable (No in S44a), the necessary/unnecessary determining unit 107a determines that the moving image frame is a moving image frame that is necessary at the time of editing and playback, and together with a necessary/unnecessary determination flag FLG=1 indicating that the moving image frame corresponding to the identification information in meta data read out from the recording unit 106a is a moving image frame that is necessary moving image frame at the time of editing and playback, outputs the identification information to the reading-out control unit 112a (S45a).

Meanwhile, when the necessary/unnecessary determining unit 107a determines that the lens position of the zoom lens is unstable (Yes in S44a), it determines the moving image frame as a moving image frame that is unnecessary at the time of editing and playback, and together with a necessary/unnecessary determination flag FLG=−1 indicating that the moving image frame corresponding to the identification information in meta data read out from the recording unit 106a is a moving image frame that is unnecessary at the time of editing and playback, outputs the identification information to the reading-out control unit 112a (S46a).

Then, when the necessary/unnecessary determination flag FLG=1 and the identification information are output from necessary/unnecessary determining unit 107a, the reading-out control unit 112a reads out the moving image frame corresponding to the identification information from the recording unit 106a, and when the necessary/unnecessary determination flag FLG=−1 and the identification information are output from the necessary/unnecessary determining unit 107a, it does not read out the moving image frame corresponding to the identification information from the recording unit 106a.

The image reading apparatus 108a illustrated in FIG. 32 is effective in reducing the amount of data at the time of the reading out of moving image files obtained when, for example, the subject is moving in the forward/backward directions with respect to the person who is capturing the image, as the necessary/unnecessary determination of about a moving image frame is made according to whether or not the lens position of the zoom lens is unstable.

Meanwhile, the information used for the necessary/unnecessary determination process of about the necessary moving image frame at the time of editing and playback of the moving image is not limited to the position and size of the subject, the focus information or the zoom information described above. For example, the histogram of the luminance gradation of the respective image frames after image processing.

In addition, two or more pieces of information from the position and size of the subject, the focus information, the zoom information and the histogram of the luminance gradation mentioned above may be combined and used for the necessary/unnecessary determination process of about the necessary moving image frame at the time of editing and playback of the moving image.

FIG. 34 is a diagram illustrating an image processing system including an image capturing apparatus 1400a as embodiment 4 of the image processing apparatus 100a. Meanwhile, to the same configuration as the configuration illustrated in FIG. 26, the same numeral is assigned and description for the configuration is omitted.

The image capturing apparatus 1400a illustrated in FIG. 34 is characterized in that a radio antenna 1401a and a reception signal strength detecting unit 1402a are provided, and by the reception signal strength detecting unit 1402a, for each moving image frame of the moving image after image processing, respectively, RSSI R0 is detected, and by the meta data generating unit 105a, the RSSI R0 and the identification information PID are integrated and recorded in the recording unit 106a as meta data. Meanwhile, it is assumed that the radio antenna 1401a receives a signal transmitted from a transmitter provided in the subject and a signal transmitted from the image capturing apparatus 1400a and reflected on the subject.

FIG. 35 is a flowchart illustrating an example of the operation of necessary/unnecessary determining unit 107a illustrated in FIG. 34.

First, the necessary/unnecessary determining unit 107a inputs the RSSI R0 indicated in meta data read out from the recording unit 106a (S51a). Meanwhile, every time when the image capturing unit 101a captures a moving image frame, the reception signal strength detecting unit 1402a outputs the level of the reception signal received by the radio antenna 1401a while associating it to the moving image frame, to the meta data generating unit 105a as RSSI R0.

Next, the necessary/unnecessary determining unit 107a determines whether or not the input RSSI R0 is larger than a threshold Thr_R, that is, whether or not the subject is far with respect to the image capturing apparatus 1400a (S52a). Meanwhile, the threshold Thr_R may be set by the user and the like in advance.

Figure 36:
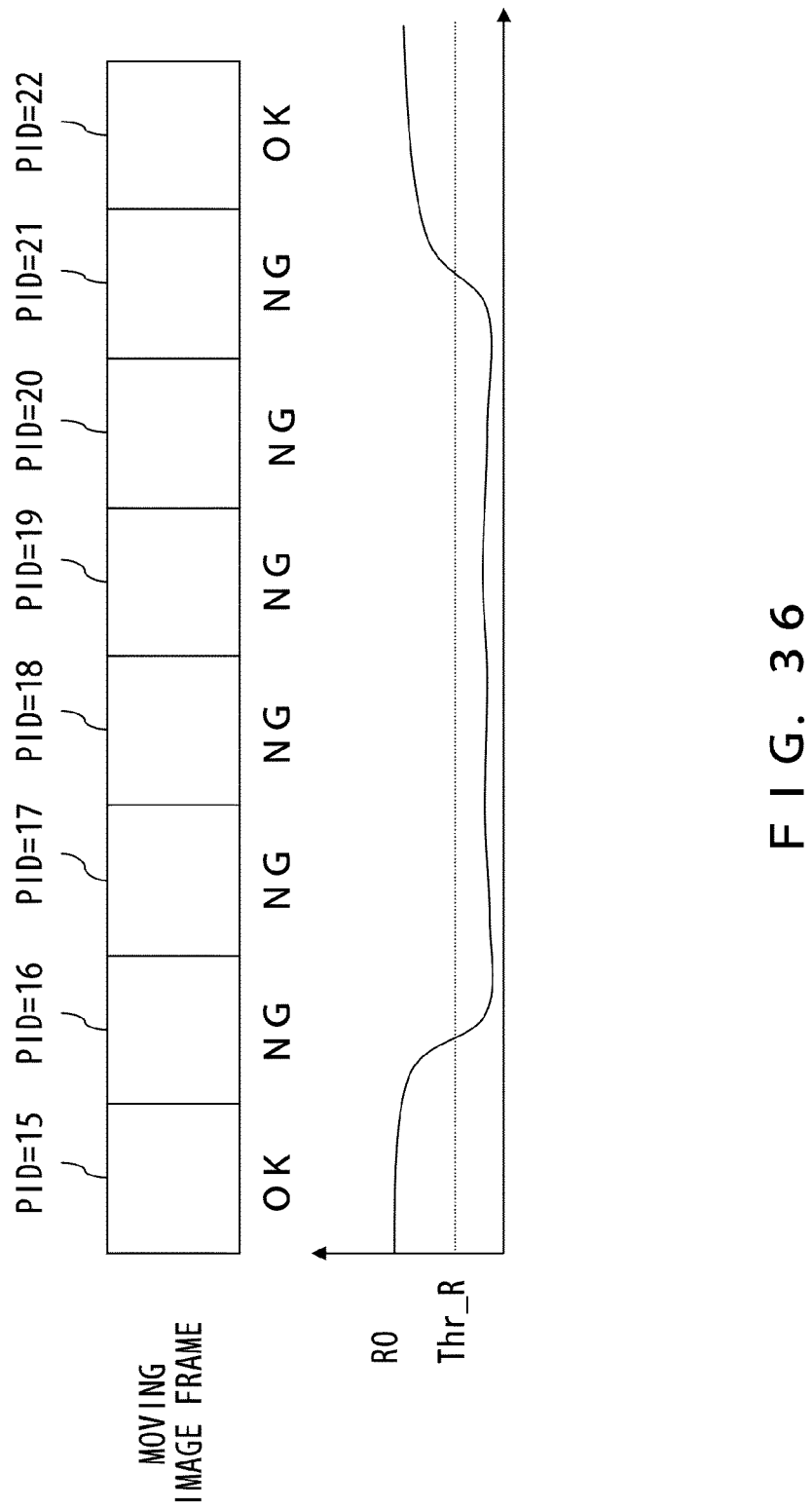
FIG. 36 is a diagram illustrating another example of a moving image frame determined as necessary and a moving image frame determined as unnecessary in an image processing system including an image capturing apparatus as embodiment 6 of the image processing apparatus illustrated in FIG. 21.

When it is determined that the subject is not at a far position with respect to the image capturing apparatus 1400a (No in S52a), the necessary/unnecessary determining unit 107a determines that the moving image frame is a moving image frame that is necessary at the time of editing and playback, and together with a necessary/unnecessary determination flag FLG=1 indicating that the moving image frame corresponding to the identification information in meta data read out from the recording unit 106a is a moving image frame that is a necessary moving image frame at the time of editing and playback, outputs the identification information to the reading-out control unit 112a (S53a). For example, the necessary/unnecessary determining unit 107a determines the respective moving image frames of identification information PID=15, 22 in which the RSSI R0 is larger than the threshold Thr_R as a moving image frame that is necessary at the time of editing and playback (OK), as illustrated in FIG. 36.

Meanwhile, when the necessary/unnecessary determining unit 107a determines that the subject is far with respect to the image capturing apparatus 1400a (Yes in S52a), it determines that the moving image frame is a moving image frame that is unnecessary at the time of editing and playback, and together with a necessary/unnecessary determination flag FLG=−1 indicating that the moving image frame corresponding to the identification information in meta data read out from the recording unit 106a is an unnecessary moving image frame that is unnecessary at the time of editing and playback, outputs the identification information to the reading-out control unit 112a (S54a). For example, the necessary/unnecessary determining unit 107a determines the respective moving image frames of identification information PID=16 through 21 in which the RSSI R0 is smaller than the threshold Thr_R as a moving image frame that is unnecessary at the time of editing and playback (NG), as illustrated in FIG. 36.

Then, when the necessary/unnecessary determination flag FLG=1 and the identification information are output from the necessary/unnecessary determining unit 107a, the reading-out control unit 112a reads out the moving image frame corresponding to the identification information from the recording unit 106a, and when the necessary/unnecessary determination flag FLG=−1 and the identification information are output from the necessary/unnecessary determining unit 107a, it does not read out the moving image frame corresponding to the identification information from the recording unit 106a.

The image reading apparatus 108a illustrated in FIG. 34 is effective in reducing the amount of data at the time of the reading out of moving image files obtained when, for example, the subject is moving in the forward/backward directions with respect to the image capturing apparatus 1400a, as the necessary/unnecessary determination of about a moving image frame is made according to RSSI R0.

Meanwhile, in the image capturing apparatus 1400a described above, the configuration is made so that the necessary/unnecessary determination of the moving image frame is made, in the necessary/unnecessary determining unit 107a, based on whether or not the RSSI R0 is larger than the threshold Thr_R, but the configuration may also be made so that the necessary/unnecessary determination of the moving image frame is made, in the reception signal strength detecting unit 1402a of the image capturing apparatus 1400a, based on whether or not the RSSI R0 is larger than the threshold Thr_R. When making the configuration in this way, in the meta data generating unit 105a, the necessary/unnecessary determination flag FLG=1 indicating a necessary moving image frame and the identification information corresponding to the moving image frame are integrated to generate meta data. Meanwhile, reading-out control unit 112a reads out, from the recording unit 106a, only the moving image frame corresponding to the identification information in the meta data including the necessary/unnecessary determination flag FLG=1. In the image reading apparatus 108a configured in this way, the necessary/unnecessary determining unit 107a may be omitted.

Meanwhile, in the image processing system illustrated in FIG. 21, the image processing apparatus 100a and the image reading apparatus 108a are configured respectively with an independent apparatus, but as illustrated in FIG. 37, they may be configured with an integrated apparatus by including the function of the image reading apparatus 108a in the image processing apparatus 100a. The operations of each unit of the image processing apparatus 100a illustrated in FIG. 37 are similar to the operations described above and description for them is omitted.

Meanwhile, in each of the embodiments described above, the configuration may also be made so that the reading-out operation is performed only when the necessary/unnecessary determining unit 107a outputs only the necessary/unnecessary determination flag FLG=1 to the reading-out control unit 112a together with the identification information, and the reading-out control unit 112a receives the necessary/unnecessary determination flag FLG=1 and the identification information.

FIG. 38 is a diagram illustrating an image processing apparatus of another embodiment of the present invention. Meanwhile, the objective of the image processing apparatus 10 illustrated in FIG. 38 is to improve the efficiency of the editing work and playback work of a plurality of pieces of image data.

The image processing apparatus 10 illustrated in FIG. 38 includes an input unit 11, a processing unit 12, an output unit 13, a feature data obtaining unit 14, a reference feature data obtaining unit 15, feature data evaluating unit 16, and a control processing unit 17. Meanwhile, the input unit 11 and the feature data obtaining unit 14 may be configured as one. Meanwhile, the image process apparatus in the present application is assumed to mean the processing of data related to images, such as the evaluation and necessary/unnecessary determination of an image used for image processing using feature data of the image, not limited to the processing of image data.

The input unit 11 obtains image data (for example, a moving image and a plurality of still images) from outside (for example, an external server and the image capturing unit).

The processing unit 12 performs various image processing (control) such as sharpness correction, contrast correction, luminance/chrominance signal generation and white balance correction, meta data assignment, trimming process and the like, to the image data determined as necessary by the control processing unit 17, in image data obtained by input unit 11.

The output unit 13 outputs image data that received various image processing by the processing unit 12 to outside (for example, a display apparatus and a recording apparatus).

The feature data obtaining unit 14 obtains feature data (for example, meta data respectively corresponding to a plurality of still image images arranged in time series, moving image header data, or, data corresponding to the frame and the packet of the moving image by the time code) corresponding to image data from outside.

The reference feature data obtaining unit 15 obtains reference feature data. Meanwhile, the reference feature data obtaining unit 15 may obtain reference feature data from outside, or may be storing it in advance. Meanwhile, the reference feature data obtaining unit 15 may be a recording unit that is built inside the image processing apparatus 10 such as a hard disk constituted by, for example, a ROM, RAM, non-volatile memory or a flash memory, or may be an external recording unit that is insertable/removable to/from the image processing apparatus 10 such as a CD, DVD, memory card, or a USB memory.

The feature data evaluating unit 16 evaluates feature data based on reference feature data. Meanwhile, reference feature data is assumed to be, for example, a value evaluated by evaluation items that indicate the degree of satisfaction or the degree of dissatisfaction of the user about image data. For example, reference feature data is assumed to be a value evaluated by evaluation items such as the blurring, shaking, contrast, definition, angle of view misalignment, asymmetricity, overlapping and the like of image data corresponding to the feature data. Meanwhile, when the subject represented in image data is a human or an animal, reference feature data is assumed to be a value evaluated by evaluation items such as open/close of the eyes of the subject, the facial expression, the orientation of the face, the eye color (red eye in flash photography), and the like. For example, the feature data evaluating unit 16 evaluates the shaking, blurring, definition and the like by the condition of the outline and the focus in image data corresponding to feature data. Meanwhile, when an angle rate sensor and a vibration sensor and the like are provided in the image processing apparatus 10, the output value of those sensors at the shutter timing may be stored and may be used for the evaluation of shaking. Meanwhile, for example, the feature data evaluating unit 16 evaluates the contrast of image data corresponding to feature data, by calculating the luminance of the entire image data. Meanwhile, for example, the feature data evaluating unit 16 evaluates the overlapping on the subject such as a finger and a strap overlapping the imaging lens, by detecting the occurrence of an extremely blurred focus in a certain area in image data corresponding to feature data. Meanwhile, for example, the feature data evaluating unit 16 evaluates the angle of view misalignment by analyzing the verticality and horizontality of buildings, natural objects, humans in image data corresponding to feature data. Meanwhile, for example, the feature data evaluating unit 16 evaluates open/close of eyes by the analysis of the eye part in image data corresponding to feature data. Meanwhile, for example, the feature data evaluating unit 16 evaluates the facial expression by comparing image data corresponding to feature data and various expression patterns, and by estimating the shape of the eyes and mouth. Meanwhile, for example, the feature data evaluating unit 16 evaluates the orientation of the face by estimating the positional relationship of the eyes, nose, mouth, ears with each other and by estimating the face outline and the like in image data corresponding to the feature data. Meanwhile, for example, the feature data evaluating unit 16 may compare feature data and a plurality of pieces of reference feature data, and may evaluate the feature data while sorting it in a phased manner. Meanwhile, for example, the feature data evaluating unit 16 evaluates may evaluate feature data by scoring. Meanwhile, for example, the feature data evaluating unit 16 may configured to compare feature data and reference feature data corresponding to respective items and evaluating the feature data for each item, and to evaluate the feature data comprehensively based on the evaluation results for the respective items.

The control processing unit 17 control the operation of each of the input unit 11, the processing unit 12, the output unit 13, the feature data obtaining unit 14, the reference feature data obtaining unit 15, and the feature data evaluating unit 16. Meanwhile, the control processing unit 17 includes a necessary/unnecessary determining unit 17-1. The necessary/unnecessary determining unit 17-1 performs necessary/unnecessary determination of image data corresponding to feature data based on the evaluation result of the feature data evaluating unit 16. Meanwhile, the feature data obtaining unit 14, the necessary/unnecessary determining unit 17-1, and the processing unit 12 may be realized by a DSP (Digital Signal Processor) as a computer by executing a program recorded in a recording medium, or may also be realized by a program incorporated in an FPGA (Field Programmable Gate Array) and ASIC (Application Specific Integrated Circuit) as a computer. Meanwhile, the recording medium mentioned above may be a non-transient recording medium. The non-transient recording medium is, while there is no particular limitation, a CD-ROM and the like for example.

Figure 39:
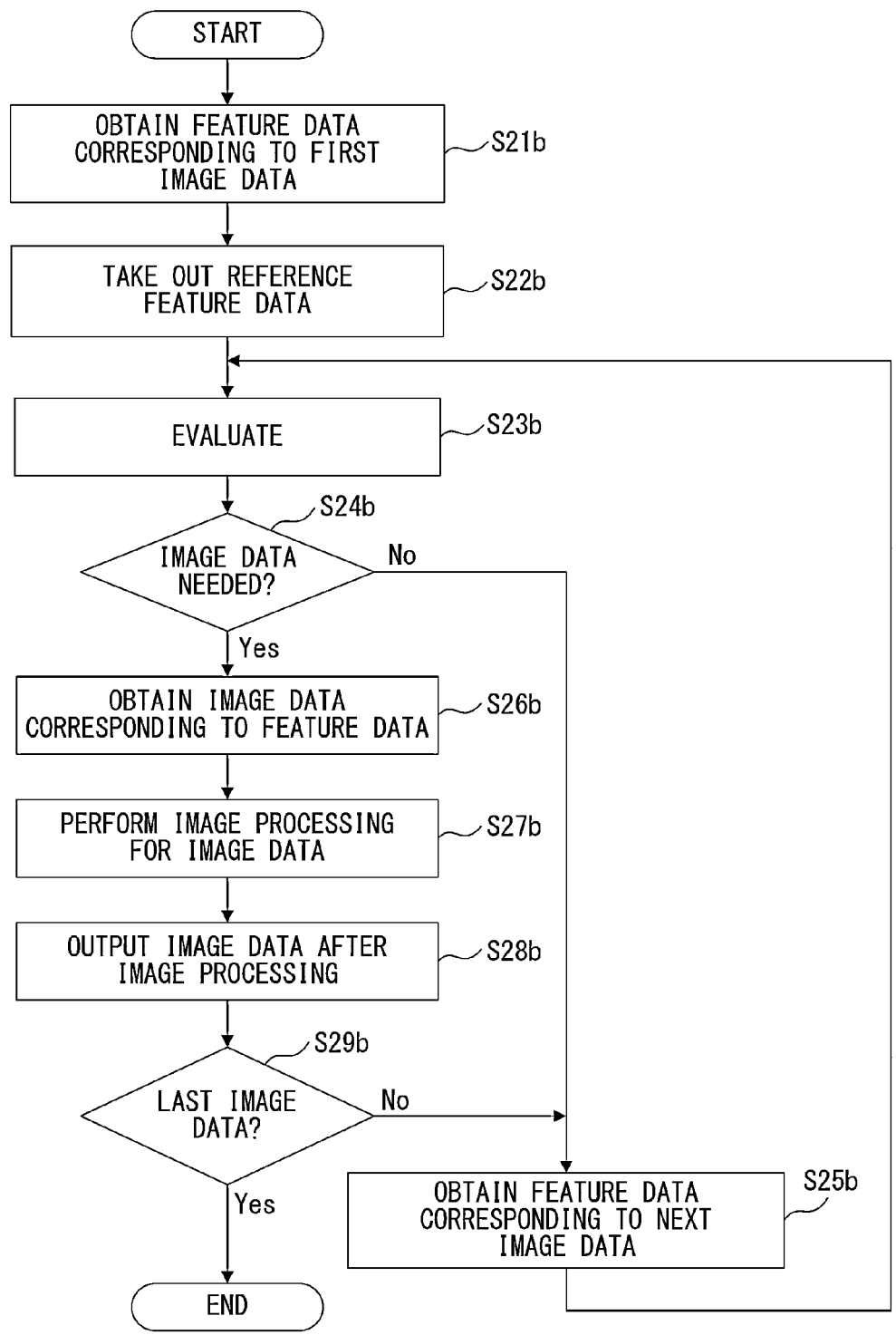
FIG. 39 is a flowchart illustrating an example of operations of a control processing unit illustrated in FIG. 38.

FIG. 39 is a flowchart illustrating an example of the operation of the control processing unit 17 illustrated in FIG. 38.

First, when the control processing unit 17 makes the feature data obtaining unit 14 obtain feature data corresponding to the first image data in a plurality of pieces of image data (Yes in S21b), it takes out reference feature data from data obtained by the reference feature data obtaining unit 15 (S22b), and makes the feature data evaluating unit 16 evaluate the feature data based on the reference feature data (S23b).

Next, the necessary/unnecessary determining unit 17-1 of the control processing unit 17 performs necessary/unnecessary determination of image data corresponding to the obtained feature data based on the evaluation result of the feature data evaluating unit 16 (S24b).

In the case of determination as unnecessary (No in S24b), the control processing unit 17 makes the feature data obtaining unit 14 obtain feature data corresponding to the next image data (S25b), and makes the feature data evaluation unit 16 evaluate the feature data based on the reference feature data (S23b).

On the other hand, in the case of determination as necessary (Yes in S24b), the control processing unit 17 makes the input unit 11 obtain image data corresponding to feature data (S26b), and after that, makes the processing unit 12 perform various image processing with respect to image data determined as necessary (S27b), and makes the output unit 13 output the image data after the image processing (S28b).

Then, when it is determined that the image data corresponding to the feature data evaluated in S23 is not the last data in a plurality of pieces of image data (No in S29b), the control processing unit 17 makes the control processing unit 17 makes the feature data obtaining unit 14 obtain feature data corresponding to the next image data (S25b), and makes the feature data evaluating unit 16 evaluate the feature data based on the reference feature data (S23b).

On the other hand, when it is determined that the image data corresponding to the feature data evaluated in S23 is the last data in a plurality of pieces of image data (Yes in S29b), the control processing unit 17 terminates the image processing for the plurality of pieces of image data.

For example, when the feature type indicated in feature data obtained by the feature data obtaining unit 14 is "luminance histogram", control processing unit 17 takes out "peak position area 10 through 245" as reference feature data corresponding to "luminance histogram" from a data table obtained by the reference feature data obtaining unit 15 illustrated in FIG. 40. At this time, when an evaluation result that the peak position of the luminance is smaller than the "peak position area 10 through 245" is output in the feature data evaluating unit 16, the necessary/unnecessary determining unit 17-1 determines that the image data is too dark and unnecessary image data, and sends control data indicating that the image data is determined as unnecessary, to the input unit 11. Meanwhile, when an evaluation result that the peak position of the luminance is larger than the "peak position area 10 through 245" is output in the feature data evaluating unit 16, the necessary/unnecessary determining unit 17-1 determines that the image data is too bright and unnecessary image data, and sends control data indicating that the image data is determined as unnecessary, to the input unit 11. On the other hand, when an evaluation result that the peak position of the luminance is within the "peak position area 10 through 245" is output in the feature data evaluating unit 16, the necessary/unnecessary determining unit 17-1 determines that the image data is necessary image data, and sends control data indicating that the image data is determined as necessary, to the input unit 11.

Meanwhile, for example, when the feature type indicated in feature data obtained by the feature data obtaining unit 14 is "the number of faces detected", the control processing unit 17 takes out "one or more" as reference feature data corresponding to "the number of faces detected" from a data table obtained by the reference feature data obtaining unit 15 illustrated in FIG. 40. At this time, when an evaluation result that the number of faces detected is not "one or more" is output in the feature data evaluating unit 16, the necessary/unnecessary determining unit 17-1 sends control data indicating that the image data is determined as unnecessary, to the input unit 11. On the other hand, when an evaluation result that the number of faces detected is "one or more" is output in the feature data evaluating unit 16, the necessary/unnecessary determining unit 17-1 sends control data indicating that the image data is determined as necessary, to the input unit 11.

Accordingly, since only the image data determined as necessary is obtained, the load on the processing unit 12 and the output destination of the output unit 13 may be reduced. Meanwhile, in the image processing apparatus 10 illustrated in FIG. 38 and the image processing apparatus 10 described later, the editing work and playback work are made to be done by the processing unit 12, but the editing work and playback work are made to be done using a processing unit of an external image processing apparatus.

As described above, according to the image processing apparatus 10 illustrated in FIG. 38, since the configuration is made so that various image processing is performed only for the image data based on the evaluation result of the feature data evaluating unit 16 in a plurality of pieces of image data to output to the outside, the load of the editing work and playback work at the output destination may be reduced, and the efficiency of those editing work and playback work may be improved.

Meanwhile, according to the image processing apparatus 10 illustrated in FIG. 38, since the configuration is made so that various image processing is performed only for the image data based on the evaluation result of the feature data evaluating unit 16 in a plurality of pieces of image data, the load on the processing unit 12 may be reduced.

Meanwhile, as illustrated in FIG. 41A, the image processing apparatus 10 may obtain feature data from an image capturing apparatus 43 (image capturing unit) via communication apparatuses 41, 42. Meanwhile, the communication apparatus 42 and the image capturing unit 43 are constituted by a digital camera with the communication function, a mobile phone with a camera, a smartphone, or an image capturing unit via an adapter having the communication function. In this case, based on the feature data, the image processing apparatus 10 performs necessary/unnecessary determination of image data corresponding to the feature data, and in the case of determination as necessary, make a request of the image data to the image capturing unit 43. Then, when the image processing apparatus 10 receives the requested image data, it performs various image processing for the image data, and sends the image data after image processing to a display apparatus 44. That is, the necessary/unnecessary determining unit 17-1 makes a request for image data determined as necessary to the image capturing unit 43 being an external apparatus. Meanwhile, the necessary/unnecessary determining unit 17-1 may be configured to make another external apparatus make a request for image data determined as necessary to the image capturing unit 43 being an external apparatus.

Figure 41B:
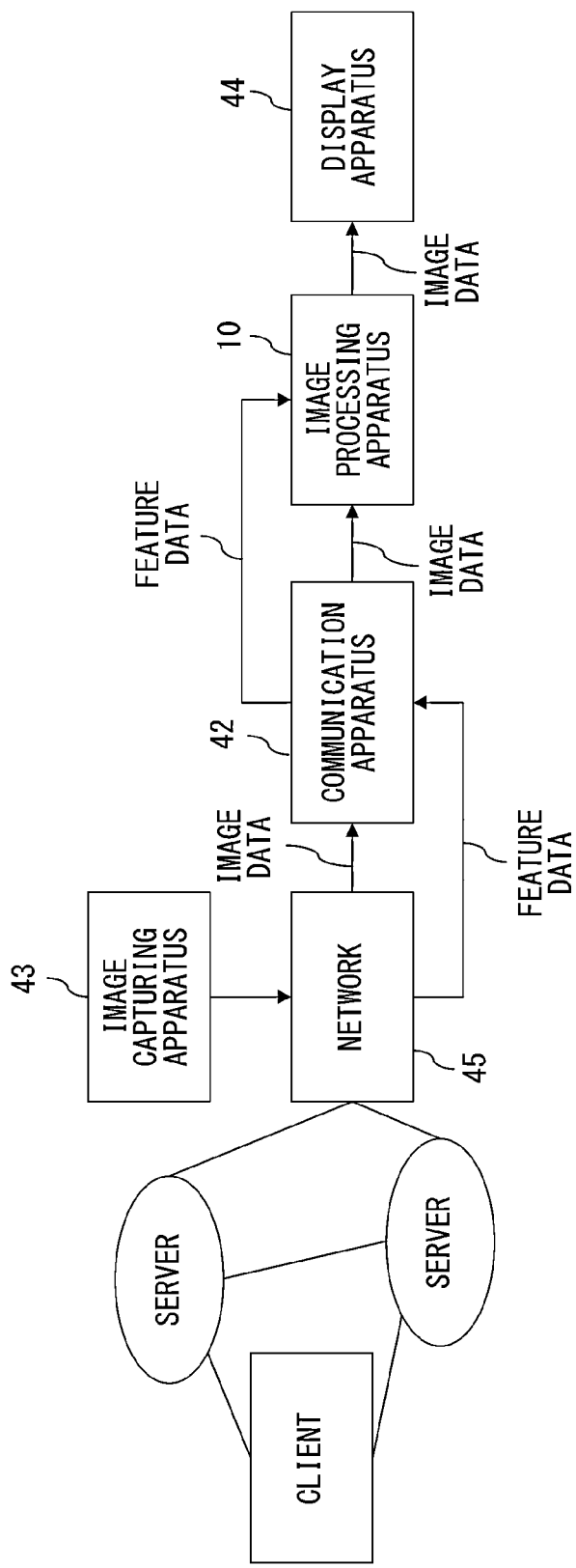
FIG. 41B is a diagram illustrating an example of peripheral apparatuses of an image processing apparatus.

Meanwhile, as illustrated in FIG. 41B, the image capturing unit 43 may be connected to a network 45. In this case, the image processing apparatus 10 performs transmission/reception of data of the image capturing unit 43 via the communication apparatus 42 and the network 45.

Figure 41C:
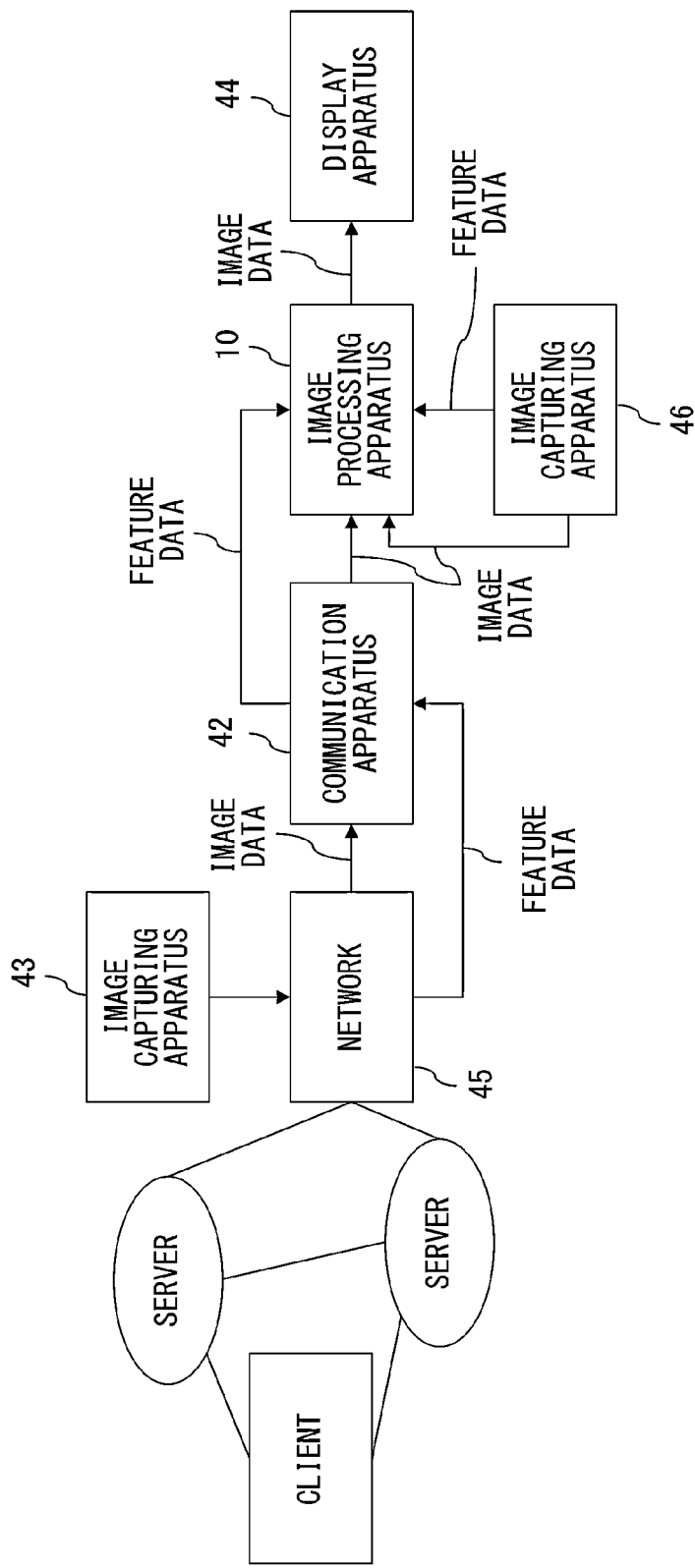
FIG. 41C is a diagram illustrating an example of peripheral apparatuses of an image processing apparatus.

Meanwhile, as illustrated in FIG. 41C, the image processing apparatus 10 may include an image capturing unit 46 (image capturing unit). In this case, based on feature data sent from the image capturing unit 46, the image processing apparatus 10 performs necessary/unnecessary determination of image data corresponding to the feature data, and in the case of determination as necessary, make a request of the image data to the image capturing unit 46. Then, when the image processing apparatus 10 receives the requested image data, it performs various image processing for the image data, and sends the image data after image processing to a display apparatus 44. In this case, depending on the external situation, the feature data evaluating unit 17 may review the reference feature data to be taken from data obtained by the reference feature data obtaining unit 15.

FIG. 42 is a diagram illustrating an image processing apparatus of a variation example of the embodiment illustrated in FIG. 38. Meanwhile, to the same configuration as the configuration illustrated in FIG. 38, the same numeral is assigned and explanation for the configuration is omitted. Meanwhile, the objective of the image processing apparatus 50 illustrated in FIG. 42 is, for example, to improve the efficiency of the editing work and playback work of a plurality of pieces of image data.

The image processing apparatus 50 illustrated in FIG. 42 differs from the image processing apparatus 10 illustrated in FIG. 38 in that a power state detecting unit 51 (state detecting unit), an evaluation policy generating unit 52, a reference feature data generating unit 53, a transmitting unit 54, and a receiving unit 55 are further included.

The power state detecting unit 51 sequentially detects the power type and the power state of the image processing apparatus 50. For example, the power state detecting unit 51 detects "AC power" or "DC power" as the power type of the image processing apparatus 50, and detects "DC power remaining capacity" as the power state. Meanwhile, the power state detecting unit 51 detects the power state such as the expected remaining time, the current, the voltage value of the DC power as the momentary value, an average value in a certain period in the past. Alternatively, all the power states in the past may be detected with a time stamp. The AC power is a power without limit in supply such as the commercial power, and the DC power represents a power with limitation in the remaining capacity and the usage capacity such as a battery (storage battery).

When the evaluation policy generating unit 52 detects that the power state detecting unit 51 is operating, it generates an evaluation policy about the power. For example, when power type of the image processing apparatus 50 is "DC power" and the power state is "DC power remaining capacity: less than 20%", the evaluation policy generating unit 52 generates an evaluation policy to "obtain an image with a resolution equal to or below VGA (640×480). Meanwhile, for example, when the power type of the image processing apparatus 50 is "DC power" and the power state is "DC power remaining capacity: less than 20%", the evaluation policy generating unit 52 may also generate an evaluation policy to "select an image that makes the total number of pixels in the image area equal to or below 640×480 regardless of the resolution in the X direction, Y direction".

The reference feature data generating unit 53 generates reference feature data based on the evaluation policy generated by the evaluation policy generating unit 52 and the detection result of the power state detecting unit 51.

The necessary/unnecessary determining unit 17-1 illustrated in FIG. 42 is sends an image obtaining request including the necessary/unnecessary determination result of image data corresponding to feature data and identification information of image data to the transmitting unit 54. The transmitting unit 54 transmits the image obtaining request sent from the necessary/unnecessary determining unit 17-1 to the server 56 via a network. Meanwhile, the network may be, for example, the Internet, LAN, on-chip network, as well as an interface such as USB and PCI. That is, the necessary/unnecessary determining unit 17-1 makes a request for image data determined as necessary to a server 56 being an external apparatus. Meanwhile, the necessary/unnecessary determining unit 17-1 may also be configured to make another external apparatus make a request for image data determined as necessary, to the server 56.

The server 56 includes a receiving unit 57, a selecting unit 58, a saving unit 59, and a transmitting unit 60.

The receiving unit 57 receives an image obtaining request transmitted from the image processing apparatus 50.

The selecting unit 58 takes out image data corresponding to identification information indicated in a received image obtaining request from a plurality of pieces of data saved in the saving unit 59.

The transmitting unit 60 transmits image data taken out by the selecting unit 58 to the image processing apparatus 50 via a network.

The receiving unit 55 of the image processing apparatus 50 receives image data transmitted from the server 56.

The input unit 11 illustrated in FIG. 42 transmits image data received by the receiving unit 55 to the processing unit 12.

Figure 43:
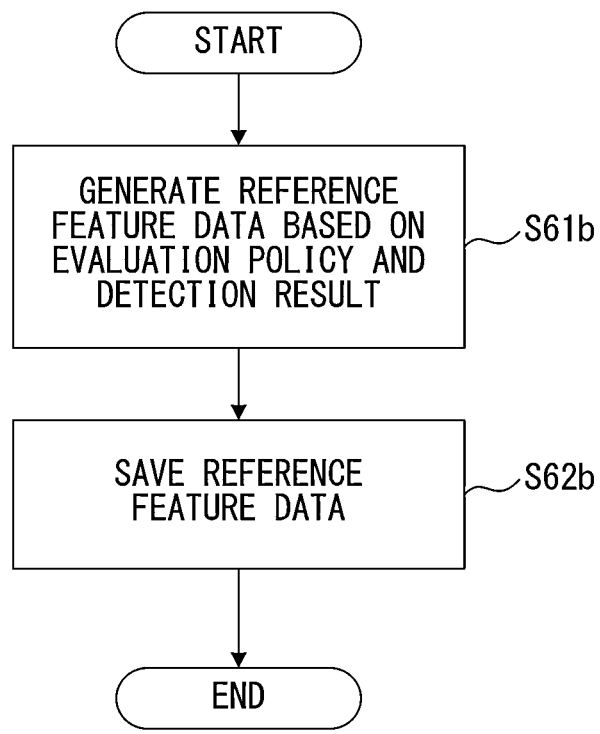
FIG. 43 is a flowchart illustrating an example of operations of a reference feature data generating unit illustrated in FIG. 42.

FIG. 43 is a flowchart illustrating an example of the operation of the reference feature data generating unit 53.

The reference feature data generating unit 53 generates reference feature data based on the evaluation policy generated by the evaluation policy generating unit 52 and the detection result of the power state detecting unit 51 (S61b), and after that, saves the generated reference feature data in the reference feature data obtaining unit 15 (S62b).

For example, as the evaluation policy generated by the evaluation policy generating unit 52 and the like, a data table illustrated in FIG. 44 is stored in advance in a storing unit 56 illustrated in FIG. 42. When the power type of the image processing apparatus 50 detected by the power state detecting unit 51 is "DC power" and the power state is "DC power remaining capacity: 18%", the reference feature data generating unit 53 takes out "resolution: equal to or below 640×480" from the data table illustrated in FIG. 44 as reference feature data corresponding to the power type "DC power" and the power state "DC power remaining capacity: equal to or below 20%" and save it in the reference feature data obtaining unit 15. Meanwhile, when the power type of the image processing apparatus 50 detected by the power state detecting unit 51 is "DC power" and the power state is "DC power remaining capacity: 34%" the reference feature data generating unit 53 takes out "resolution: equal to or below 1280×960" from the data table illustrated in FIG. 44 as reference feature data corresponding to the power type "DC power" and the power state "DC power remaining capacity: equal to or above 20%" and save it in the reference feature data obtaining unit 15. Meanwhile, when the power type of the image processing apparatus 50 detected by the power state detecting unit 51 is "AC power", the reference feature data generating unit 53 takes out from the data table illustrated in FIG. 43 "resolution: unlimited" as reference feature data corresponding to the power type "AC power" and saves it in the reference feature data obtaining unit 15. That is, the reference feature data generating unit 53 generates reference feature data so that, in the low-energy state where the available power capacity is equal to or below a prescribed value, the amount of data of image data to be obtained becomes smaller compared with the non-low-energy state.

FIG. 45 is a flowchart illustrating an example of the operation of the control processing unit 17 illustrated in FIG. 42.

First, when the control processing unit 17 makes the feature data obtaining unit 14 obtain feature data corresponding to the first image data in a plurality of pieces of image data (S81b), it takes out reference feature data from data obtained by the reference feature data obtaining unit 15 (S82b), and makes the feature data evaluating unit 16 evaluate the feature data based on the reference feature data (S83b).

Next, the necessary/unnecessary determining unit 17-1 of the control processing unit 17 performs necessary/unnecessary determination of image data corresponding to the obtained feature data based on the evaluation result of the feature data evaluating unit 16 (S84b).

In the case of determination as unnecessary, (No in S84b), the control processing unit 17 makes the feature data obtaining unit 14 obtain feature data corresponding to the next image data (S85b), and makes the feature data evaluating unit 16 evaluate the feature data based on the reference feature data (S83b).

On the other hand, in the case of determination as necessary (Yes in S84b), the control processing unit 17 makes the transmitting unit 54 transit an image obtaining request to the server 56 (S86b), and also, makes the receiving unit 55 receive image data corresponding to the image obtaining request (S87b), and after that, makes the processing unit 12 perform various image processing for the image data (S88b), and makes the output unit 13 output the image data after the image processing (S89b).

Then, when it is determined that the image data corresponding to the feature data evaluated in S83 is not the last image data in a plurality of pieces of image data (No in S90b), the control processing unit 17 makes the feature data obtaining unit 14 obtain feature data corresponding to the next image data (S85b), and makes the feature data evaluating unit 16 evaluate the feature data based on the reference feature data (S83b).

On the other hand, when it is determined that the image data corresponding to the feature data evaluated in S83b is the last image data in a plurality of pieces of image data (Yes in S90b), the control processing unit 17 terminates the image processing for the plurality of pieces of image data.

For example, when the power type of the image processing apparatus 50 detected by the power state detecting unit 51 is "DC power" and the power state is "DC power remaining capacity: 18%", the control processing unit 17 takes out "resolution: equal to or below 640×480" as reference feature data from data obtained by the reference feature data obtaining unit 15. At this time, when an evaluation result that the resolution of image data corresponding to feature data is equal to or below "640×480" in the feature data evaluating unit 16, the necessary/unnecessary determining unit 17-1 determines the image data as necessary.

On the other hand, when an evaluation result that the resolution of image data corresponding to feature data is above "640×480" in the feature data evaluating unit 16, the necessary/unnecessary determining unit 17-1 determines the image data as unnecessary.

Accordingly, since it becomes possible to send only the image data based on the evaluation result of the feature data evaluating unit 16 in a plurality of pieces of image data to the processing unit 12 and the output destination of the output unit 13, the load on the processing unit 12 and the output destination of the output unit 13 may be reduced.

FIG. 46 is a diagram illustrating an image processing apparatus of a variation example of the embodiment illustrated in FIG. 42. Meanwhile, to the same configuration illustrated in FIG. 42, the same numeral is assigned and explanation for the configuration is omitted. Meanwhile, the objective of the image processing apparatus 90 illustrated in FIG. 46 is, for example, to improve the efficiency of the editing work and playback work of a plurality of pieces of image data.

The image processing apparatus 90 illustrated in FIG. 46 differs from the image processing apparatus 50 illustrated in FIG. 42, a connection state determining unit 91 (state detecting unit) is included instead of the power state detecting unit 51.

The connection state determining unit 91 obtains, from the transmitting unit 54 and the receiving unit 55 of the image processing apparatus 90, the connection state to the network (connected or disconnected, and the like), the type of the network (wired or wireless, and the like), the network standard (IEEE802.3ab and IEEE802.11n, and the like), information about the network traffic and the like as network information, and outputs it respectively to the evaluation policy generating unit 52 and the reference feature data generating unit 53.

When the evaluation policy generating unit 52 of the present embodiment detects that the connection state determining unit 91, it generates an evaluation policy about network information. For example, when the network type is "wired" and the network occupancy (the ratio of the current network traffic with respect to the upper limit of the network traffic) is "equal to or above 50%", the evaluation policy generating unit 52 of the present embodiment generates an evaluation policy to "obtain an image of a resolution equal to or below VGA (640×480). Meanwhile, evaluation policy generating unit 52 may also combine a plurality of pieces of reference feature data. That is, for example, when the network type is "wireless" and the network occupancy is "equal to or above 80%", the evaluation policy generating unit 52 may generate an evaluation policy to "obtain an image of a resolution of equal to or below VGA (640×480) and of a data size of equal to or below 20KB". Meanwhile, when combining reference feature data, the evaluation policy generating unit 52 may use an evaluation formula.

Figure 47:
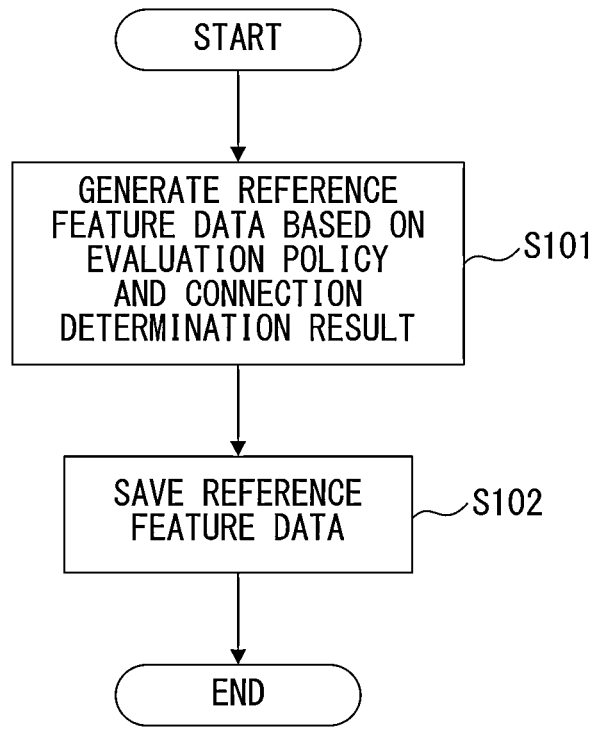
FIG. 47 is a flowchart illustrating an example of operations of a reference feature data generating unit illustrated in FIG. 46.

FIG. 47 is a flowchart illustrating an example of the operation of the reference feature data generating unit 53 illustrated in FIG. 46.

The reference feature data generating unit 53 generates reference feature data based on the evaluation policy generated by the evaluation policy generating unit 52 and the determination result (network information) of the connection state determining unit 91 (S101), and after that, saves the generated reference feature data in the reference feature data obtaining unit 15 (S102).

For example, as the evaluation policy generated by the evaluation policy generating unit 52 and the like, a data table illustrated in FIG. 48 is stored in advance in a storing unit 92 illustrated in FIG. 46. In such a case, when the network type is "wireless" and the current throughput is "43.2 Mbps" with respect to the upper limit "50 Mbps" of the network throughput, the connection state determining unit 91 outputs network information indicating that the network type is "wireless" and the network occupancy is "86.4%". When the network type indicated in the network information output from the connection state determining unit 91 is "wireless" and the network occupancy is "86.4%", the reference feature data generating unit 53 takes out from the data table illustrated in FIG. 48 "2×3" as an evaluation formula corresponding to the network type "wireless" and the network occupancy "equal to or above 80%", and takes out "resolution: equal to or below 640×480" as reference feature data corresponding to the feature ID "2", and also, takes out "image size: equal to or below 20KB" as reference feature data corresponding to the feature ID "3", and saves the those reference feature data and evaluation formula in the reference feature data obtaining unit 15. That is, the reference feature data generating unit 53 generates reference feature data so that, in the low-speed state where the data forwarding amount per unit time of the available network is equal to or below a prescribed value, the amount of data of image data to be obtained becomes smaller compared with the non-low-speed state.

For example, when the network type determined by the connection state determining unit 91 is "wireless" and the network occupancy is "86.4%", the necessary/unnecessary determining unit 17-1 illustrated in FIG. 46 takes out an evaluation formula "2×3" and "resolution: equal to or below 640×480" and "image size: 20KB or below" as reference feature data corresponding to the feature IDs "2" and "3" from data obtained from the reference feature data obtaining unit 15. At this time, when an evaluation result that the resolution of image data corresponding to feature data is equal to or below 640×480" and the image size of the image data is "20KB or below" in the feature data evaluating unit 16, the necessary/unnecessary determining unit 17-1 sends an image obtaining request indicating that the image data is determined as necessary, by the transmitting unit 54 to the server 56. That is, the necessary/unnecessary determining unit 17-1 makes a request for image data determined as necessary to the server 56 being an external apparatus. Meanwhile, the necessary/unnecessary determining unit 17-1 may be configured to make another external apparatus make a request for image data determined as necessary to the server 56.

On the other hand, when at least one of two evaluation results that the resolution of image data corresponding to feature data is larger than "640×480", or the image size of the image data is larger than "20KB" in the feature data evaluating unit 16, the necessary/unnecessary determining unit 17-1 sends an image obtaining request indicating that the image data is determined as unnecessary, by the transmitting unit 54 to the server 56.

Accordingly, since it becomes possible to send only the image data based on the evaluation result of the feature data evaluating unit 16 in a plurality of pieces of image data to the processing unit 12 and the output destination of the output unit 13, the load on the processing unit 12 and the output destination of the output unit 13 may be reduced. Meanwhile, the evaluation formula used in the present embodiment is assumed to be set by an evaluation policy stored in advance, but it may be set by inputting an evaluation policy and an evaluation formula itself from a display unit 141 described later, or the evaluation formula or the evaluation policy may be changed or set to be a prescribed one by the result detected by the connection state determining unit 91 (state detecting unit). Meanwhile, the configuration is made so that feature data is evaluated by reference feature data about the power capacity detected by the power state detecting unit 51 illustrated in FIG. 42 and the feature data is evaluated by the reference feature data regarding the connection state with the network determined by the connection state determining unit 91 illustrated in FIG. 46, but in present embodiment, the configuration may be made so that feature data is evaluated by reference feature data in which a plurality of types of reference feature data such as these reference feature data are combined. As described above, by evaluating feature data by combining a plurality of types of reference feature data, determination of data that is needed more may be performed according to the situation of the device used for the editing work and the playback work and the network.

FIG. 49 is a diagram illustrating an image processing apparatus of a variation example of the embodiment illustrated in FIG. 42. Meanwhile, to the same configuration illustrated in FIG. 46, the same numeral is assigned and explanation for the configuration is omitted. Meanwhile, the objective of the image processing apparatus 120 illustrated in FIG. 49 is, for example, to improve the efficiency of the editing work and playback work of a plurality of pieces of image data.

The image processing apparatus 120 illustrated in FIG. 49 is different from the image processing apparatus 90 illustrated in FIG. 46 in that an internal server 121 and a distribution switching unit 122 are further included.

The internal server 121 is in a similar configuration as in the server 56, and functions as a cache of image data obtained from the server 56. For example, image data transmitted from the server 56 to the receiving unit 55 of the image processing apparatus 120 is saved. The update of image data in the internal server 121 may be performed at the time of the input of image data, regularly, or at the time of the occurrence of a specific event. Meanwhile, when the capacity is smaller than the server 56, the internal server 121 decides the image data to be saved by giving priority to saving image data with a high frequency of access and image data whose latest access time is closer to the current time.

The distribution switching unit 122 switches the transmission destination of the image obtaining request to either one of the transmitting unit 54 and the internal server 121 of the image processing apparatus 120, according to the network information output from the connection state determining unit 91. That is, for example, when the image processing apparatus 120 is connected to the network, the distribution switching unit 122 makes the outside of the image processing apparatus 120 perform the work to transmit the image obtaining request to the server 56 via the network and to extract desired image data from a plurality of pieces of image data. On the other hand, when the image processing apparatus 120 is not connected to the network, the distribution switching unit 122 makes the inside of the image processing apparatus 120 perform the work to transmit the image obtaining request to the internal server 121 and to extract desired image data from a plurality of pieces of image data. Meanwhile, for example, the configuration may also be made that when the image processing apparatus 120 is connected to the network, when the network occupancy is higher than the threshold, the distribution switching unit 122 transmits the image obtaining request to the internal server 121.

FIG. 50 is a flowchart illustrating an example of the operation of the control processing unit 17 illustrated in FIG. 49.

First, when the control processing unit 17 makes the feature data obtaining unit 14 obtain feature data corresponding to the first image data in a plurality of pieces of image data (Yes in S131b), it takes out reference feature data from data obtained by the reference feature data obtaining unit 15 (S132), and makes the feature data evaluating unit 16 evaluate the feature data based on the reference feature data (S133).

Next, the necessary/unnecessary determining unit 17-1 of the control processing unit 17 performs necessary/unnecessary determination of image data corresponding to the obtained feature data based on the evaluation result of the feature data evaluating unit 16 (S134).

In the case of determination as unnecessary, (No in S134), the control processing unit 17 makes the feature data obtaining unit 14 obtain feature data corresponding to the next image data (S135), and makes the feature data evaluating unit 16 evaluate the feature data based on the reference feature data (S133).

On the other hand, in the case of determination as necessary (Yes S134), the control processing unit 17 generates an image obtaining request (S136), and switches the transmission destination of the image obtaining request by the distribution switching unit 122 to either of the external server 56 and the internal server 121 (S137).

When the transmission destination of the image obtaining request is switched to the external server 56 (No in S137), the control processing unit 17 makes the transmitting unit 54 transmit the image obtaining request to the server 56 (S138) and also, makes the receiving unit 55 receive image data corresponding to the image obtaining request (S139). That is, the control processing unit 17 makes a request for image data determined as necessary to a server 56 being an external apparatus. Meanwhile, the control processing unit 17 may also be configured to make another external apparatus make a request for image data determined as necessary, to the server 56.

On the other hand, when the transmission destination of the image obtaining request is switched to the internal server 121 (Yes in S137), the control processing unit 17 sends the image obtaining request to the internal server 121 (S140), and receives image data corresponding to image obtaining request sent from the internal server 121 by the input unit 11 (S141). For example, when the internal server 121 receives an image obtaining request, it takes out image data corresponding to the identification information indicated in the image obtaining request from a plurality of pieces of image data stored in a storing unit 123 illustrated in FIG. 49, and sends the taken-out image data to the input unit 11.

Next, the control processing unit 17 makes the processing unit 12 perform various image processing for image data (S142), and makes the output unit 13 output the image data after the image processing (S143).

Then, when it is determined that the image data corresponding to the feature data evaluated in S133 is not the last data in a plurality of pieces of image data (No in S144), the control processing unit 17 makes the feature data obtaining unit 14 obtain feature data corresponding to the next image data (S135), and makes the feature data evaluating unit 16 evaluate the feature data based on the reference feature data (S133).

On the other hand, when it is determined that the image data corresponding to the feature data evaluated in S133 is the last data in a plurality of pieces of image data (Yes in S144), the control processing unit 17 terminates the image processing for the plurality of pieces of image data.

Meanwhile, the configuration may also be made so that, when the image obtaining request is transmitted to the server 56, the control processing unit 17 sends the received image data to the processing unit 12, and also caches it in the internal server 121. Meanwhile, when the image obtaining request is sent to the internal server 121, the control processing unit 17 may send image data sent from the internal server 121 to the input unit 11, to the processing unit 12.

FIG. 51 is a diagram illustrating an image processing apparatus of another embodiment of the present invention. Meanwhile, to the same configuration illustrated in FIG. 42, the same numeral is assigned and explanation for the configuration is omitted. Meanwhile, the objective of the image processing apparatus 140 illustrated in FIG. 51 is, for example, to improve the efficiency of the editing work and playback work of a plurality of pieces of image data.

The image processing apparatus 140 illustrated in FIG. 51 differs from the image processing apparatus 50 illustrated in FIG. 42 in that a display unit 141 is included instead of the power state detecting unit 51.

The display unit 141 is a user interface such as a touch panel display, to which the user's intension about the evaluation policy is input by the user operation. The input user intention is sent to the reference feature data generating unit 53.

Meanwhile, the evaluation policy generating unit 52 illustrated in FIG. 51 may be configured to assign the priority order to a plurality of evaluation policies based on the input user intention, and after that, to send to the evaluation policy to the reference feature data generating unit 53. In this case, the reference feature data generating unit 53 uses the evaluation policies according to the priority order. The user intention at this time indicates a policy to evaluate at least one of the display speed, the resolution, the amount of data of image data with priority, for example.

Figure 52:
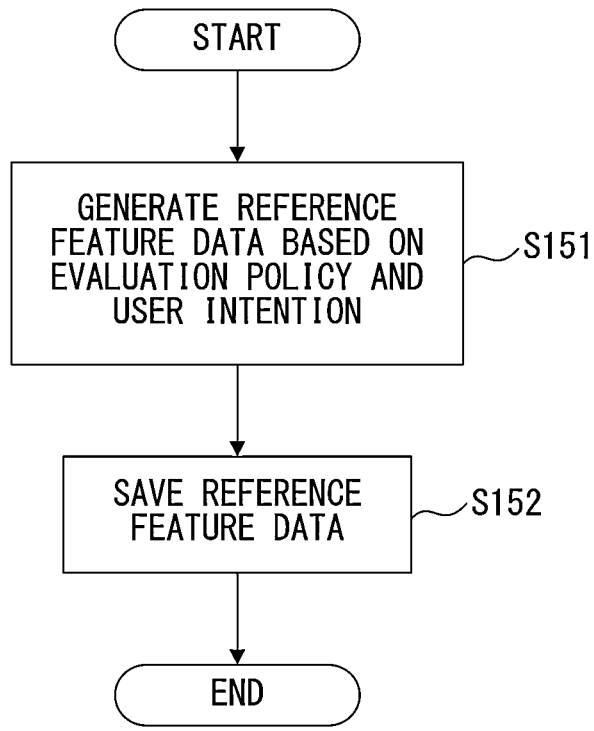
FIG. 52 is a flowchart illustrating an example of operations of a reference feature data generating unit illustrated in FIG. 51.

FIG. 52 is a flowchart illustrating an example of the operation of the reference feature data generating unit 53 illustrated in FIG. 51.

The reference feature data generating unit 53 illustrated in FIG. 51 generates reference feature data based on an evaluation policy generated by the evaluation policy generating unit 52 and the user intention input by the display unit 141 (S151) and after that, saves the generated reference feature data in the reference feature data obtaining unit 15 (S152).

For example, the display unit 141 includes a background priority mode button and a subject priority mode button, and when either one of the buttons is pressed by the user, sends the mode corresponding to the pressed button to the reference feature data generating unit 53 as the user intention. When the background priority mode button is pressed, the reference feature data generating unit 53 sets the upper limit value of the acceleration and speed of the camera relatively low, so that the background may be enjoyed. For example, as illustrated in FIG. 53A, the reference feature data generating unit 53 sets the upper limit value of the camera acceleration as reference feature data to "equal to or below 1 G" corresponding to the "background priority mode", and the upper limit value of the camera speed as reference feature data to "equal to or below 1 cm/s" corresponding to the "background priority mode". On the other hand, when the subject priority mode button is pressed, the reference feature data generating unit 53 sets the upper limit value of the acceleration and speed of the camera relatively high, so that the subject may be enjoyed. For example, as illustrated in FIG. 53A, the reference feature generating unit 53 sets the upper limit value of the camera acceleration as reference feature data to "equal to or below 5 G" corresponding to the "subject priority mode", and the upper limit value of the camera speed as reference feature data to "equal to or below 5 cm/s" corresponding to the "subject priority mode". These combinations may be saved in the evaluation policy generating unit 52 in advance, or a user interface that enables editing by the user may be provided. Meanwhile, there is no limitation about the type of the parameter to be set. Meanwhile, the selection of the mode may also be an analog setting by a slide bar, instead of the choice between the two by buttons.

Meanwhile, for example, the display unit 141 may include a pro mode button and an amateur mode button, and when either one of the buttons is pressed by the user, sends the mode corresponding to the pressed button to the reference feature data generating unit 53 as the user intention. When the pro mode button is pressed, the reference feature data generating unit 53 sets the image data of 5 pieces preceding and following the image data from which the subject is detected as the extraction criterion and sets the upper limit value of the acceleration and speed of the camera relatively high, so that there is a wide variation of for editing. For example, as illustrated in FIG. 53B, the reference feature data generating unit 53 sets the image extraction criterion as reference feature data to "the five frames preceding and following the subject-detected frame" corresponding to the "pro mode", the upper limit value of the camera acceleration as reference feature data to "equal to or below 5 G" corresponding to the "pro mode", and the upper limit value of the camera speed as reference feature data to "equal to or below 5 cm/s" corresponding to the "pro mode". On the other hand, when the amateur mode button is pressed, the, reference feature data generating unit 53 sets only the image data from which the subject is detected as the extraction criterion and sets the upper limit value of the acceleration and speed of the camera relatively low, to realize fuss-free editing. For example, as illustrated in FIG. 53B, the reference feature data generating unit 53 sets the image extraction criterion as reference feature data to "only the subject-detected frame" corresponding to the "amateur mode", the upper limit value of the camera acceleration as reference feature data to "equal to or below 1 G" corresponding to the "amateur mode", and the upper limit value of the camera speed as reference feature data to "equal to or below 1 cm/s" corresponding to the "amateur mode". These combinations may be saved in the evaluation policy generating unit 52 in advance, or a user interface that enables editing by the user may be provided. Meanwhile, there is no limitation about the type of the parameter to be set. Meanwhile, the selection of the mode may also be an analog setting by a slide bar, instead of the choice between the two by buttons.

Meanwhile, the types of the user intension and evaluation policy are not limited to the configuration described above. Meanwhile, the timing of the mode switching may be set before image capturing to according to the purpose of the day, or may be set each time before preview of the image data. Furthermore, a priority recognizing unit may be provided in the display unit 141, and the user may increase the priority intentionally for each scene, based on a sign captured in the captured image of the camera (such as scissors formed by the user's hand, a thumbs-up and the like), shaking of the camera, or rating information assigned in advance at the time of image capturing by the user.

Next, an example of the operation of the control processing unit 17 illustrated in FIG. 51 is explained.

First, when the control processing unit 17 makes the feature data obtaining unit 14 obtain feature data corresponding to the first image data in a plurality of pieces of image data, it takes out reference feature data from data obtained by the reference feature data obtaining unit 15, and makes the feature data evaluating unit 16 evaluate the feature data based on the reference feature data.

Next, the necessary/unnecessary determining unit 17-1 of the control processing unit 17 performs necessary/unnecessary determination of image data corresponding to the feature data based on the evaluation result of the feature data evaluating unit 16.

In the case of determination as unnecessary, the control processing unit 17 makes the feature data obtaining unit 14 obtain feature data corresponding to the next image data, and makes the feature data evaluating unit 16 evaluate the feature data based on the reference feature data.

On the other hand, in the case of determination as necessary, the control processing unit 17 makes the transmitting unit 54 transmit the image obtaining request to the server 56, and also, makes the receiving unit 55 receive image data corresponding to the image obtaining request, and after that, makes the processing unit 12 perform various image processing for the image data, and makes the output unit 13 output the image data after the image processing.

Then, when it is determined that the image data corresponding to the feature data evaluated in the feature data evaluating unit 16 is not the last image data in a plurality of pieces of image data, the control processing unit 17 makes the feature data obtaining unit 14 obtain feature data corresponding to the next image data and makes the feature data evaluating unit 16 evaluate the feature data based on the reference feature data.

On the other hand, when it is determined that the image data corresponding to the feature data evaluated in the feature data evaluating unit 16 is the last image data in a plurality of pieces of image data, the control processing unit 17 terminates the image processing for the plurality of pieces of image data.

For example, when the pro mode button is pressed by the user in the display unit 141, the control processing unit 17 takes out "five frames preceding and following the subject-detected frame" as the image extraction criterion from data obtained by the reference feature data obtaining unit 15, "equal to or below 5 G" as the upper limit value of the camera acceleration, and "equal to or below 5 cm/s" as the upper limit value of the camera speed. At this time, when an evaluation result that the image data corresponding to feature data is "five frames preceding and following the subject-detected frame", an evaluation result that the camera acceleration at the time of capturing the image data corresponding to feature data is "equal to or below 5 G", and an evaluation result that the camera speed at the time of capturing the image data corresponding to feature data is "equal to or below 5 cm/s" in the feature data evaluating unit 16, the necessary/unnecessary determining unit 17-1 determines the image data as necessary.

On the other hand, when at least one of evaluation results that the image data corresponding to feature data is not "five frames preceding and following the subject-detected frame", that the camera acceleration at the time of capturing the image data corresponding to feature data is not "equal to or below 5 G", and that the camera speed at the time of capturing the image data corresponding to feature data is not "equal to or below 5 cm/s" in the feature data evaluating unit 16, the necessary/unnecessary determining unit 17-1 determines the image data as unnecessary.

Accordingly, since it becomes possible to send only the image data based on the evaluation result of the feature data evaluating unit 16 in a plurality of pieces of image data to the processing unit 12 and the output destination of the output unit 13, the load on the processing unit 12 and the output destination of the output unit 13 may be reduced.

FIG. 54 is a diagram illustrating an image processing apparatus of a variation example of the embodiment illustrated in FIG. 38. Meanwhile, to the same configuration as the configuration illustrated in FIG. 38, the same numeral is assigned and explanation for the configuration is omitted. Meanwhile, the objective of the image processing apparatus 170 illustrated in FIG. 54 is to improve the efficiency of the editing work and playback work of a plurality of pieces of image data.

The image processing apparatus 170 illustrated in FIG. 54 differs from the image processing apparatus 10 illustrated in FIG. 38 in that a feature data extracting unit 171 is further included.

The feature data extracting unit 171 extracts feature data from image data obtained by the input unit 11. The specific subject in the feature data extracted at this time is an object (a human face and body, automobile, flower, animal, sky, mountain, sea, road or building), a marker, or, a color and luminance.

Figure 55:
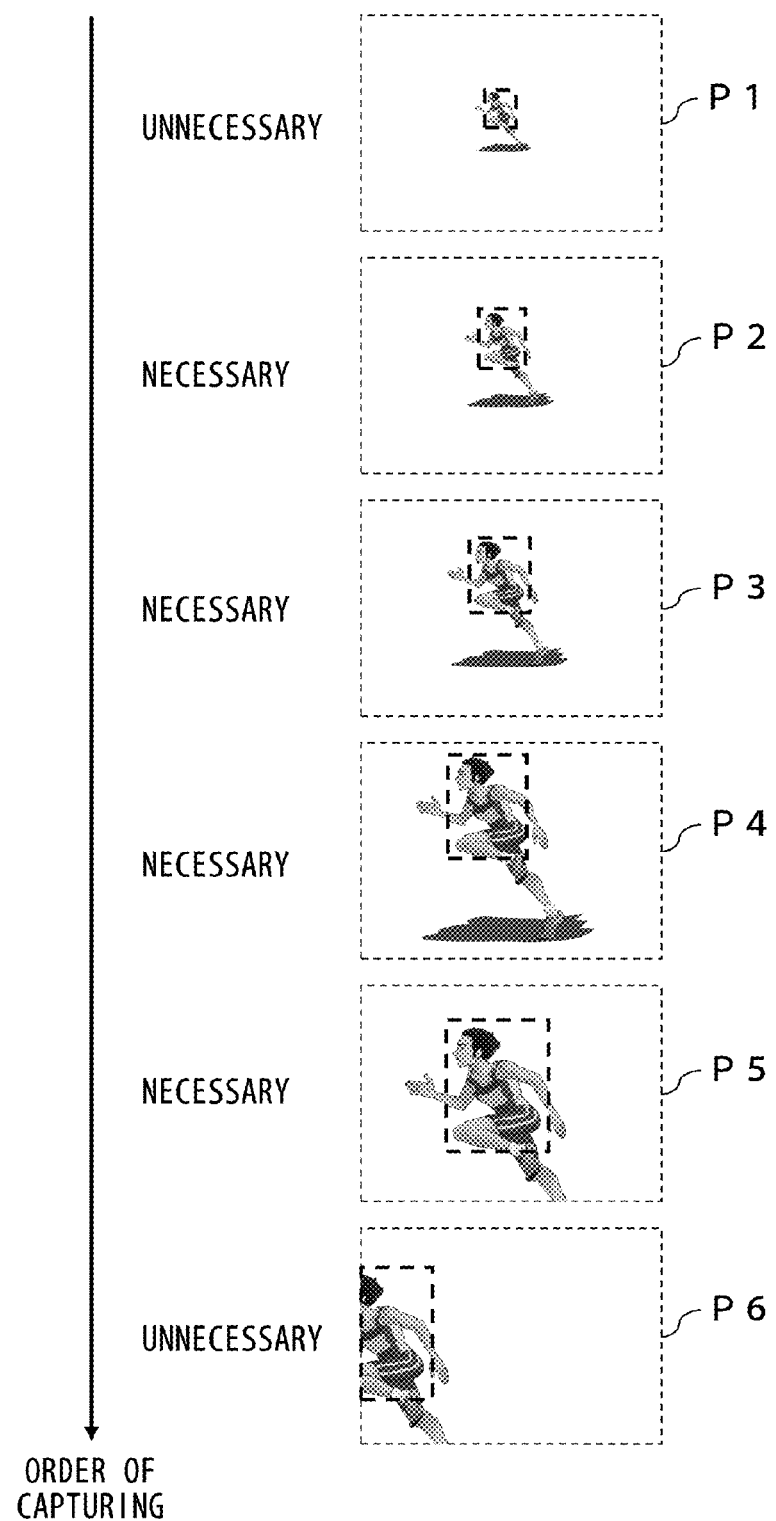
FIG. 55 is a diagram illustrating an example of image data for which necessary/unnecessary determination has been made.

For example, the feature data extracting unit 171 includes a subject detecting unit, and by the subject detecting unit, extracts the "position of the subject" and the "size of the subject" from image data. In this case, the feature data evaluating unit 16 illustrated in FIG. 54 takes out "the width in the X direction and the width in the Y direction of the image data" and "the prescribed size" from data obtained by the reference feature data obtaining unit 15, and when it makes a determination as at least one of "the subject has not been detected", "the size of the subject is smaller than the prescribed size", "the position of the subject deviates outward from the left edge of the image data", "the position of the subject deviates outward from the right edge of the image data", "the position of the subject deviates outward from the upper edge of the image data", and "the position of the subject deviates outward from the bottom edge of the image data", it sends the determination result to the necessary/unnecessary determining unit 17-1. The necessary/unnecessary determining unit 17-1 performs necessary/unnecessary determination of image data obtained by the input unit 11, based on the determination result sent from the feature data evaluating unit 16. For example, as illustrated in FIG. 55, when it is determined that, in a moving image composed of a plurality of pieces of image data P1 through P6, "the size of the subject is smaller than the prescribed size" in the image data P1, the necessary/unnecessary determining unit 17-1 determines the image data P1 as unnecessary. Meanwhile, when it is determined that "the position of the subject deviates outward from the left edge of the image data" in the image data P6, the necessary/unnecessary determining unit 17-1 determines the image data P6 as unnecessary image data. Then, the necessary/unnecessary determining unit 17-1 controls the operation of the input unit 11 so that the image data P6 are not output from the input unit 11 to the processing unit 12. Accordingly, the load on the processing unit 12 may be reduced.

Meanwhile, the feature data extracting unit 171 extracts the composition of image data. In this case, the feature data evaluating unit 16 illustrated in FIG. 54 takes out "the prescribed value" and "the prescribed number" as reference feature data from data obtained by the reference feature data obtaining unit 15, and when it make a determination that "there are equal to or more than the prescribed number of successive pieces of image data in which the difference between two successive two pieces of image data is equal to or below the prescribed value", it sends the determination result to the necessary/unnecessary determining unit 17-1.

Figure 56:
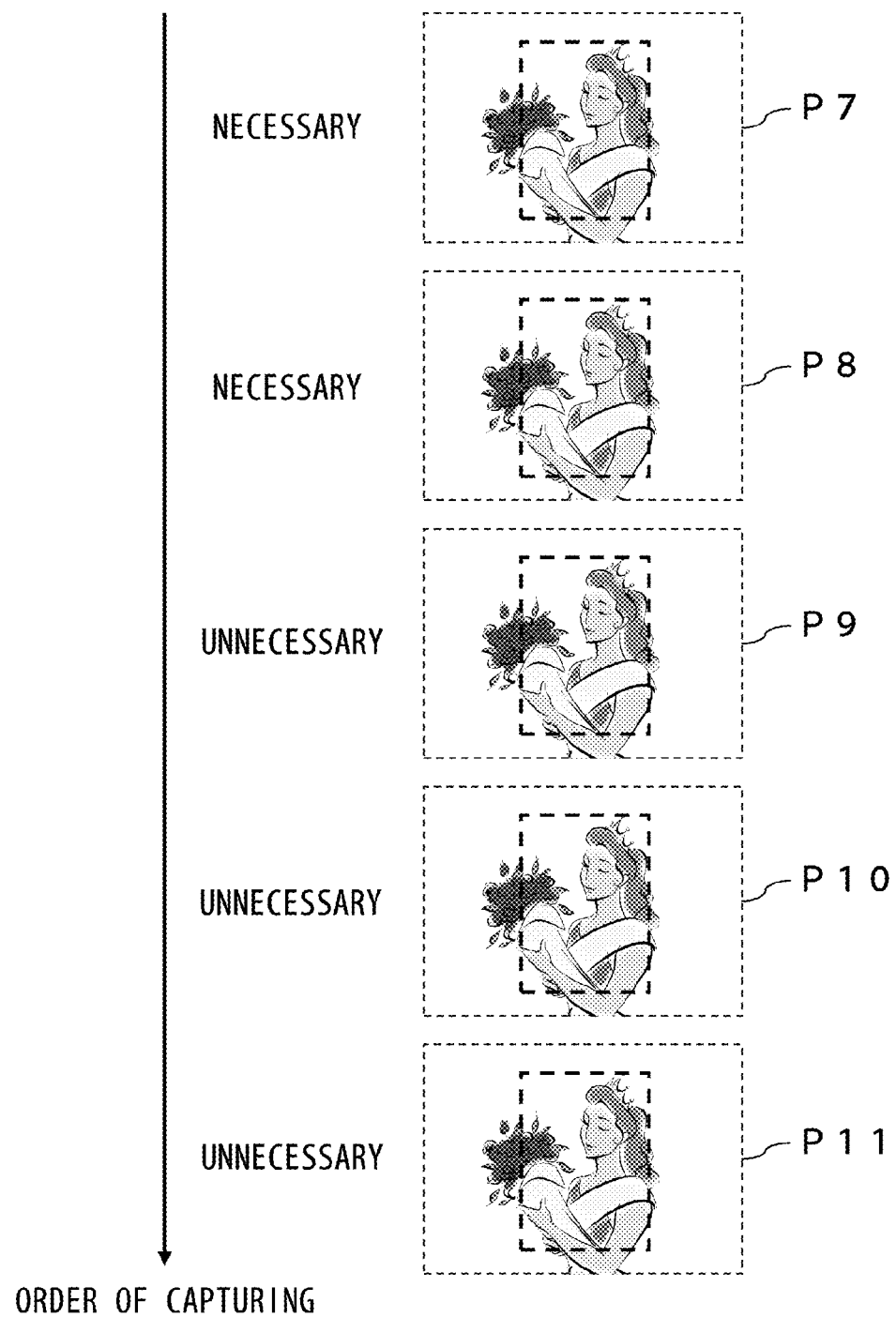
FIG. 56 is a diagram illustrating an example of image data for which necessary/unnecessary determination has been made.

The necessary/unnecessary determining unit 17-1 performs necessary/unnecessary determination of image data obtained by the input unit 11, based on the determination result sent from the feature data evaluating unit 16. For example, as illustrated in FIG. 56, when it is determined that, in a moving image composed of a plurality of pieces of image data P7 through P11, "there are two or more pieces of successive image data in which the difference between the image data P7, P8 is equal to or below the prescribed value", the necessary/unnecessary determining unit 17-1 determines the image data P9 through P11 following those image data P7, P8 as unnecessary image data. Then, necessary/unnecessary determining unit 17-1 controls the operation of the input unit 11 so that the image data P9 through P11 are not output to from the input unit 11 to the processing unit 12. Accordingly, the load on the processing unit 12 may be reduced.

Meanwhile, the feature data extracting unit 171 may also be configured to extract feature data from a thumbnail image (a reduced image of image data), image data of a lower resolution (an image of a lower resolution than the image data), partial-image image data (a part of image data) obtained by the input unit 11.

Figure 57:
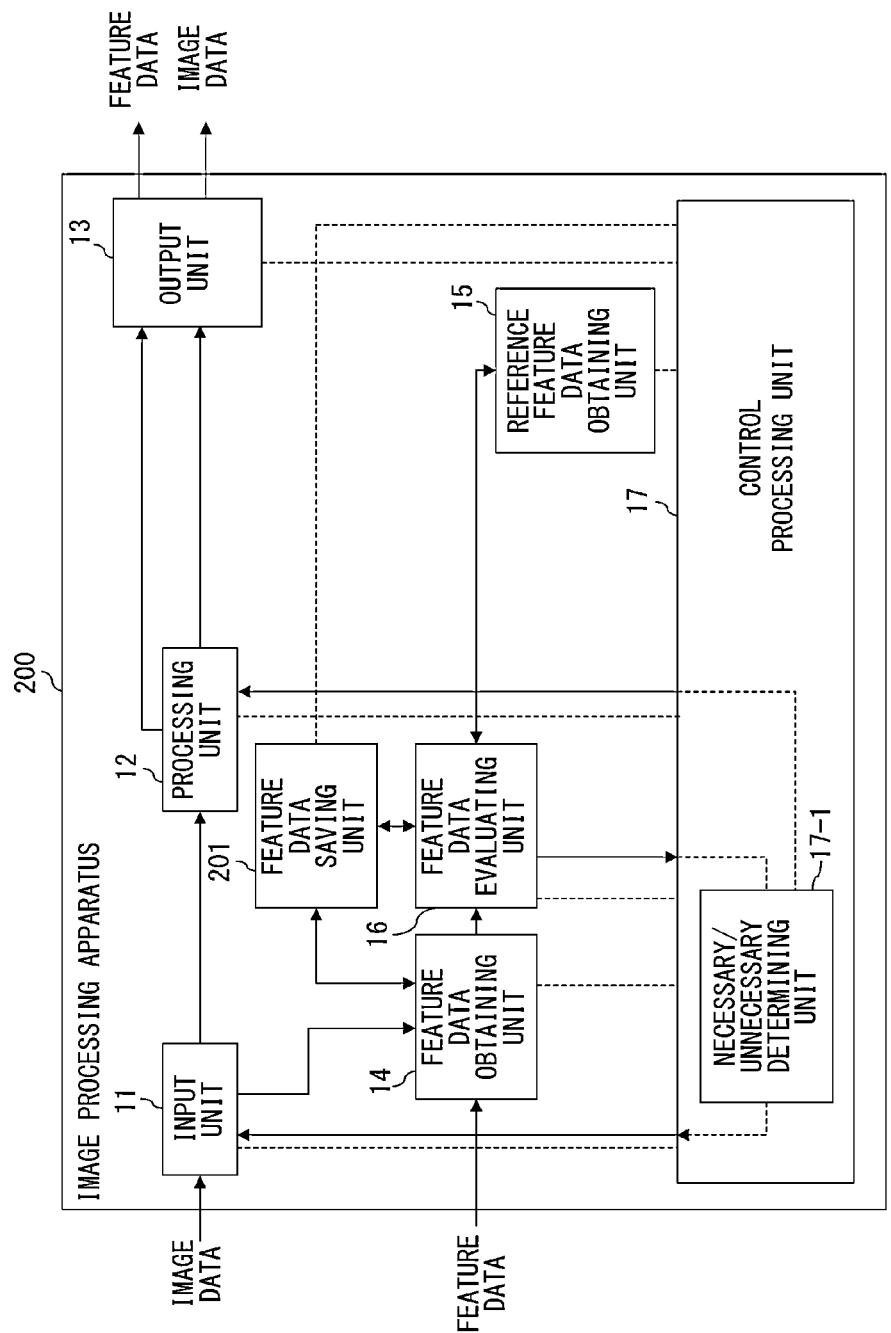
FIG. 57 is a diagram illustrating an image processing apparatus of another embodiment of the present invention.

FIG. 57 is a diagram illustrating an image processing apparatus of another embodiment of the present invention. Meanwhile, to the same configuration as the configuration illustrated in FIG. 38, the same numeral is assigned and explanation for the configuration is omitted. Meanwhile, the objective of the image processing apparatus 200 illustrated in FIG. 57 is to improve the efficiency of the editing work and playback work of a plurality of pieces of image data.

The image processing apparatus 200 illustrated in FIG. 57 differs from the image processing apparatus 10 illustrated in FIG. 38 in that a feature data saving unit 201 is further included.

The feature data obtaining unit 14 illustrated in FIG. 57 obtains feature data from outside regularly and saves it in the feature data saving unit 201.

According to the image processing apparatus 200 illustrated in FIG. 57, when the image capturing unit is removed from the image processing apparatus 200, when the network is disconnected, when feature data cannot be obtained regularly from outside due to a high network occupancy and the like, necessary/unnecessary determination of image data may be continued using feature data saved in the feature data saving unit 201. The image data for which necessary/unnecessary determination is performed at that time may be obtained when the image capturing unit is attached to the image processing apparatus 200, when the network connection is recovered, and the like. Thus, an offline necessary/unnecessary determination may be realized as well.

Meanwhile, the feature data saving unit 201 may be provided outside the image processing apparatus 200 (for example, on the network and on a removable memory).

According to the present invention, the efficiency of the editing work and playback work of moving images may be improved.

What is claimed is:

1. An image processing apparatus comprising a processor which is operable as:
   a necessary/unnecessary determination data generating unit configured to generate necessary/unnecessary determination data corresponding respectively to each moving image frame of an input moving image, used to determine whether or not the moving image frame is an unnecessary moving image frame;
   an image encoding unit configured to encode the input moving image, and also to divide each moving image frame of the moving image after encoding respectively into a plurality of pieces of data, and assign identification information respectively to, and record, in a memory, those pieces of data;
   a necessary/unnecessary determining unit configured to determine whether or not the moving image frame corresponding to the necessary/unnecessary determination data is an unnecessary moving image frame, based on the necessary/unnecessary determination data; and
   a moving image file managing unit configured to rewrite, in a table in the memory in which identification information recorded in the memory and information indicating a state of data at a recording position in the memory corresponding to the identification information are associated, information indicating a state of data at a recording position in the memory corresponding to identification information of a moving image frame determined as an unnecessary moving image frame by the necessary/unnecessary determining unit into information that there is no data.

2. The image processing apparatus according to claim 1, wherein:
   the memory comprises a table for recovery with a content as the table in the memory; and
   the moving image file managing unit returns information indicating a state of data at a recording position in the memory corresponding to identification information of recovery target data to original information, using the table for recovery.

3. The image processing apparatus according to claim 1, wherein the image encoding unit encodes the input moving image in MPEG2 format, and while dividing each moving image frame of the moving image after encoding respectively into a plurality of TS packets, assigns a PID as identification information respectively to, and records, in the memory, those TS packets.

4. The image processing apparatus according to claim 3, wherein the necessary/unnecessary determining unit is assigned in a unit GOP of encoding in the MPEG2 format.

5. The image processing apparatus according to claim 1, wherein the processor is further operable as a meta data generating unit configured to generate meta data by integrating one piece of identification information in pieces of identification information respectively assigned respective data after division of the moving image frame after encoding and necessary/unnecessary determination data corresponding to the moving image frame after encoding, and
   wherein the necessary/unnecessary determining unit determines, based on the necessary/unnecessary determination data in the meta data, whether or not a moving image frame corresponding to identification information is an unnecessary moving image frame.

6. The image processing apparatus according to claim 5, wherein:
   the necessary/unnecessary determination data generating unit generates a position and a size of a subject in the moving image frame as the necessary/unnecessary determination data; and
   when a size of a subject indicated by necessary/unnecessary determination data in the meta data read out from the memory is smaller than a prescribed size and a position of a subject indicated by necessary/unnecessary determination data in the meta data read out from the memory is outside a prescribed area, the necessary/unnecessary determining unit determines that a moving image frame corresponding to identification information in the meta data is not a necessary moving image frame.

7. The image processing apparatus according to claim 5, wherein:
   the necessary/unnecessary determination data generating unit generates the necessary/unnecessary determination data based on an image feature amount in the moving image frame; and
   when a difference between an image feature amount indicated by necessary/unnecessary determination data in the meta data read out from the memory and an image feature amount indicated by necessary/unnecessary determination data in meta data of a moving image frame close to a moving image frame corresponding to the meta data is equal to or smaller than a prescribed value, the necessary/unnecessary determining unit determines that a moving image frame corresponding to identification information in the meta data is not a necessary moving image frame.

8. The image processing apparatus according to claim 7, wherein the image feature amount is a composition index indicating a composition of a subject.

9. The image processing apparatus according to claim 7, wherein the image feature amount is a statistic of a luminance value of an image.

10. The image processing apparatus according to claim 5, wherein:
the necessary/unnecessary determination data generating unit generates focus information at a time of capturing the moving image frame as the necessary/unnecessary determination data; and
upon determining, from focus information indicated by necessary/unnecessary determination data in the meta data read out from the memory, that focusing of a moving image frame corresponding to the meta data has failed, or, that a focus is unstable, the necessary/unnecessary determining unit determines that a moving image frame corresponding to identification information in the meta data is not a necessary moving image frame.

11. The image processing apparatus according to claim 4, wherein:
the necessary/unnecessary determination data generating unit generates zoom information at a time of capturing the moving image frame as the necessary/unnecessary determination data; and
upon determining, from zoom information indicated by necessary/unnecessary determination data in the meta data read out from the memory and zoom information indicated by necessary/unnecessary determination data in meta data of a moving image frame immediately preceding a moving image frame corresponding to the meta data, that a lens position of a zoom lens is not stable, the necessary/unnecessary determining unit determines that a moving image frame corresponding to identification information in the meta data is not a necessary moving image frame.

12. The image processing apparatus according to claim 5, further comprising a radio antenna configured to receive a signal from a subject side;
wherein:
the necessary/unnecessary determination data generating unit generates a reception signal intensity of a signal received by the radio antenna as the necessary/unnecessary determination data; and
when a reception signal intensity indicated by necessary/unnecessary determination data in the meta data read out from the memory is lower than a prescribed value, the necessary/unnecessary determining unit determines that a moving image frame corresponding to identification information in the meta data is not a necessary moving image frame.

13. The image processing apparatus according to claim 1, wherein the necessary/unnecessary determining unit describes a flag indicating top or last of the unnecessary moving image frames in the identification information.

14. The image processing apparatus according to claim 13, wherein when there are both of a flag indicating the top of the unnecessary moving image frames and a flag indicating the last of the unnecessary moving image frames, the moving image file managing unit rewrites information indicating a state of data at a recording position in the memory corresponding to identification information of the moving image frame between the top of the unnecessary moving image frames and the last of the unnecessary moving images into information indicating that there is no data.

15. The image processing apparatus according to claim 1, wherein the processor is further operable as:
a reduced image generating unit configured to generate a reduced image of each of each input moving image frame; and
a meta data generating unit configured to generate meta data by integrating one piece of identification information in pieces of identification information respectively assigned respective data after division of the moving image frame after encoding and a reduced image of the moving image frame after encoding; and
wherein the necessary/unnecessary determination data generating unit generates necessary/unnecessary determination data used to determine whether or not a moving image frame corresponding to identification information in meta data is an unnecessary moving image frame, based on a reduced image in the meta data.

16. The image processing apparatus according to claim 15, wherein:
the memory comprises a table for recovery with a content as the table in the memory; and
the moving image file managing unit returns information indicating a state of data at a recording position in the memory corresponding to identification information of recovery target data to original information, using the table for recovery.

17. The image processing apparatus according to claim 15, wherein the image encoding unit encodes the input moving image in MPEG2 format, and while dividing each moving image frame of the moving image after encoding respectively into a plurality of TS packets, assigns a PID as identification information respectively to, and records, in the memory, those TS packets.

18. An image processing system in which an image processing apparatus and a server perform data transmission/reception via a network,
the image processing apparatus comprising a processor which is operable as:
an image encoding unit configured to encode the input moving image, and also to divide each moving image frame of the moving image after encoding respectively into a plurality of pieces of data, and assign identification information respectively to, and record, in a memory, those pieces of data;
a first receiving unit configured to receive a determination result and identification information transmitted from the server; and
a moving image file managing unit configured to rewrite, in a table in the memory in which identification information recorded in the memory and information indicating a state of data at a recording position in the memory corresponding to the identification information are associated, information indicating a state of data at a recording position in the memory corresponding to identification information received together with the determination result as an unnecessary moving image frame into information that there is no data, and
the server comprising a processor which is operable as:
a necessary/unnecessary determining unit configured to determine whether or not the moving image frame corresponding to the necessary/unnecessary determination data is an unnecessary moving image frame, based on necessary/unnecessary determination data; and
a second transmitting unit configured to transmit a determination result of the necessary/unnecessary determining unit to the image processing apparatus together with identification information corresponding to the determination result, and wherein the processor of one of the image processing apparatus and the server is further operable as a necessary/unnecessary determination data generating unit configured to generate necessary/unnecessary determination data corresponding respectively to each moving image frame of an input moving image, used to determine whether or not the moving image frame is an unnecessary moving image frame.

19. The image processing system according to claim 18, wherein:

the processor of the image processing apparatus is operable as the necessary/unnecessary determination data generating unit, and is further operable as:

a meta data generating unit configured to generate meta data by integrating one piece of identification information in pieces of identification information respectively assigned respective data after division of the moving image frame after encoding and necessary/unnecessary determination data corresponding to the moving image frame after encoding; and a first transmitting unit configured to transmit the meta data to the server, the processor of the server is further operable as a second receiving unit configured to receive meta data transmitted from the image processing apparatus; and the necessary/unnecessary determining unit determines, based on the necessary/unnecessary determination data in the received meta data, whether or not a moving image frame corresponding to identification information in the meta data is an unnecessary moving image frame.

20. The image processing system according to claim 19, wherein the necessary/unnecessary determining unit provided in the server is a second necessary/unnecessary determining unit, and the processor of the image processing apparatus is further operable as:

a first necessary/unnecessary determining unit configured to determine, based on necessary/unnecessary determination data in the generated meta data, whether or not a moving image frame corresponding to identification information in meta data is an unnecessary moving image frame;

a detecting unit configured to detect whether or not a state allows application of a load on the image processing apparatus; and a switching unit configured to switch a transmission destination of meta data generated by the meta data generating unit to the first necessary/unnecessary determining unit when it is determined that the state allows application of a load on the image processing apparatus according to information detected by the detecting unit, and to switch a transmission destination of meta data generated by the meta data generating unit to the first transmitting unit when it is determined that the state does not allow application of a load on the image processing apparatus according to information detected by the detecting unit, and wherein:

the second transmitting unit transmits a determination result of the second necessary/unnecessary determining unit to the image processing apparatus together with identification information corresponding to the determination result; and the moving image file managing unit rewrites, in a table in the memory in which identification information recorded in the memory and information indicating a state of data at a recording position in the memory corresponding to the identification information are associated, information indicating a state of data at a recording position in the memory corresponding to identification information received together with the determination result as an unnecessary moving image frame, or identification information of a moving image frame determined as an unnecessary moving image frame by the first necessary/unnecessary determining unit into information that there is no data.

21. The image processing system according to claim 20, wherein:

the detecting unit is a load state measuring unit configured to measure a load applied on a resource of the image processing apparatus; and the switching unit switches a transmission destination of meta data generated by the meta data generating unit to the first necessary/unnecessary determining unit when it is determined, from a measurement result of the load state measuring unit, that a higher load amount than a prescribed load amount is not applied on the image processing apparatus, and switches a transmission destination of meta data generated by the meta data generating unit to the first transmitting unit when it is determined, from a measurement result of the load state measuring unit, that a higher load amount than a prescribed load amount is applied on the image processing apparatus.

22. The image processing system according to claim 20, wherein:

the detecting unit is a power mode detecting unit configured to detect whether or not a power mode of the image processing apparatus is a mode regarding power saving; and the switching unit switches a transmission destination of meta data generated by the meta data generating unit to the first necessary/unnecessary determining unit when the power mode is detected not as a mode regarding power saving by the power mode detecting unit, and switches a transmission destination of meta data generated by the meta data generating unit to the first transmitting unit when the power mode is detected as a mode regarding power saving by the power mode detecting unit.

23. The image processing system according to claim 18, wherein:

the processor of the server is operable as the necessary/unnecessary determination data generating unit;

the processor of the image processing apparatus is further operable as:

a reduced image generating unit configured to generate a reduced image of each moving image frame of an input moving image; and a meta data generating unit configured to generate meta data by integrating one piece of identification information in pieces of identification information respectively assigned respective data after division of the moving image frame after encoding and a reduced image of the moving image frame after encoding; and a first transmitting unit configured to transmit the meta data to the server;

the processor of the server is further operable as a second receiving unit configured to receive meta data transmitted from the image processing apparatus;

based on a reduced image in the received meta data, the necessary/unnecessary determination data generating unit generates necessary/unnecessary determination data used to determine whether or not a moving image frame corresponding to identification information in the meta data is an unnecessary moving image frame; and based on the generated necessary/unnecessary determination data, the necessary/unnecessary determining unit determines whether or not the moving image frame of identification information corresponding to the necessary/unnecessary determination data is an unnecessary moving image frame.

24. An image reading apparatus comprising:
a memory which stores:
   necessary/unnecessary determination data corresponding respectively to each moving image frame of an moving image, used to determine whether or not the moving image frame is an necessary moving image frame;
   each moving image frame of the moving image after encoding to which identification information is assigned; and
   meta data in which identification information assigned to the moving image frame and necessary/unnecessary determination data corresponding to the moving image frame are integrated; and
a processor which is configured to operate as:
   a necessary/unnecessary determining unit configured to read out, from the memory, the meta data, and based on necessary/unnecessary determination data in the meta data, to determine whether or not a moving image frame corresponding to identification information in the meta data is a necessary moving image frame; and
   a reading-out control unit configured to, using a table in which identification information recorded in the memory and information indicating a recording position in the memory corresponding to the associated identification information, read out, from the memory, only a moving image frame recorded at which a recording position in the memory corresponding to identification information of a moving image frame determined as a necessary moving image frame by the necessary/unnecessary determining unit.

25. The image reading apparatus according to claim 24, wherein:
   in the memory, the moving image encoded in MPEG2 format is recorded, and also, each moving image frame of a moving image after encoding is divided respectively into a plurality of TS packets, and a PID is assigned respectively to the TS packets as identification information and recorded; and
   the reading-out control unit reads out only data recorded at a recording position of the memory corresponding to a PID of a moving image frame determined as a necessary moving image frame by the necessary/unnecessary determining unit.

26. The image reading apparatus according to claim 24, wherein the processor is further operable as:
   a necessary/unnecessary determination data generating unit configured to generate the necessary/unnecessary determination data corresponding respectively to each moving image frame of an input moving image;
   an image encoding unit configured to encode the input moving image, and also, to assign identification information respectively to, and store, in the memory, each moving image frame of the moving image after encoding; and
   a meta data generating unit configured to generate, and record, in the memory, meta data by integrating identification information assigned to the moving image frame and necessary/unnecessary determination data corresponding to the moving image frame.

27. An image processing system comprising an image processing apparatus configured to record a moving image in a memory and an image reading apparatus configured to read out a moving image from the memory,
   the image processing apparatus comprising a processor which is operable as:
      a necessary/unnecessary determination data generating unit configured to generate necessary/unnecessary determination data corresponding respectively to each moving image frame of an input moving image, used to determine whether or not the moving image frame is an necessary moving image frame;
      an image encoding unit configured to encode the input moving image, and assign identification information respectively to, and record, in the memory, to each moving image frame of the moving image after encoding; and
      a meta data generating unit configured to generate, and record, in the memory, meta data by integrating identification information assigned to the moving image frame and necessary/unnecessary determination data corresponding to the moving image frame;
   the image reading apparatus comprising a processor which is operable as:
      a necessary/unnecessary determining unit configured to read out meta data from the memory, and based on necessary/unnecessary determination data in the meta data, to determine whether or not a moving image frame corresponding to identification information in the meta data is a necessary moving frame; and
      a reading-out control unit configured to, using a table in which identification information recorded in the memory and information indicating a recording position in the memory corresponding to the associated identification information, read out only a moving image frame recorded at which a recording position in the memory corresponding to identification information of a moving image frame determined as a necessary moving image frame by the necessary/unnecessary determining unit.

28. The image processing system according to claim 27, wherein the image encoding unit encodes the input moving image in MPEG2 format, and while dividing each moving image frame of the moving image after encoding respectively into a plurality of TS packets, assigns a PID as identification information respectively to, and records, in the memory, those TS packets.

29. The image processing system according to claim 27, wherein:
   the necessary/unnecessary determination data generating unit generates a position and a size of a subject in the moving image frame as the necessary/unnecessary determination data; and
   when a size of a subject indicated by necessary/unnecessary determination data in the meta data read out from the memory is smaller than a prescribed size and a position of a subject indicated by necessary/unnecessary determination data in the meta data read out from the memory is outside a prescribed area, the necessary/unnecessary determining unit determines that a moving image frame corresponding to identification information in the meta data is not a necessary moving image frame.

30. The image processing system according to claim 27, wherein:
- the necessary/unnecessary determination data generating unit generates the necessary/unnecessary determination data based on an image feature amount in the moving image frame; and
- when a difference between an image feature amount indicated by necessary/unnecessary determination data in the meta data read out from the memory and an image feature amount indicated by necessary/unnecessary determination data in meta data of a moving image frame close to a moving image frame corresponding to the meta data is equal to or smaller than a prescribed value, the necessary/unnecessary determining unit determines that a moving image frame corresponding to identification information in the meta data is not a necessary moving image frame.

31. The image processing system according to claim 30, wherein the image feature amount is a composition index indicating a composition of a subject.

32. The image processing system according to claim 30, wherein the image feature amount is a statistic of a luminance value of an image.

33. The image processing system according to claim 27, wherein:
- the necessary/unnecessary determination data generating unit generates focus information at a time of capturing the moving image frame as the necessary/unnecessary determination data; and
- upon determining, from focus information indicated by necessary/unnecessary determination data in the meta data read out from the memory, that focusing of a moving image frame corresponding to the meta data has failed, or, that a focus is unstable, the necessary/unnecessary determining unit determines that a moving image frame corresponding to identification information in the meta data is not a necessary moving image frame.

34. The image processing system according to claim 27, wherein:
- the necessary/unnecessary determination data generating unit generates zoom information at a time of capturing the moving image frame as the necessary/unnecessary determination data; and
- upon determining, from zoom information indicated by necessary/unnecessary determination data in the meta data read out from the memory and zoom information indicated by necessary/unnecessary determination data in meta data of a moving image frame immediately preceding a moving image frame corresponding to the meta data, that a lens position of a zoom lens is not stable, the necessary/unnecessary determining unit determines that a moving image frame corresponding to identification information in the meta data is not a necessary moving image frame.

35. The image processing system according to claim 27, further comprising a radio antenna configured to receive a signal from a subject side;
wherein:
- the necessary/unnecessary determination data generating unit generates a reception signal intensity of a signal received by the radio antenna as the necessary/unnecessary determination data; and
- when a reception signal intensity indicated by necessary/unnecessary determination data in the meta data read out from the memory is lower than a prescribed value, the necessary/unnecessary determining unit determines that a moving image frame corresponding to identification information in the meta data is not a necessary moving image frame.

36. An image processing apparatus comprising a processor which is operable as:
- a feature data obtaining unit configured to obtain feature data corresponding to image data;
- a reference feature data obtaining unit configured to obtain reference feature data;
- a feature data evaluating unit configured to perform evaluation of the feature data based on the reference feature data;
- a necessary/unnecessary determining unit configured to perform necessary/unnecessary determination of image data corresponding to the feature data based on the evaluation performed by the feature data evaluating unit;
- a control processing unit configured to perform control based on the necessary/unnecessary determination;
- an evaluation policy generating unit configured to generate an evaluation policy; and
- a reference feature data generating unit configured to generate the reference feature data based on the evaluation policy.

37. The image processing apparatus according to claim 36, wherein the processor is further operable as a state detecting unit; and
- wherein the reference feature generating unit generates the reference feature data based on the evaluation policy and a detection result of the state detecting unit.

38. The image processing apparatus according to claim 36, wherein the processor is further operable as a state detecting unit; and
- wherein the evaluation policy generating unit generates an evaluation policy based on a detection result of the state detecting unit.

39. The image processing apparatus according to claim 37, wherein the state detecting unit is a power state detecting unit configured to detect at least one of a power type and a power state of the image processing apparatus.

40. The image processing apparatus according to claim 39, wherein, when a detection result of the power state detecting unit is a low-energy state in which an available power capacity is equal to or below a prescribed value, the reference feature data generating unit generates the reference feature data so that an amount of data of an image to be obtained becomes smaller compared with a non-low-energy state, from the detection result and the evaluation policy.

41. The image processing apparatus according to claim 37, wherein the state detecting unit is a connection state determining unit configured to determine a connection state with a network.

42. The image processing apparatus according to claim 36, wherein the feature data evaluating unit performs evaluation by combining a plurality of types of the reference feature data.

43. The image processing apparatus according to claim 41, wherein when a determination result of the connection state determining unit is a low-speed state in which a data forwarding amount per unit time of an available network is equal to or below a prescribed value, the reference feature data generating unit generates the reference feature data so that a total amount of data of an image to be obtained becomes smaller compared with a non-low-speed state, from the detection result and the evaluation policy.

44. The image processing apparatus according to claim 36, wherein the processor is further operable as a display unit configured to input an evaluation policy indicating a policy to evaluate at least one of a display speed, a resolution, and an amount of data of the image data with priority; and
wherein the reference feature data generating unit generates the reference feature data based on the evaluation policy input in the display unit.

45. The image processing apparatus according to claim 36, wherein the processor is further operable as a feature data extracting unit configured to extract the feature data from the image data.

46. The image processing apparatus according to claim 45, wherein:
the feature data extracting unit extracts at least one of a position and a size of a subject in the image data as the feature data; and
the necessary/unnecessary determining unit determines whether or not at least one of a position and a size of a subject in the image data extracted by the feature data extracting unit is equal to or smaller than a threshold as the reference feature data, and performs necessary/unnecessary determination of the image data based on the determination result.

47. The image processing apparatus according to claim 46, wherein when at least one of a position and a size of a subject in the image data extracted by the feature data extracting unit is equal to or smaller than the threshold, the necessary/unnecessary determining unit makes determination of the image data as unnecessary.

48. The image processing apparatus according to claim 45, wherein:
the feature data extracting unit extracts compositions of a successive plurality of the image data as the feature data; and
the necessary/unnecessary determining unit determines whether or not an amount of change of compositions of a plurality of pieces of data extracted by the feature data extracting unit is equal to or below a threshold as the reference feature data, and performs necessary/unnecessary determination of the image data based on the determination result.

49. The image processing apparatus according to claim 48, wherein when an amount of change of compositions of a plurality of pieces of image data is equal to or below a threshold, the necessary/unnecessary determining unit makes determination of the plurality of image data as unnecessary.

50. The image processing apparatus according to claim 36, wherein the necessary/unnecessary determining unit performs evaluation of the feature data by categorizing in multiple steps, or by scoring.

51. The image processing apparatus according to claim 36, wherein the necessary/unnecessary determining unit performs evaluation of at least one of a degree of blurring, a degree of shaking, contrast, color tone, definition, angle of view misalignment, asymmetricity, and overlapping of a subject of image data corresponding to the feature data.

52. The image processing apparatus according to claim 45, wherein the feature data extracting unit extracts feature data from a reduced image of the image data, an image with a lower resolution than the image data, or the feature data being a part of the image data.

53. The image processing apparatus according to claim 36, wherein the processor is further operable as a feature data saving unit configured to save the feature data; and
wherein the necessary/unnecessary determining unit performs evaluation of feature data saved by the feature data saving unit based on the reference feature data.

54. The image processing apparatus according to claim 36, wherein the processor is further operable as a communication unit configured to perform communication of the feature data or the image data with an external apparatus; and
wherein the necessary/unnecessary determining unit makes a request for image data determined as necessary to the external device or makes another external device make a request for the image data.

55. The image processing apparatus according to claim 36, further comprising:
an image capturing unit; and
an input unit configured to obtain image data determined as necessary by the necessary/unnecessary determining unit from the image capturing unit.

56. The image processing apparatus according to claim 36, wherein the processor is further operable as a processing unit configured to process image data;
wherein the processing unit performs a process for image data determined as necessary by the necessary/unnecessary determining unit.

57. A non-transitory computer-readable recording medium having a program recorded thereon which is executable to control a computer to function as:
a feature data obtaining unit configured to obtain feature data corresponding to image data;
a feature data evaluating unit configured to perform evaluation of the feature data based on reference feature data obtained by a reference feature data obtaining unit;
a necessary/unnecessary determining unit configured to perform necessary/unnecessary determination of image data corresponding to the feature data based on the evaluation performed by the feature data evaluating unit; and
an evaluation policy generating unit configured to generate an evaluation policy;
wherein the reference feature data generating unit is configured to generate the reference feature data based on the evaluation policy.

* * * * *